US012668323B2

(12) United States Patent
Rubanovich et al.

(10) Patent No.: US 12,668,323 B2
(45) Date of Patent: Jun. 30, 2026

(54) UTILITY VEHICLE

(71) Applicant: Polaris Industries Inc., Medina, MN (US)

(72) Inventors: Boris Rubanovich, Oak Grove, MN (US); Austin Bartz, Forest Lake, MN (US); Michael J. Fuchs, Blaine, MN (US); John B. Pircon, Stacy, MN (US); Rebecca C. Nelson, Vadnais Heights, MN (US); Jacob L. Stock, Dellwood, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 296 days.

(21) Appl. No.: 18/370,302

(22) Filed: Sep. 19, 2023

(65) Prior Publication Data

US 2024/0166293 A1 May 23, 2024

Related U.S. Application Data

(60) Provisional application No. 63/426,117, filed on Nov. 17, 2022.

(51) Int. Cl.
B62K 5/007 (2013.01)
B60K 1/04 (2019.01)
(Continued)

(52) U.S. Cl.
CPC .............. B62K 5/007 (2013.01); B60L 50/66 (2019.02); B62J 25/04 (2020.02); B62J 43/28 (2020.02);
(Continued)

(58) Field of Classification Search
CPC ... B62J 43/28; B62J 43/10; B62J 43/13; B62J 43/16; B62J 1/08; B62J 43/41;
(Continued)

(56) References Cited

U.S. PATENT DOCUMENTS 3,603,609 A * 9/1971 Hott ...................... B62D 61/08
297/215.14
6,412,583 B1 7/2002 Caple
(Continued)

FOREIGN PATENT DOCUMENTS

CN 102501931 A 6/2012
CN 108974196 A 12/2018
(Continued)

OTHER PUBLICATIONS

International Preliminary Report on Patentability, issued by the International Preliminary Examining Authority, dated May 7, 2024, for International Patent Application No. PCT/US2022/014215; 33 pages.

(Continued)

*Primary Examiner* — Tinh T Dang
(74) *Attorney, Agent, or Firm* — Merchant & Gould P.C.

(57) ABSTRACT

A recreational vehicle is provided. The recreational vehicle may include a plurality of ground engaging members comprising at least one front ground engaging member and at least one rear ground engaging member. The recreational vehicle may further comprise a frame assembly comprising a front portion, a middle portion, and a rear portion. A steering assembly may be supported by the front portion and configured to steer at least one of the plurality of ground engaging members. A first motor and a second motor may be configured to provide power to the ground engaging members. A battery assembly may be supported by the middle portion. The middle portion may comprise a tub configured to support a battery and an operator in a seated or standing position.

15 Claims, 46 Drawing Sheets

(51) Int. Cl.

| | |
|---|---|
| *B60K 7/00* | (2006.01) |
| *B60L 50/60* | (2019.01) |
| *B60L 58/18* | (2019.01) |
| *B62J 25/04* | (2020.01) |
| *B62J 43/28* | (2020.01) |
| *B62K 5/08* | (2006.01) |
| *B62K 5/00* | (2013.01) |

(52) U.S. Cl.
CPC .............. *B62K 5/08* (2013.01); *B60K 7/0007* (2013.01); *B60L 58/18* (2019.02); *B62K 2005/001* (2013.01); *B62K 2202/00* (2013.01)

(58) Field of Classification Search
CPC ..... B62J 25/04; B62J 11/19; B62J 9/23; B62J 9/24; B62J 9/27; B62K 5/007; B62K 5/08; B62K 2202/00; B62K 3/002–16; B62K 5/00–10; B62K 13/00–08; B62K 15/00–008; B62K 2005/001; B60L 50/66; B60L 58/18; B60K 7/0007
See application file for complete search history.

(56) References Cited

U.S. PATENT DOCUMENTS

| | | | |
|---|---|---|---|
| 7,125,080 | B1 | 10/2006 | Jarema et al. |
| 9,365,254 | B1 | 6/2016 | Durrett |
| 9,533,729 | B1 | 1/2017 | Chan |
| 10,729,603 | B2 | 8/2020 | Wang |
| 10,864,958 | B2* | 12/2020 | Schneider .............. B62K 5/027 |
| 11,230,342 | B2 | 1/2022 | Zhang |
| 11,767,060 | B2 | 9/2023 | Hammond et al. |
| 2007/0187164 | A1 | 8/2007 | Yang et al. |
| 2011/0301825 | A1 | 12/2011 | Grajkowski et al. |
| 2013/0192908 | A1 | 8/2013 | Schlagheck |
| 2014/0262583 | A1 | 9/2014 | Url |
| 2015/0061263 | A1 | 3/2015 | Cheng |
| 2015/0122570 | A1 | 5/2015 | Miyashiro |
| 2015/0166138 | A1* | 6/2015 | Lovley, II ............... B62K 9/02 180/210 |
| 2017/0259879 | A1 | 9/2017 | Southey et al. |
| 2018/0178705 | A1 | 6/2018 | Fohrenkamm et al. |
| 2020/0156727 | A1 | 5/2020 | Chang |
| 2020/0269916 | A1 | 8/2020 | Doerksen et al. |
| 2021/0038450 | A1 | 2/2021 | Ho et al. |
| 2021/0114654 | A1 | 4/2021 | Bonk et al. |
| 2021/0347313 | A1 | 11/2021 | Marquez Costa |
| 2024/0075801 | A1 | 3/2024 | Kugler et al. |
| 2025/0100367 | A1 | 3/2025 | Kugler et al. |

FOREIGN PATENT DOCUMENTS

| | | |
|---|---|---|
| CN | 111186520 A | 5/2020 |
| DE | 20110981 U1 | 9/2001 |
| GB | 2385038 A | 8/2003 |
| JP | 60-136275 U | 9/1985 |
| JP | 2000-264104 A | 9/2000 |
| JP | 2013-009794 A | 1/2013 |
| JP | 2013-106896 A | 6/2013 |
| WO | 2014/111848 A1 | 7/2014 |
| WO | 2019/224435 A1 | 11/2019 |
| WO | 2020/160406 A1 | 8/2020 |

OTHER PUBLICATIONS

Wikipedia article "Axial flux motor"; https://en.wikipedia.org/wiki/Axial_flux_motor; Apr. 15 (Year: 2024).
International Search Report and Written Opinion as issued by the International Searching Authority, dated Jun. 14, 2022, for International Patent Application No. PCT/US2022/14215;13 pages.

* cited by examiner

FRONT

151

190

195

191

164A

164C

151A

4

160

164B

162A

UTILITY VEHICLE

RELATED APPLICATIONS

The present disclosure claims priority to U.S. Provisional Application Ser. No. 63/426,117, filed Nov. 17, 2022, titled "UTILITY VEHICLE", which is related to U.S. application Ser. No. 17/587,721, filed Jan. 28, 2022, titled "YOUTH ELECTRIC VEHICLE", and PCT International Application No. PCT/US2022/014215, filed Jan. 28, 2022, titled "CONVERTIBLE RECREATIONAL SIT-DOWN TO STAND-UP VEHICLE", the entire disclosures of which are expressly incorporated by reference herein.

FIELD OF THE DISCLOSURE

The present disclosure relates to a personal transportation vehicle and associated methods of use.

BACKGROUND OF THE DISCLOSURE

Utility and recreational vehicles include adjustment capabilities, accessory options, and various powertrains and frame assemblies. The adjustment capabilities are often required to enhance the ergonomics for many riders and increase the storability and transportability of the vehicle.

SUMMARY OF THE DISCLOSURE

In one embodiment of the present disclosure, a recreational vehicle is provided. The recreational vehicle comprising a plurality of ground engaging members comprising at least one front ground engaging member and at least one rear ground engaging member. The recreational vehicle also comprises a frame assembly supported by the plurality of ground engaging members. The frame comprises a front portion, a middle portion, and a rear portion. The recreational vehicle further comprises a steering assembly supported by the front portion, and the steering assembly is configured to steer at least one of the plurality of ground engaging members. A first motor is supported by the front portion, and the first motor is configured to provide power to the at least one front ground engaging member. A second motor is supported by the rear portion, and the second motor is configured to provide power to the at least one rear ground engaging member. The recreational vehicle further comprises a battery assembly supported by the middle portion, and the battery assembly comprises at least a first battery. Further, the middle portion comprises a tub configured to support an operator of the vehicle, and the tub is further configured to support the at least first battery. In the present embodiment, the tub is configured to support the operator in both a seated position and a standing position.

In various embodiments, the plurality of ground engaging members comprises a front right ground engaging member, a front left ground engaging member, a rear left ground engaging member, and a rear right ground engaging member. Further, the first motor is configured to provide power to each of the front right ground engaging member and the front left ground engaging member and the second motor is configured to provide power to each of the rear right ground engaging member and the rear left ground engaging member.

In various embodiments, the plurality of ground engaging members comprises a front right ground engaging member, a front left ground engaging member, a rear left ground engaging member, and a rear right ground engaging member. Further, the first motor is a hub motor operably coupled to the front right ground engaging member and a third motor is a hub motor operably coupled to the front left ground engaging member. The second motor is a hub motor operably coupled to the rear right ground engaging member, and a fourth motor is a hub motor operably coupled to the rear left ground engaging member.

In various embodiments, the tub comprises a base and a cover, and the at least first battery is configured to be supported by the base. Further, the cover is configured to conceal the battery. Additionally, the tub further comprises a support member extending upward from the base. Further, the support member is configured to support the cover. In various embodiments, the cover is positioned on a top face of the tub. In various embodiments, the cover is positioned on a side face of the tub.

In various embodiments, the recreational vehicle further comprises a second battery positioned within the tub.

In various embodiments, the recreational vehicle further comprises a channel extending through the frame between the tub and the rear portion. Further, at least one electrical wire is configured to extend through the channel between the at least one battery and the second motor.

In another embodiment of the present disclosure, a recreational vehicle is provided. The recreational vehicle comprises a plurality of ground engaging members and a frame supported by the plurality of ground engaging members. The frame comprises a front portion, a middle portion, and a rear portion. The middle portion comprises an operator area configured to support an operator of the vehicle. The recreational vehicle further comprises a motor supported by the frame, and the motor is configured to provide power to at least one of the plurality of ground engaging members. The recreational vehicle further comprises a steering assembly supported by the front portion, and the steering assembly is steeringly coupled to at least one of the plurality of ground engaging members. A seat assembly is supported by the frame, and the seat assembly comprises a base, a seat, and a linear force element operably coupled between the base and the seat. The linear force element is operable to have a plurality of lengths and the seat is coupled to the linear force element at a seat coupling point. The seat is configured to have a first height when the linear force element has a first length, and the seat is configured to have a second height when the linear force element has a second length. Further, the seat is configured to rotate about the seat coupling point.

In various embodiments, the seat assembly is movably coupled to the frame, and the base is configured to translate across the frame from a first position within the middle portion to a second position within the rear portion.

In various embodiments, the linear force element is rotatable at the base about an axis nominally parallel to an axis of rotation of at least one of the plurality of ground engaging members.

In various embodiments, the recreational vehicle further comprises a seat position sensor configured to detect a seat position, and a controller of the vehicle is configured to alter a speed of the vehicle when the controller detects a change in the seat position.

In another embodiment of the present disclosure, a utility vehicle is provided. The utility vehicle comprises a plurality of ground engaging members including at least one front ground engaging member and at least one rear ground engaging member. The utility vehicle further comprises a frame supported by the plurality of ground engaging members. The frame comprises a front portion, a middle portion, and a rear portion, and the middle portion defines at least a portion of an operator area. Further, a vehicle centerline extends along a longitudinal axis of the vehicle. A front suspension is operably coupled between the front portion and the at least one front ground engaging member and a rear suspension is operably coupled between the rear portion and the at least one rear ground engaging member. A steering assembly is supported by the frame, and the steering assembly is steeringly coupled to at least one of the plurality of ground engaging members. The utility vehicle further comprises a first rail comprising a first plurality of apertures and a second rail comprising a second plurality of apertures. The first rail and second rail is configured to support an accessory. Further, the first rail and second rail is positioned on an upper facing side of at least one of the middle portion and the rear portion. Further, the first rail is nominally parallel to the second rail, and each of the first rail and the second rail extends nominally parallel to the vehicle centerline.

In various embodiments, each of the first rail and the second rail are supported by each of the rear portion and the middle portion.

In various embodiments, the frame extends longitudinally a first distance, and at least one of the first rail and the second rail extends a second distance. The second distance is at least ¼ of the first distance.

In various embodiments, the first rail comprises a first rail outer facing edge and the second rail comprises a second rail outer facing edge. The rear portion has a lateral width defined by a first width and the first rail outer edge is separated from the second rail outer edge by the first width.

In various embodiments, the rear suspension includes a first shock absorber extending between a rear suspension arm and the frame and a second shock absorber extending between the rear suspension arm and the frame. The first shock absorber is coupled to the suspension arm at a first mounting point and the second shock absorber is coupled to the suspension arm at a second mounting point. Further, each of the first rail and the second rail are positioned laterally inward from the first mounting point and the second mounting point.

In various embodiments, the accessory is configured to mount to at least one of the first rail and the second rail.

In various embodiments, the accessory is configured to translate along that at least one of the first rail and the second rail.

In various embodiments, the accessory is a seat.

In various embodiments, the accessory is a dump box.

In another embodiment of the present disclosure, a utility vehicle is provided. The utility vehicle comprises a plurality of ground engaging members including a front right ground engaging member, a front left ground engaging member, and at least one rear ground engaging member. A frame is supported by the plurality of ground engaging members. Further, a front suspension is operably coupled between the frame and each of the front right ground engaging member and the front left ground engaging member. The front suspension comprises a suspension arm, a first shock absorber extending between the suspension arm and the frame, and a second shock absorber extending between the suspension arm and the frame. The utility vehicle further comprises a steering assembly comprising a steering shaft configured to receive an input from an operator of the vehicle. A steering bracket is coupled to the steering shaft, and the steering bracket is configured to rotate with the steering shaft. Further, a first steering rod is coupled between the steering bracket and the front right ground engaging member. The first steering rod is configured to steer the front right ground engaging member. A second steering rod is coupled between the steering bracket and the front left ground engaging member. The second steering rod is configured to steer the front left ground engaging member. Further, the first steering rod and the second steering rod are coupled to the steering bracket longitudinally forward of the suspension arm.

In various embodiments, the steering assembly further comprises an adjustment assembly. The adjustment assembly comprises an adjustment bracket rotatably coupled to the steering bracket and the adjustment bracket comprises a plurality of indents configured to receive the steering shaft.

In various embodiments, the steering shaft is configured to move from a first position in one of the plurality of indents to a second position in another one of the plurality of indents. Further, the first position is defined by a first angle between a ground level and the steering shaft and the second position is defined by a second angle between the ground level and the steering shaft. In the present embodiment, the first angle and second angle are distinct.

In various embodiments, the first steering rod and the second steering rod are coupled to the steering bracket using a spherical joint.

DETAILED DESCRIPTION OF THE DRAWINGS

Figure 1:
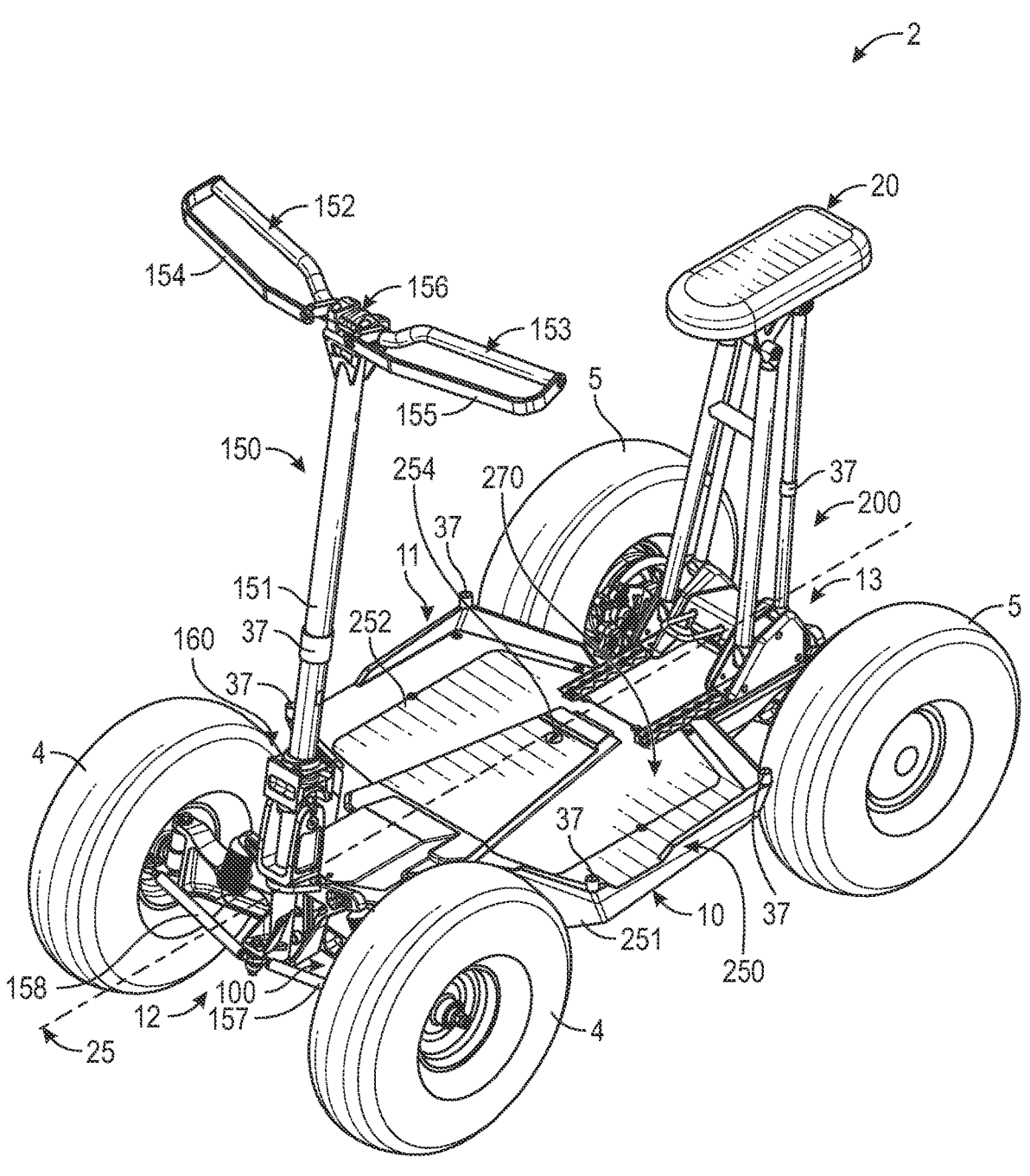
FIG. 1 is a front left perspective view of a vehicle of the present disclosure.
Figure 2:
FIG. 2 is a front view of the vehicle of FIG. 1.
Figure 3:
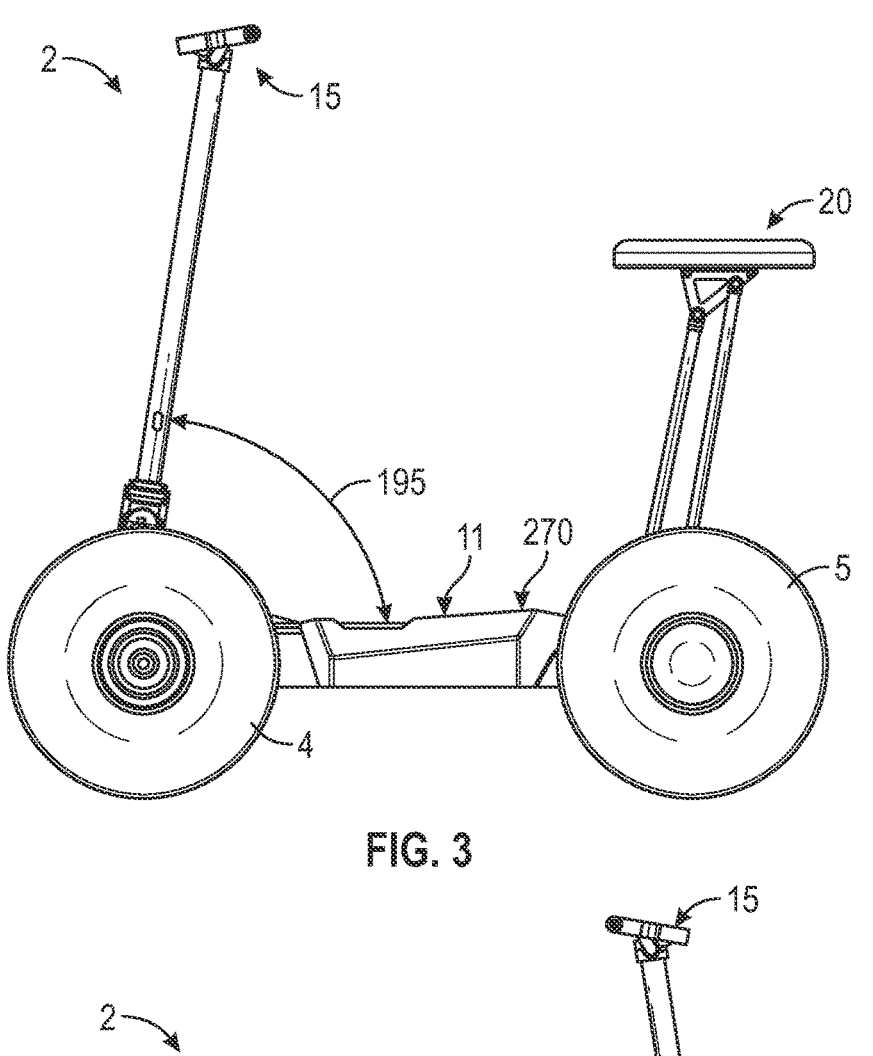
FIG. 3 is a left side view of the vehicle of FIG. 1.
Figure 4:
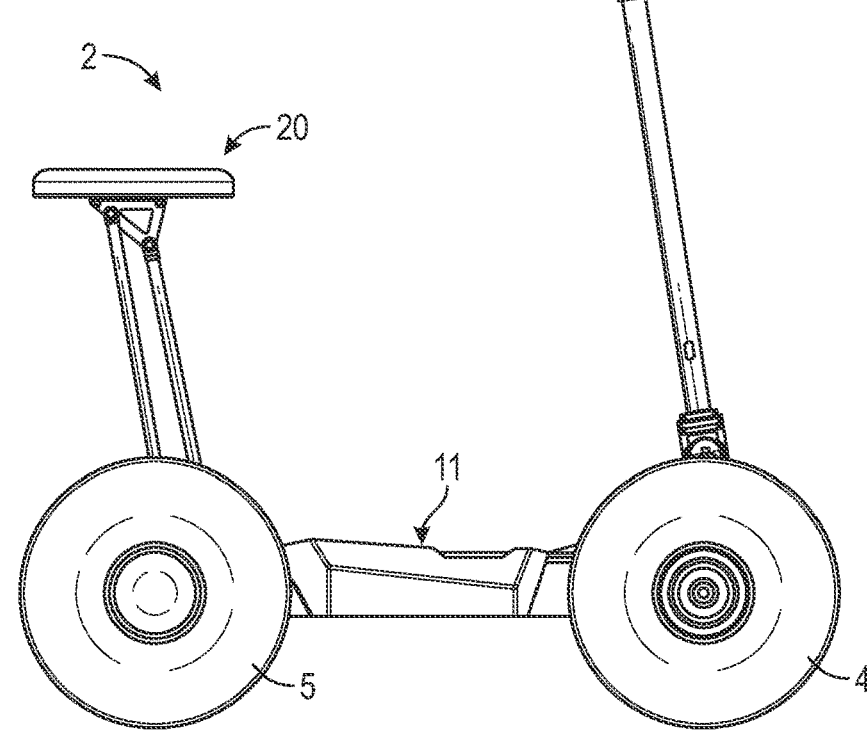
FIG. 4 is a right side view of the vehicle of FIG. 1.
Figure 5:
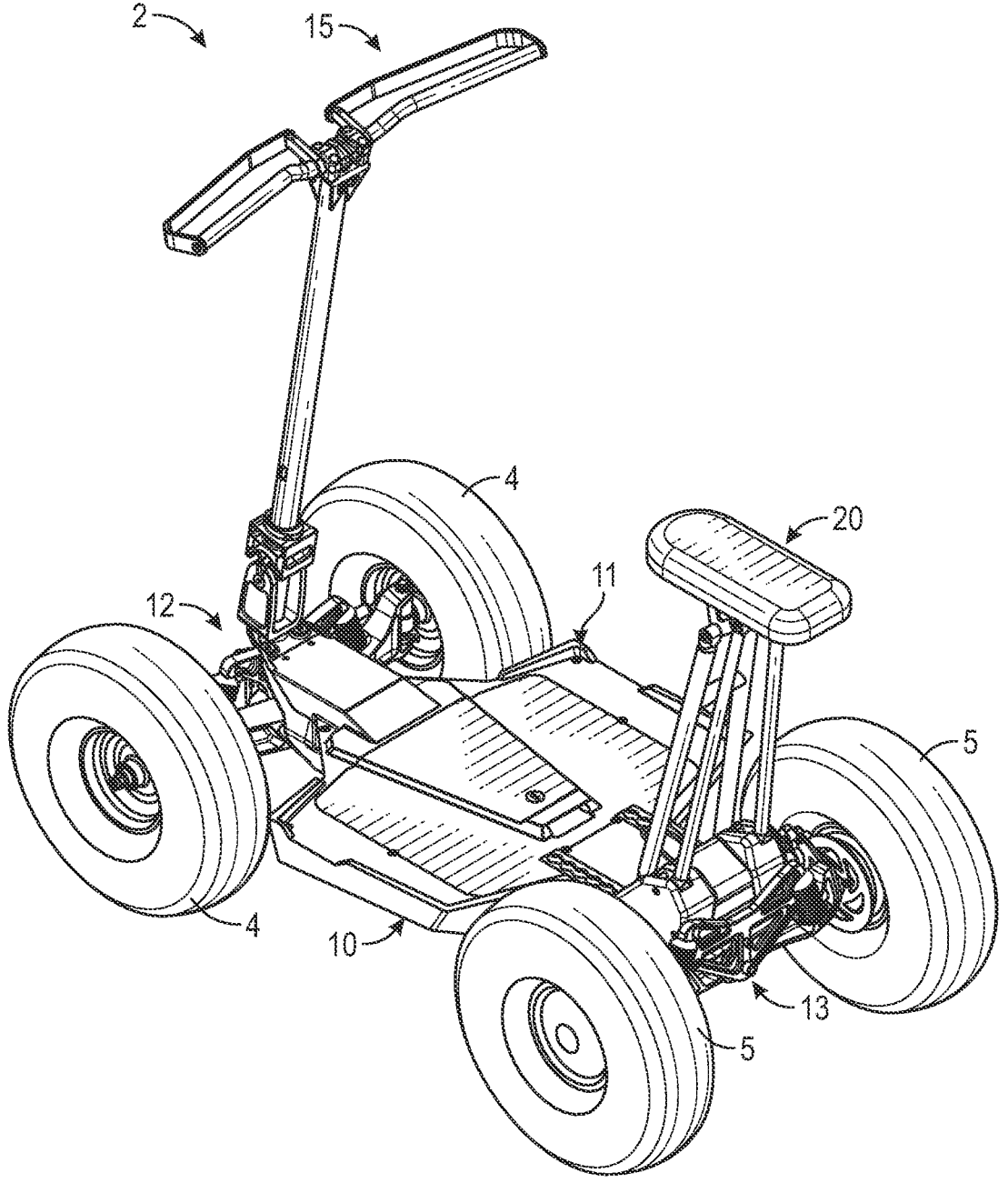
FIG. 5 is a rear left perspective view of the vehicle of FIG. 1.
Figure 6:
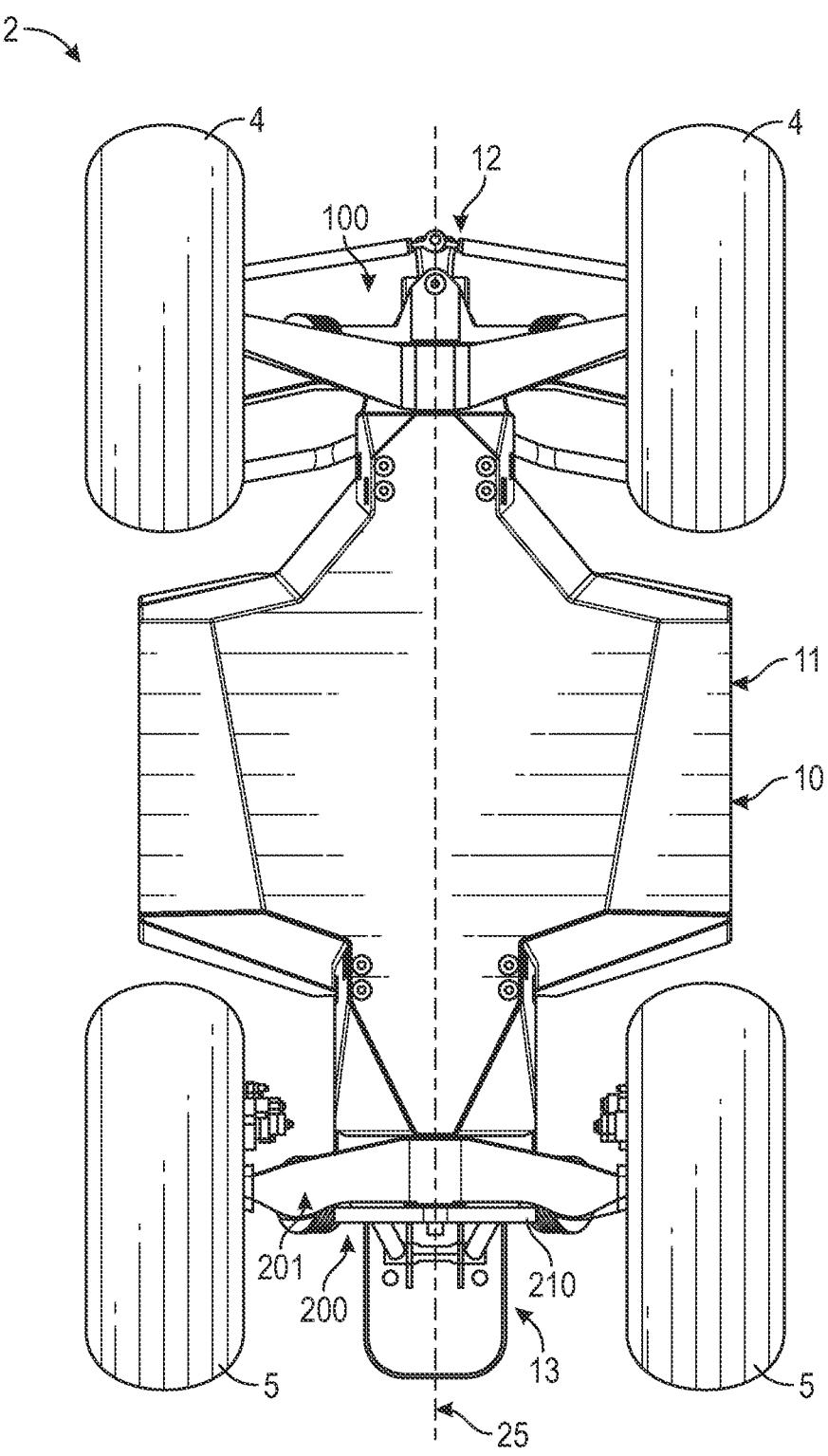
FIG. 6 is a bottom view of the vehicle of FIG. 1.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

Referring to FIGS. 1-6, a personal transportation vehicle, or recreational vehicle 2 is shown including a pair of front ground engaging members 4 and a pair of rear ground engaging members 5 supporting a frame 10. In the present embodiment, ground engaging members 4, 5 are wheels. In various embodiments, ground engaging members 4, 5 are tracks, skis, or other types of ground engaging members. Frame 10 generally includes a middle portion 11, a front portion 12, and a rear portion 13. Vehicle 2 also includes a steering assembly 150 coupled to the front portion 12 and laterally positioned intermediate front ground engaging members 4 and steeringly coupled to front ground engaging members 4 to direct vehicle 2. Vehicle 2 also includes a seating assembly 20 coupled to frame 10, illustratively rear portion 13 of frame 10 at a position laterally intermediate rear ground engaging members 5. Illustratively, each of steering assembly 150 and seating assembly 20 are positioned along a vehicle centerline 25.

In the present embodiment, vehicle 2 comprises a front suspension 100 coupled to the front portion 12 and a rear suspension 200 coupled to the rear portion 13. Front suspension 100 is configured to couple between front portion 12 and front ground engaging members 4. Rear suspension 200 is configured to couple between rear portion 13 and rear ground engaging members 5.

Steering assembly 150 comprises a steering shaft 151 extending upwardly from the front portion 12. Steering assembly 150 also comprises a right handlebar 152, a left handlebar 153, a right hand cover bar 154 and a left hand cover bar 155. A connector assembly 156 couples each of right handlebar 152, left handlebar 153, right hand cover bar 154, left hand cover bar 155 to the steering shaft 151. A user is able to grasp each of right handlebar 152 and left handlebar 153 to provide a steering force to the front ground engaging members 4 through steering assembly 150. Steering assembly 150 also includes a first steering arm 157 and a second steering arm 158 configured to transfer the steering force to each of front ground engaging members 4. Steering assembly 150 also includes an adjustment assembly 160 coupled between steering shaft 151 and steering arms 157, 158. Adjustment assembly 160 will be explained in greater detail herein.

Figure 10:
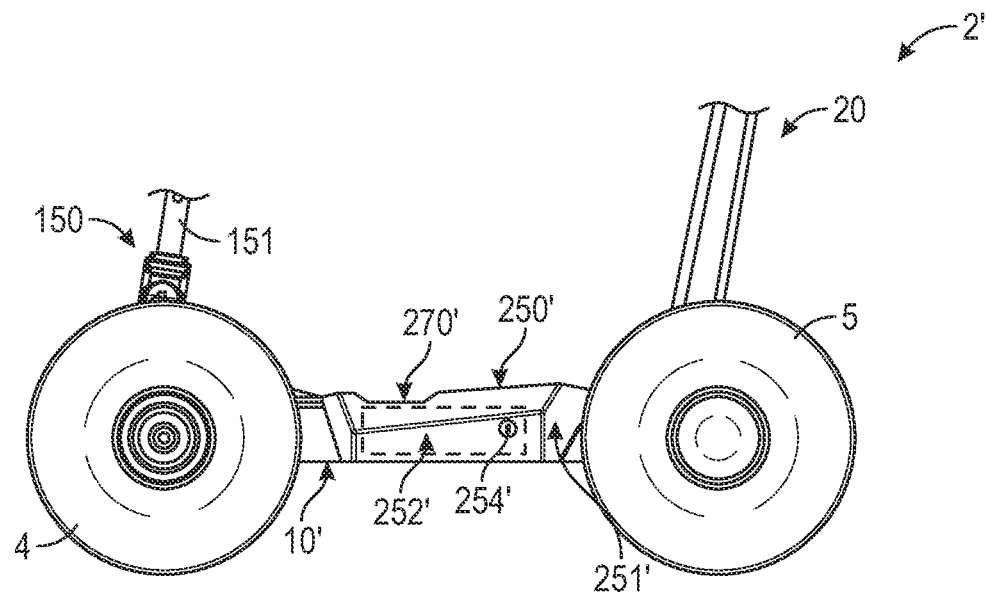
FIG. 10 is a left side view of an alternative vehicle of the present disclosure with a tub side cover.
Figure 11:
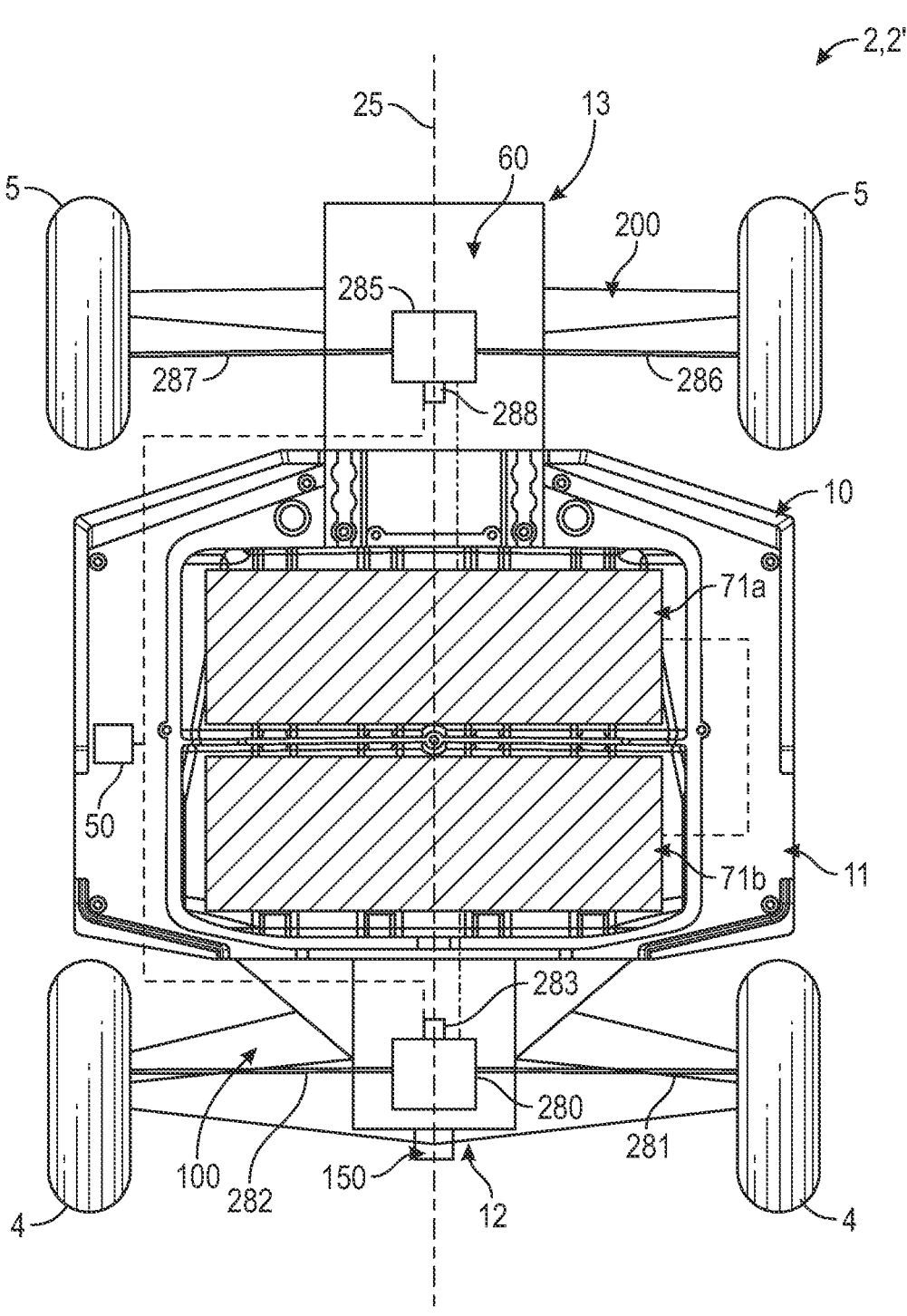
FIG. 11 is a diagrammatic top view of a powertrain of a vehicle of the present disclosure.
Figure 12:
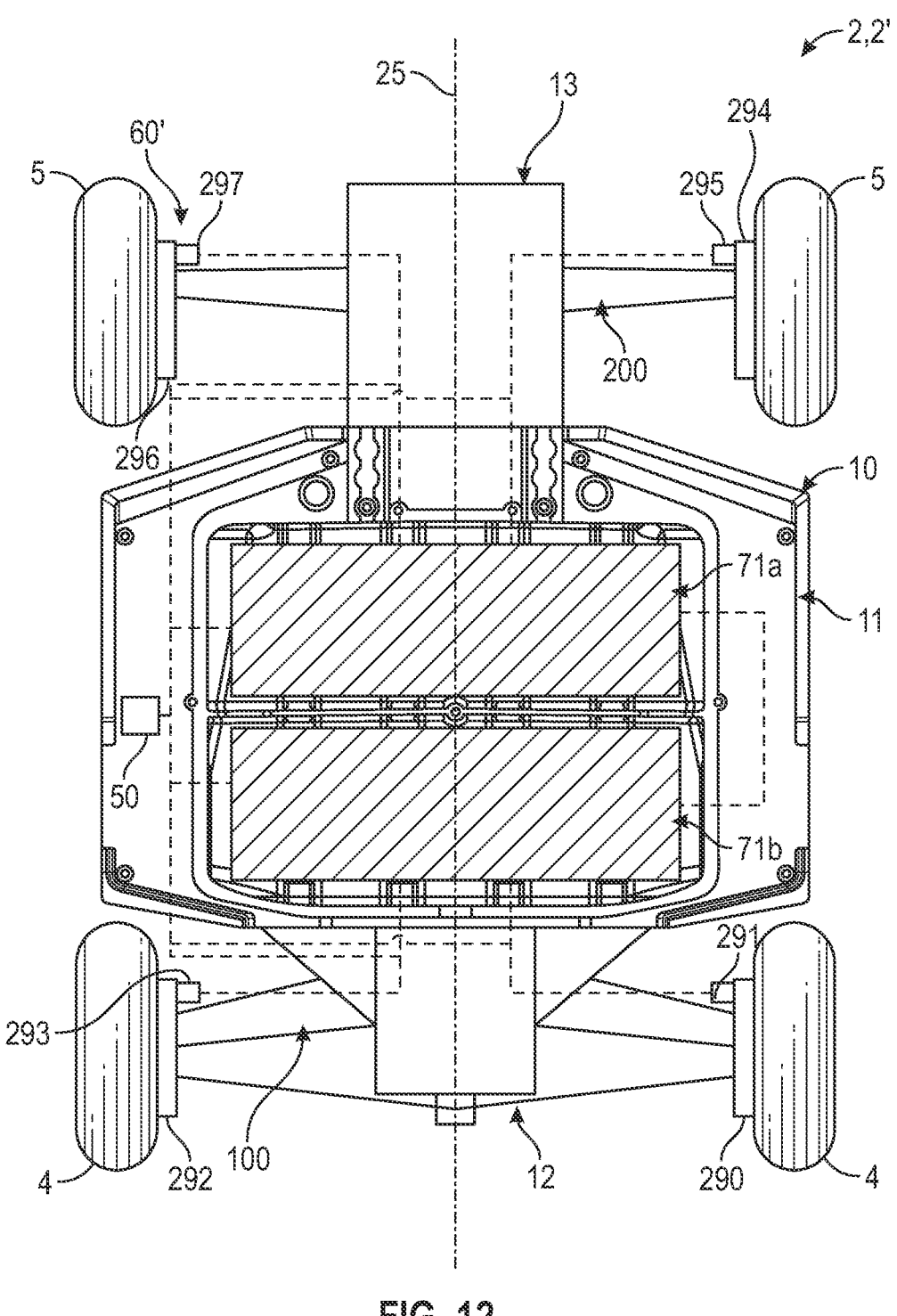
FIG. 12 is a diagrammatic top view of an alternate powertrain of a vehicle of the present disclosure.

Now referring to FIGS. 7-13, vehicle 2 also includes a powertrain 60 (FIG. 11) configured to provide power to at least one of the ground engaging members 4, 5. In the present embodiment, powertrain 60 includes battery assembly 70 (FIG. 11) comprising a plurality batteries 71a, 71b, a battery controller 72, and a motor assembly 80 comprising a first motor 280, a second motor 285, a first motor controller 283 coupled to the first motor 280 and a second motor controller 288 coupled to the second motor 285. In the present embodiment, each of battery controller 72 and motor controllers 283, 288 are communicably coupled to a controller 50 (FIG. 12). Controller 50 is configured to send instructions to battery controller 72 and motor controllers 283, 288.

Figure 13:
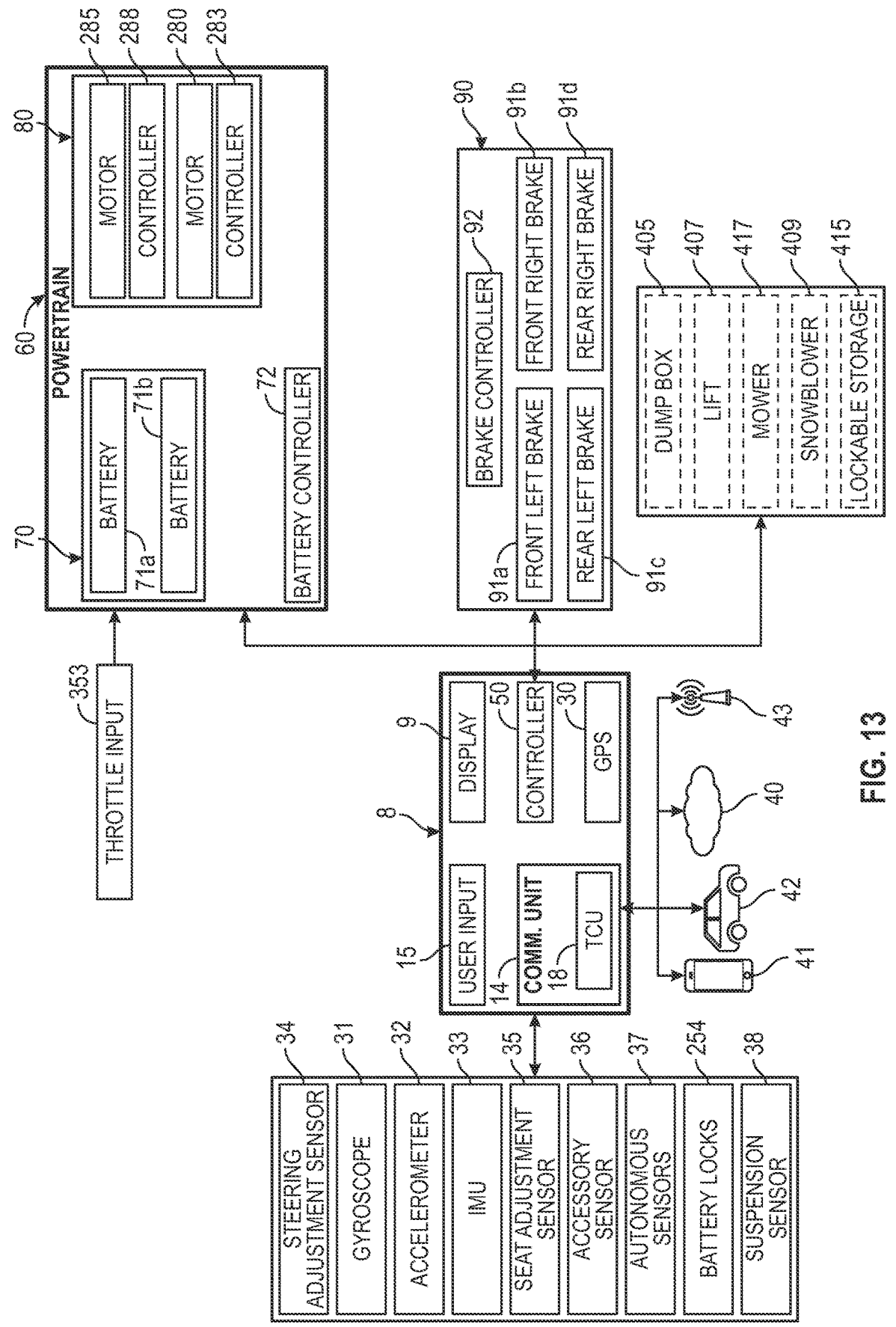
FIG. 13 is a diagrammatic control diagram of a vehicle with the powertrain of FIG. 11.
Figure 13A:
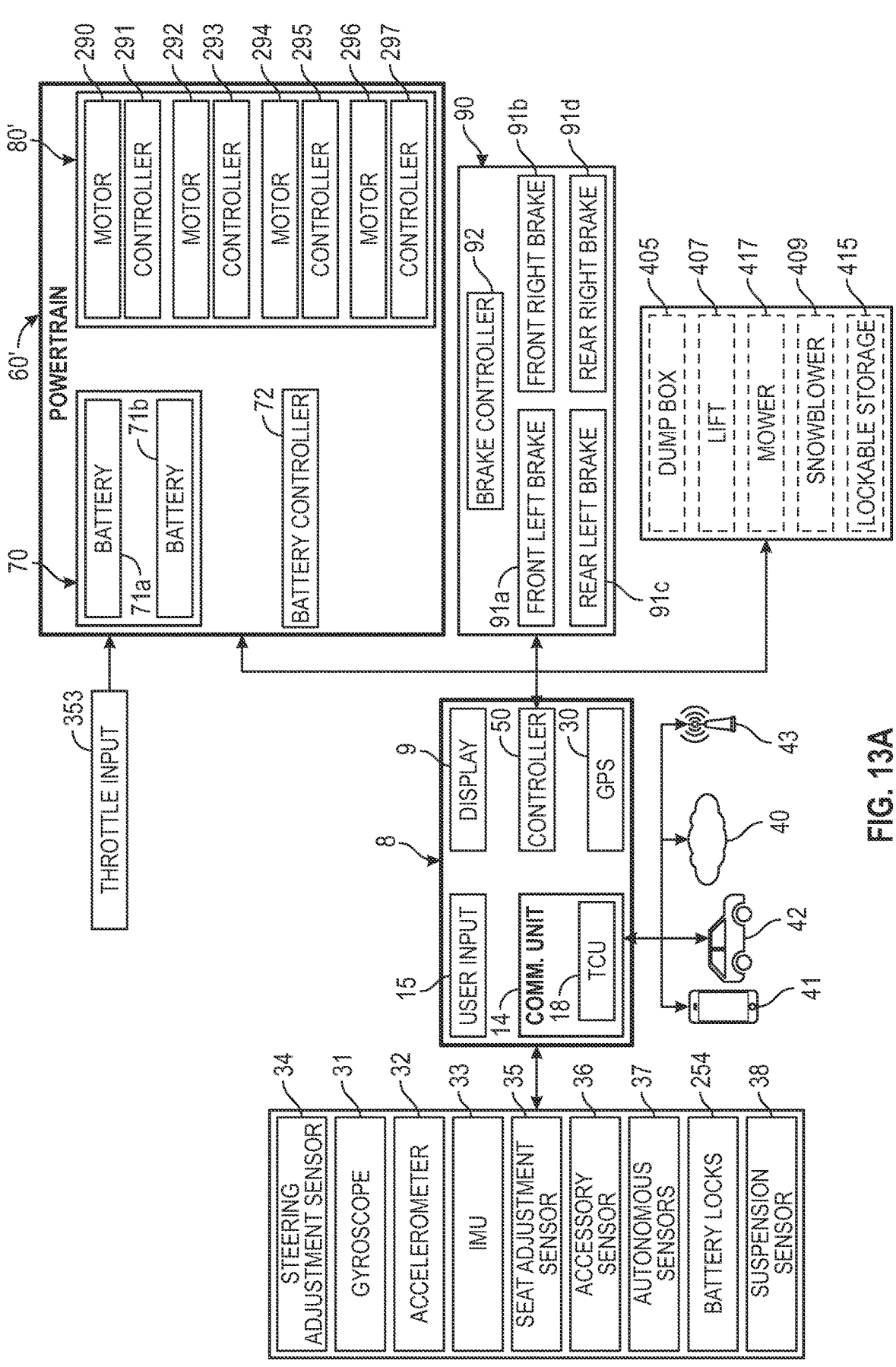
FIG. 13A is a diagrammatic control diagram of a vehicle with the alternate powertrain of FIG. 12.

In the present embodiment, and as shown in at least FIG. 13, vehicle 2 also includes a brake assembly 90 comprising a first or front left brake 91a, a second or front right brake 91b, a third or rear left brake 91c, a fourth or rear right brake 91d, and a brake controller 92 configured to control each of brakes 91a, 91b, 91c, 91d. In the present embodiment, brake assembly 90 is operably coupled to controller 50 and configured to be controlled by a user input, such as a brake input at a brake foot pedal or hand lever (not shown). In various embodiments, the brake lever is positioned adjacent either of right handlebar 152 or left handlebar 153. In the present embodiment, the brake lever is positioned adjacent left handlebar 153. In the present embodiment, front left brake 91a is operably coupled to the left front ground engaging member 4, the front right brake 91b is operably coupled to the right front ground engaging member 4, the rear left brake 91c is operably coupled to the rear left ground engaging member 5 and the rear right brake 91d is operably coupled to the rear right ground engaging member 5.

Referring still to FIG. 13, vehicle 2 may also include a user interface 8 configured with a display 9. In the present embodiment, user interface 8 is supported by vehicle 2. In various embodiments, user interface 8 is a mobile device removably couplable to vehicle 2. Display 9 may be configured to show a plurality of screen layouts that show a plurality of indicators. In various embodiments, display 9 may be configured to show indicators such as a vehicle speed, a state of charge, a vehicle location, a geographical map, an indicator of the location of another vehicle, a directional heading, or other indicators. User interface 8 is generally positioned on steering assembly 150. In the present embodiment, user interface 8 is positioned adjacent connector assembly 156 and directed or faces towards a user operating vehicle 2. User interface 8 may also include a global position system (GPS) or location determiner 30 configured to receive a geographical location of user interface 8 and thereby vehicle 2. In various embodiments, display 9 is configured to show the geographical location of vehicle 2 on one or more screen layouts. In various embodiments, GPS 30 is separate from user interface 8 and supported elsewhere on vehicle 2.

User interface 8 also includes a communications controller or communications unit 14 configured to provide channels of communication to and from vehicle 2. Communications controller 14 may include a Telematics Control Unit (TCU) 18 configured to communicably couple vehicle 2 to a cloud network 40. Communications controller 14 may also be communicably coupled to a mobile device 41, another vehicle 42 (similar to vehicle 2, or another type of recreational vehicle, utility vehicle, automobile, or the like), and/or a cellular network 43. In various embodiments, communications controller 14 may be configured with a radio (not shown) or other type of vehicle-to-vehicle communication network. Additional details regarding vehicle communications and connectedness can be found in U.S. application Ser. No. 17/506,249, filed Oct. 20, 2021, titled "VEHICLE COMMUNICATION AND MONITORING," and U.S. Pat. No. 10,038,977, issued Jul. 31, 2018, titled "RECREATIONAL VEHICLE GROUP MANAGEMENT SYSTEM," the entire disclosures of which are expressly incorporated by reference herein.

In the present embodiment, user interface 8 may also include a plurality of inputs 15 configured to allow selection, deselection, or navigation on display 9. Inputs 15 may be soft keys, hard keys, knobs, sliders, switches, or other types of selectable inputs. User interface 8 is communicably coupled to a controller 50. In various embodiments, controller 50 is a part of user interface 8. In various embodiments, controller 50 is supported by vehicle 2 but positioned apart from user interface 8. Controller 50 is configured to receive signals from various sensors, user inputs, and other vehicle components, and send signals to various vehicle components, as will be described in greater detail herein. Controller 50 may be configured with a plurality of instructions for operation of vehicle 2.

Vehicle 2 may also include a gyroscope 31 supported by frame 10 and operably coupled to the controller 50. Gyroscope 31 is configured to measure a vehicle orientation, an angular velocity, and an angular acceleration. Vehicle 2 may also include an accelerometer 32 operably coupled to the controller 50. Accelerometer 32 is configured to measure vehicle body accelerations in particular directions. Vehicle 2 may also include an inertial measurement unit (IMU) 33 operably coupled to the controller 50. IMU 33 is configured to measure a G-force experienced by vehicle 2, an angular velocity and a vehicle orientation.

Figure 7:
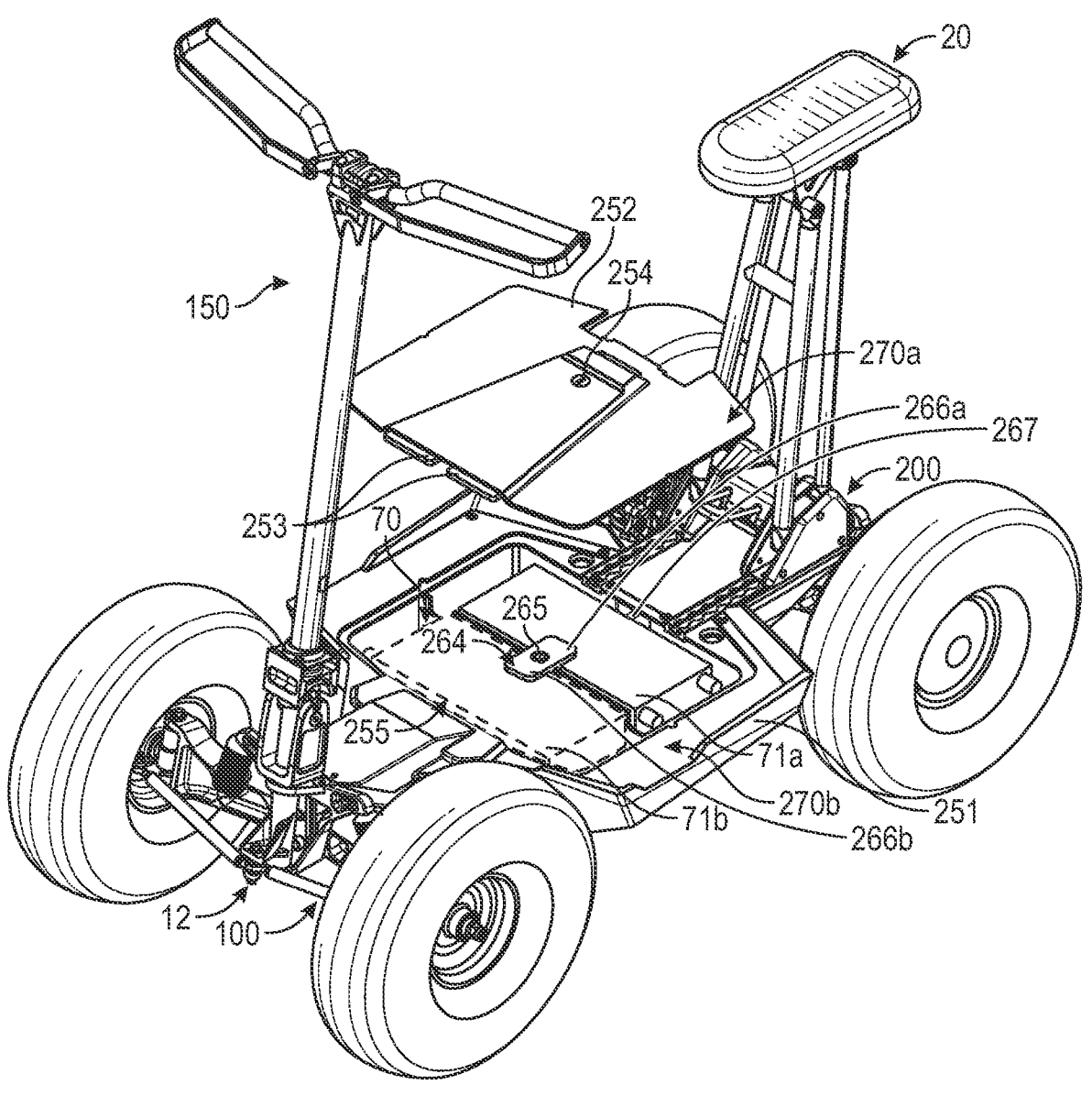
FIG. 7 is a front left perspective view of the vehicle of FIG. 1 with an exploded view of a tub.

Referring again to FIGS. 1-10, middle portion 11 is generally configured with a tub 250 configured to hold battery assembly 70. Battery assembly 70 comprises a battery 71 (FIG. 7). Generally, battery 71 comprises a first battery 71a and a second battery 71b. In various embodiments, vehicle 2 only includes first battery 71a. In various embodiments, vehicle 2 includes a third battery (not shown) and a fourth battery (not shown). Tub 250 comprises a tub body 251 and a tub cover 252. Tub body 251 generally comprises a tub recess 255, and in various embodiments, tub recess 255 includes a first recess 255a and a second recess 255b separated by a battery divider 256. Battery divider 256 generally extends the entire span of recess 255 in a vehicle width direction, generally orthogonal to vehicle centerline 25. Tub recess 255 also includes a floor 257 which also comprises a plurality of floor supports 259 extending upwardly from floor 257. Batteries 71a, 71b are configured to rest on floor supports 259 so that air is able to flow underneath and around batteries 71a, 71b which may help with the thermal management of batteries 71a, 71b. Tub recess 255 also includes a front face 261a, a rear face 261b, a left side face 261c, and a right side face 261d, each extending upwardly from floor 257. A plurality of side supports 260 are positioned on each of front face 261a and rear face 261b. Side supports 260 are sized and shaped so that a distance 262 between a side support 260 on front face 261a and battery divider 256 is approximately equal to a distance 262 between a side support 260 on rear face 261b and battery divider 256. Also, distance 262 is approximately equal to a battery width 263.

Figure 8:
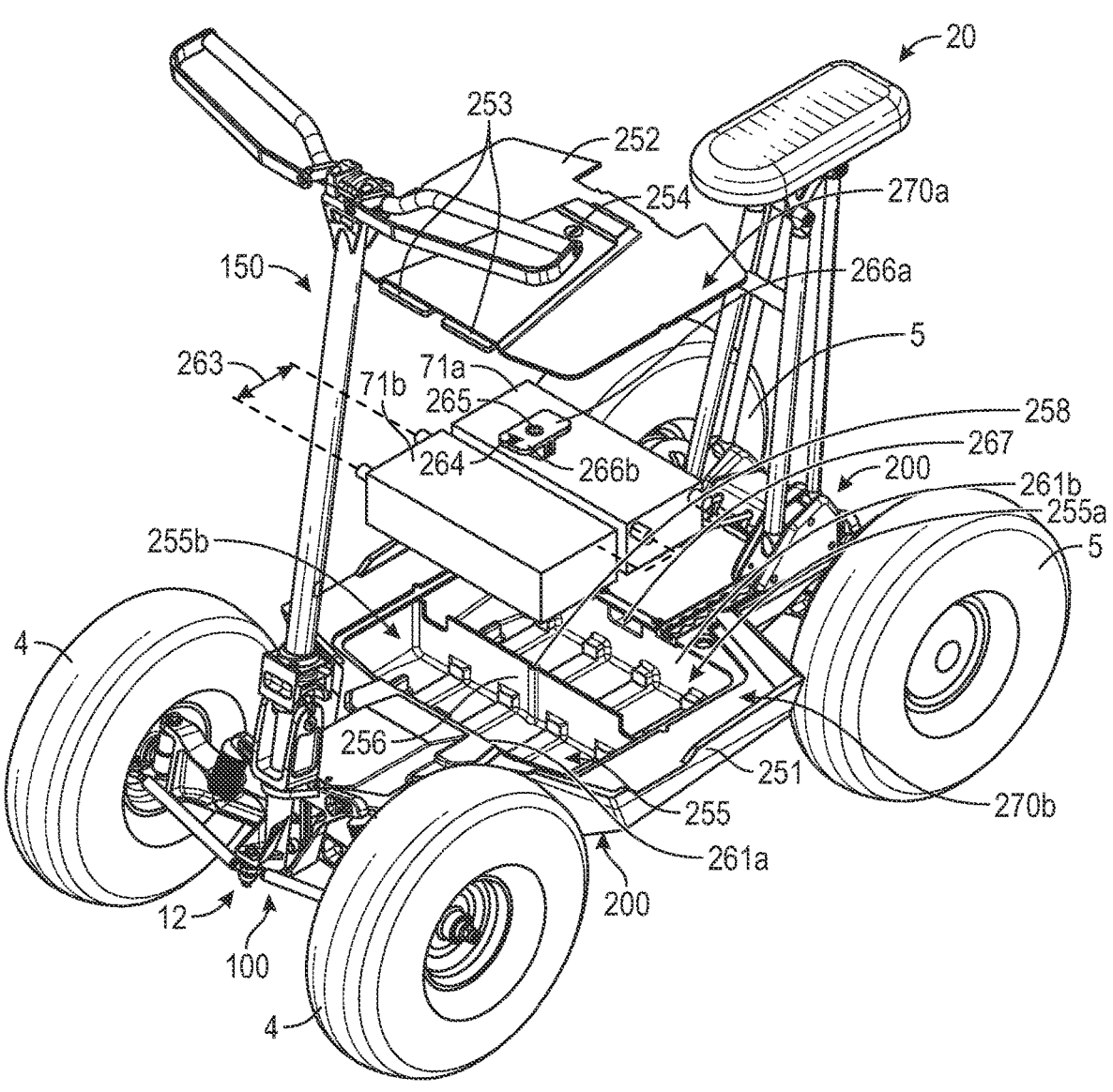
FIG. 8 is a front left perspective view of the vehicle of FIG. 1 with an exploded view of the tub and a battery.
Figure 9:
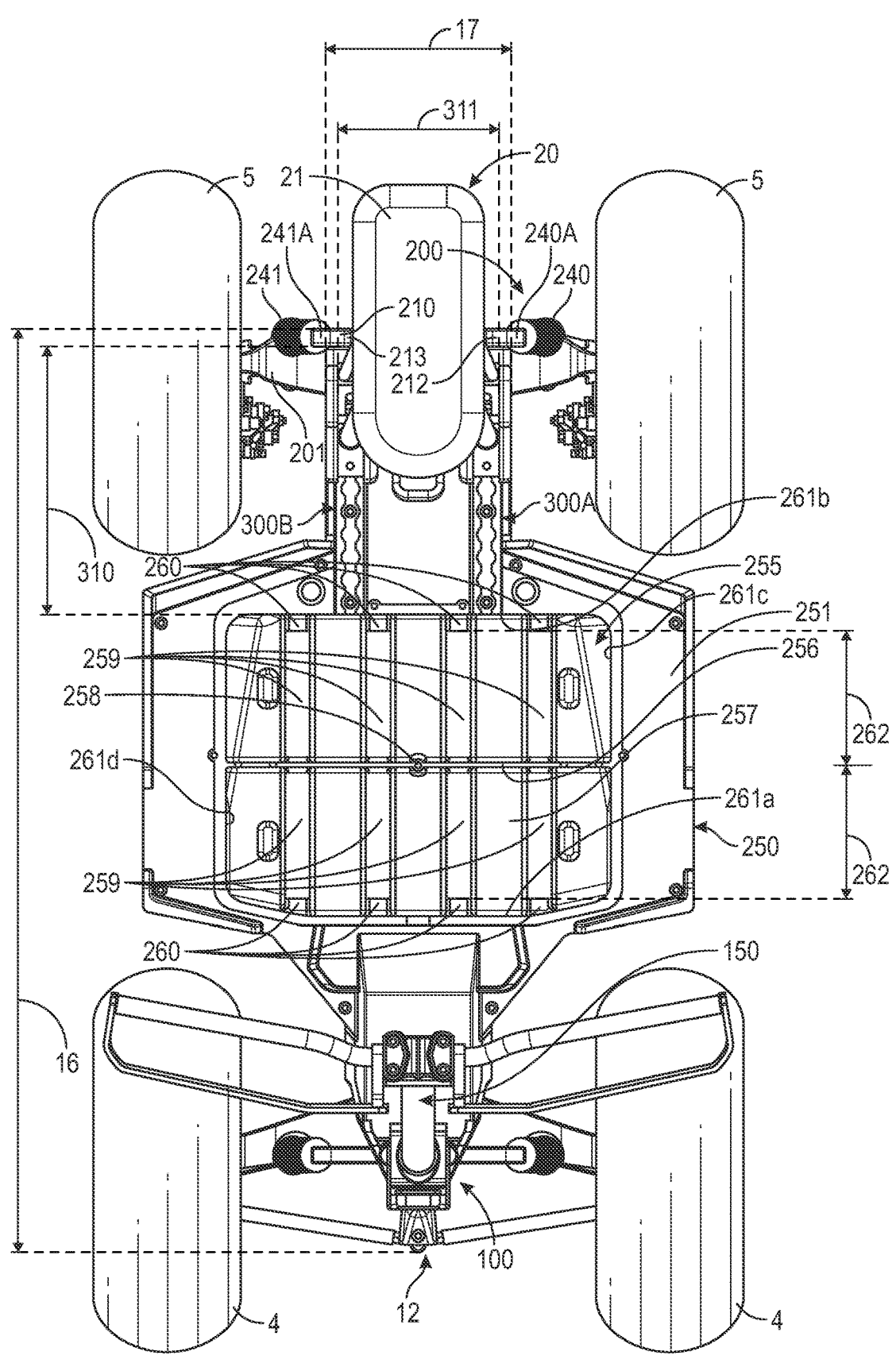
FIG. 9 is a top view of the vehicle of FIG. 1 without a tub cover.

Referring now to FIGS. 7-9, battery divider 256 includes an aperture 258 positioned at its center point. A retention member may be included with tub 250. In one embodiment, the retention member may be a threaded clamp 264 which is configured to fit over battery divider 256. A threaded aperture 265 of clamp 264 is configured to receive a fastener (not shown) that extends through threaded clamp 264 and into aperture 258, thereby coupling threaded clamp 264 to battery divider 256. Threaded clamp 264 comprises a first wing 266a and a second wing 266b. As best seen in FIG. 7, when batteries 71a, 71b are placed within tub recess 255a, 255b, respectively, and threaded clamp 264 is coupled to battery divider 256, first wing 266a is configured to clamp downwardly on battery 71a and second wing 266b is configured to clamp downwardly on battery 71b. That is, threaded clamp 264 is configured to hold multiple batteries (e.g., batteries 71a, 71b) in place within tub recess 255.

Tub cover 252 is generally shaped and sized to conceal tub recess 255 and batteries 71a, 71b. Tub cover 252 comprises a pair of tabs 253 configured to engage commensurately sized openings (not shown) in tub body 251. Tub cover 252 is configured to generally rotate into and out of position about tabs 253. Tub cover 252 has an upper surface 270a which is configured to support an operator of vehicle 2. Further, tub body 251 has an upper surface 270b which is configured to support an operator of vehicle 2. Upper surfaces 270a, 270b are configured as a support area 270 for an operator of vehicle 2. In this way, tub 250 is configured to support both battery 71 and an operator of vehicle 2. Illustratively, each of front portion 12, middle portion 11, and rear portion 13 comprises an upper surface. In various embodiments, tub cover 252 comprises a lock 254 configured to lock tub cover 252 to tub body 251. Lock 254 may be a cylinder lock with a key, a combination lock, a biometric lock, or another type of lock.

An operator of vehicle 2 may unlock or lock tub cover 252 to tub body 251 in order to provide access or prohibit access to batteries 71a, 71b. In various embodiments, lock 254 may be operably coupled to controller 50 and an operator of vehicle 2 may provide an input to user interface 8 configured to lock or unlock lock 254, thereby remotely allowing access to tub recess 255. In other embodiments, lock 254 may be operated by a physical or mechanical key inserted into a portion of lock 254. An operator of vehicle 2 may remove tub cover 252 to reveal batteries 71a, 71b. Further, an operator of vehicle 2 may remove threaded clamp 264 to allow removal of batteries 71a, 71b from tub recesses 255a, 255b or allow insertion of batteries 71a, 71b into tub recesses 255a, 255b.

In the present embodiment, battery divider 256 is configured to support tub cover 252, providing greater rigidity when an operator stands on support area 270. In various embodiments, battery divider 256 extends longitudinally from front face 261a to rear face 261b. In various embodiments, battery divider 256 extends along vehicle centerline 25. Tub 250 also includes channel 267 extending longitudinally rearwardly from tub recess 255 into rear portion 13. Channel 267 runs along vehicle centerline 25 and extends through rear portion 13. Another channel (not shown) mirrors channel 267 along vehicle centerline 25 within front portion 12 and is also fluidly coupled to tub recess 255. Each channel is configured to receive electrical wires coupled to batteries 71a, 71b.

Now referring to FIG. 10, an alternative embodiment of frame 10 of an alternate vehicle 2' is shown as frame 10' which comprises an alternate tub 250'. Tub 250' includes a tub body 251' with a tub access panel 252' positioned on an outside exterior wall of tub 250'. Tub access panel 252' is positioned longitudinally intermediate front ground engaging members 4 and rear ground engaging members 5. In various embodiments, tub access panel 252' includes a lock 254' configured to lock and unlock tub access panel 252' from tub body 251'. In tub 250', batteries 71a, 71b are placed within vehicle 2 by inserting them into tub body 251' from the side through tub access panel 252'. Tub access panel 252' may also include tabs (not shown) configured to nest within corresponding openings (not shown) in tub body 251' to couple tub access panel 252' to tub body 251'. Tub 250' allows a user to remove or insert batteries 71a, 71b without having to move any of the support area 270. Additionally, tub 250' has a support area 270' configured to support an operator of vehicle 2'.

Now referring to FIG. 11, powertrain 60 will be further explained. In the present embodiment, first motor 280 is a front motor and second motor 285 is a rear motor 285. Each of front motor 280 and rear motor 285 are electronically coupled to battery assembly 70. Further, each of front motor 280 and rear motor 285 are communicably coupled to controller 50. In the present embodiment, front motor 280 is supported by frame 10, 10', and more specifically, front motor 280 is supported by front portion 12. Further, front motor 280 is positioned laterally intermediate front ground engaging members 4. Rear motor 285 is supported by frame 10, 10', and more specifically, rear motor 285 is supported by rear portion 13. Rear motor 285 is positioned laterally intermediate rear ground engaging members 5. Front motor 280 is coupled to each of the front ground engaging members 4 by a pair of halfshafts 281, 282. Rear motor 285 is coupled to each of the rear ground engaging members 5 by a pair of halfshafts 286, 287.

Illustratively, each of front motor 280 and rear motor 285 are positioned along vehicle centerline 25. Further, front motor 280 is positioned longitudinally rearward of steering assembly 150, however, in other embodiments, front motor 280 may be vertically aligned with at least a portion of steering assembly 150. In various embodiments, rear motor 285 is positioned vertically below seating assembly 20 and may be vertically aligned with a portion of seating assembly 20. In various embodiments, vehicle 2 may only comprise rear motor 285. In various embodiments, vehicle 2 may only comprise front motor 280. Controller 50 provides instructions to each of, or only one of, front motor 280 and rear motor 285 to provide rotational power to front ground engaging members 4 and/or rear ground engaging members 5, respectively. In various embodiments, front motor 280 includes a motor controller 283 which receives the input electrical energy from battery assembly 70 as well as instructions from controller 50 and operates front motor 280 in accordance with the instructions from controller 50. Similarly, rear motor 285 includes a motor controller 288 which receives the input electrical energy from battery assembly 70 and instructions from controller 50 and operates rear motor 285 in accordance with the instructions from controller 50.

Motor controllers 283, 288 are configured to control a motor characteristic of front motor 280 and rear motor 285, respectively. In various embodiments, the motor characteristic is a motor speed, a torque output, a motor acceleration, a braking force, a current (Amps) value, a voltage (V) value, a magnetic flux value, or other motor characteristic. Motor controllers 283, 288 may be integral to motors 280, 285, respectively, or may otherwise be physically separate from motors 280, 285.

Referring now to FIG. 12, an alternate embodiment of powertrain 60 is provided and shown as powertrain 60'. Alternate powertrain 60' comprises an alternate motor assembly 80' which includes a first hub motor 290 coupled to a front left ground engaging member 4, a second hub motor 292 coupled to a front right ground engaging member 4, a third hub motor 294 coupled to a rear left ground engaging member 5, and a fourth hub motor 296 coupled to a rear right ground engaging member 5. Each of hub motors 290, 292, 294, 296 are electrically coupled to battery assembly 70, and hub motors 290, 292, 294, 296 are communicably coupled to controller 50. In various embodiments, first hub motor 290 includes a first motor controller 291, second hub motor 292 includes a second motor controller 293, third hub motor 294 includes a third motor controller 295, and fourth hub motor 296 includes a fourth motor controller 297. Each of motor controllers 291, 293, 295, 297 receives the input electrical energy from battery assembly 70 as well as instructions from controller 50 and operates hub motors 290, 292, 294, 296 in accordance with the instructions from controller 50.

Motor controllers 291, 293, 295, 297 operate and control a motor characteristic of each of first hub motor 290, second hub motor 292, third hub motor 294, and fourth hub motor 296, respectively. In various embodiments, the motor characteristic is a motor speed, a torque output, a motor acceleration, a braking force, a current (Amps) value, a voltage (V) value, a magnetic flux value, or other motor characteristic. Motor controllers 291, 293, 295, 297 may be integral to hub motors 290, 292, 294, 296, respectively, or otherwise may be physically separate from motors 290, 292, 294, 296.

In the present embodiment, any of vehicles 2, 2' is capable of operating with either of powertrain 60 or powertrain 60'.

Figure 14:
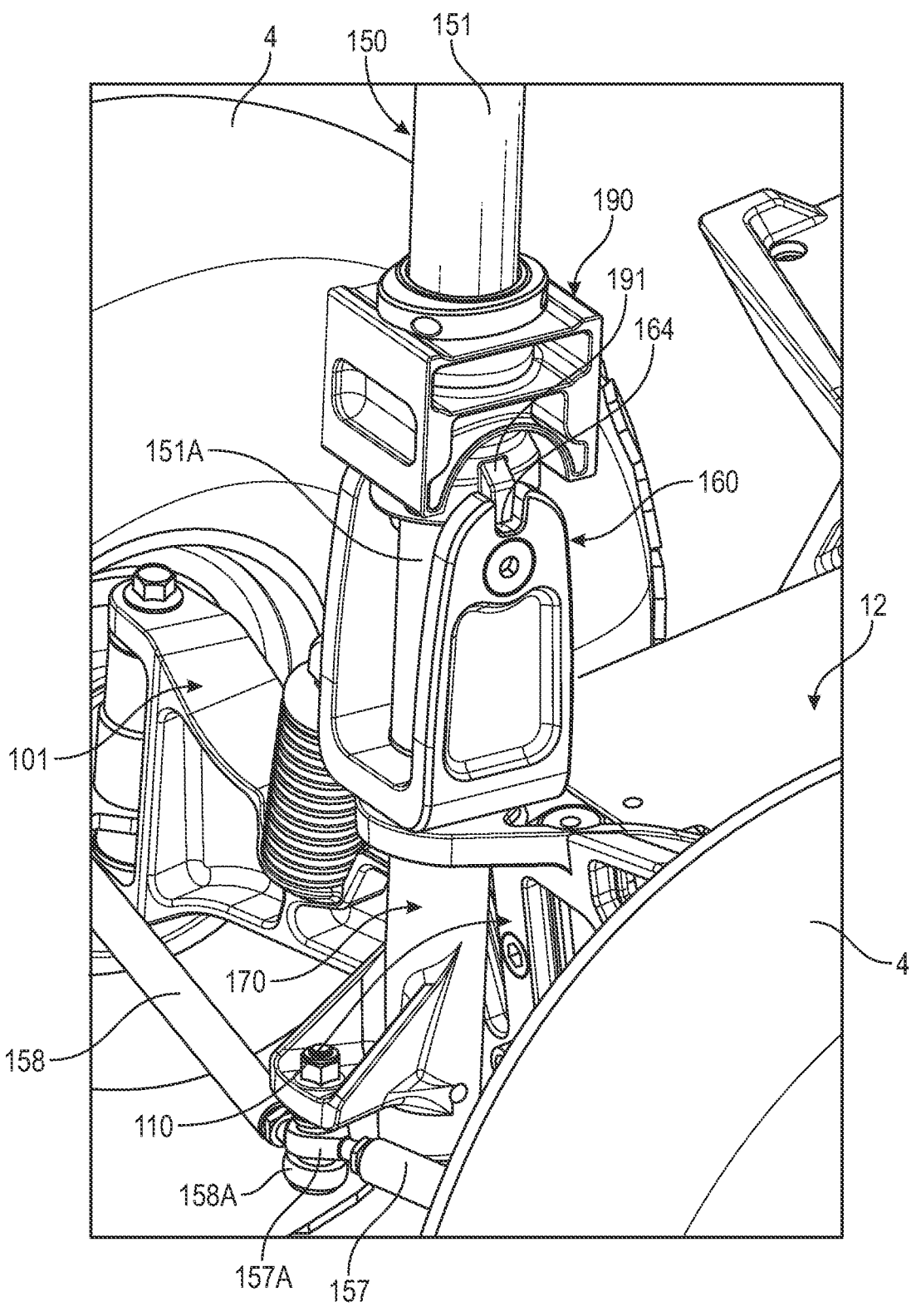
FIG. 14 is a front left perspective view of a steering assembly and front suspension of the vehicle of FIG. 1.
Figure 15:
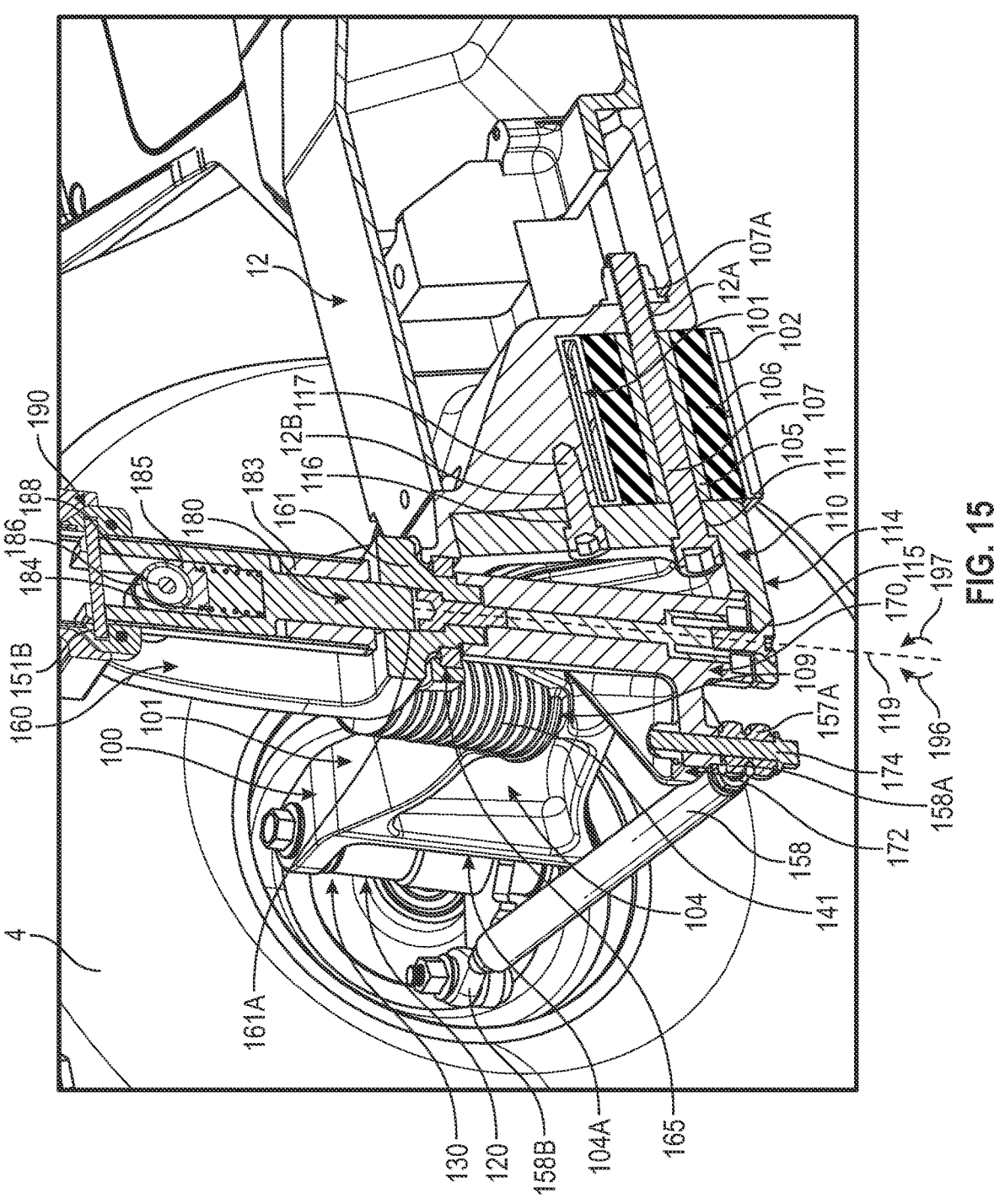
FIG. 15 is a section view of the steering assembly and front suspension of FIG. 14 taken along section 15-15 in FIG. 2.
Figure 16:
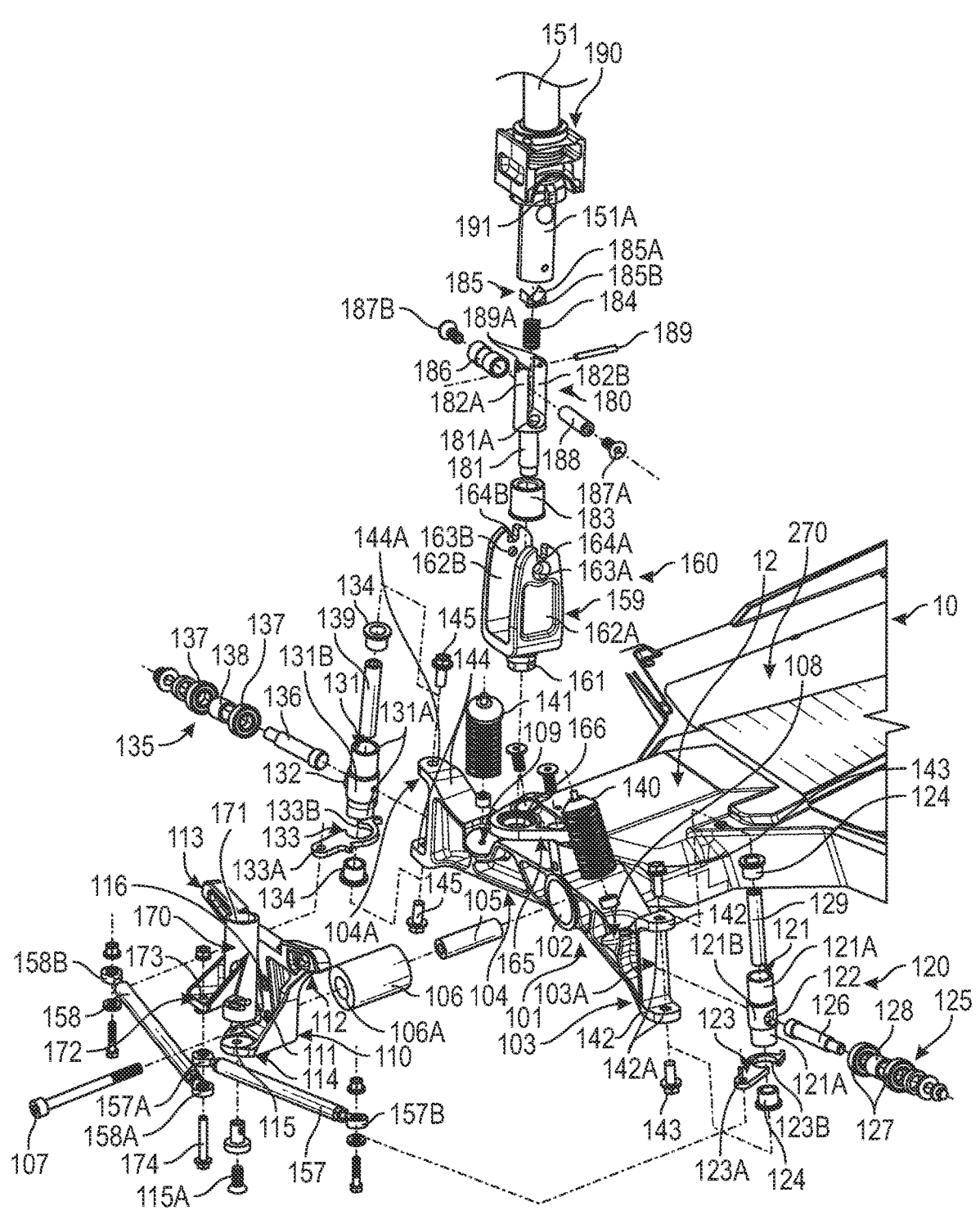
FIG. 16 is an exploded view of the steering assembly and front suspension of FIG. 14.

Referring now to FIGS. 14-16, suspension 100 and steering assembly 150 will be explained in greater detail. Front suspension 100 comprises a suspension arm 101 extending between front ground engaging members 4. Suspension arm 101 includes a central connection aperture 102 positioned at a lateral center portion of suspension arm 101. Suspension arm 101 also includes a first side arm 103 and a second side arm 104. Central connection aperture 102 is sized and shaped to receive a bearing 106, which includes an aperture 106A which is shaped and sized to receive a sleeve 105. Illustratively, sleeve 105 is received within bearing 106, and bearing 106 and sleeve 105 are received within central connection aperture 102.

First side arm 103 includes a first wheel receiving joint 103A and second side arm 104 comprises a second wheel receiving joint 104A. First wheel receiving joint 103A includes a pair of oppositely disposed, parallel tabs 142 each including an aperture 142A. A first wheel linkage assembly 120 is coupled to first wheel receiving joint 103A intermediate tabs 142. First wheel linkage assembly 120 includes a sleeve 129 and a pair of grommets 124 positioned on either end of sleeve 129. Grommets 124 and sleeve 129 are sized to extend between tabs 142. A support sleeve 121 extends around sleeve 129 and extends between tabs 142. The support sleeve 121 includes an aperture 122 facing generally outward from vehicle centerline 25. The support sleeve 121 also comprises an upper and lower portion 121A and a middle portion 121B positioned vertically intermediate upper and lower portion 121A. Support sleeve 121 comprises an irregular circumference along its height, that is, upper and lower portion 121A comprise a first sized circumference, and middle portion 121B comprises a second sized circumference, and the second circumference is greater than the first circumference. A steering follower 123 comprises a first aperture 123A and an arced aperture 123B. The arced aperture 123B is sized and shaped to couple to lower portion 121A of support sleeve 121. Arced aperture 123B may be keyed to lower portion 121A so that a rotation of steering follower 123 rotates the support sleeve 121.

Wheel linkage assembly 120 also comprises a wheel coupler assembly 125. Wheel coupler assembly 125 includes a shoulder screw 126 configured to sit within aperture 122. Shoulder screw 126 may include a threaded portion configured to thread to aperture 122, which may be threaded. Wheel coupler assembly 125 also comprises a pair of bearings 127 and a bushing 128 that are placed around shoulder screw 126 and are configured to sit, and couple, within front ground engaging member 4. Bearings 127 and bushing 128 are configured to support shoulder screw 126 within front ground engaging member 4.

Illustratively, second wheel receiving joint 104A is a mirrored version of first wheel receiving joint 103A. That is, second wheel receiving joint 104A includes a pair of oppositely disposed, parallel tabs 144 each including an aperture 144A. A second wheel linkage assembly 130 is positioned intermediate tabs 144. Second wheel linkage assembly 130 is a similar, mirrored version of first wheel linkage assembly 120. Wheel linkage assembly 130 includes a sleeve 139 and a pair of grommets 134 positioned on either end of sleeve 139. Grommets 134 and sleeve 139 extend between tabs 144. A support sleeve 131 extends around sleeve 139 and are sized to extend between tabs 144. The support sleeve 131 includes an aperture 132 facing generally outward from vehicle centerline 25. The support sleeve 131 also comprises an upper and lower portion 131A and a middle portion 131B positioned vertically intermediate upper and lower portion 131A. Support sleeve 131 comprises an irregular circumference along its height, that is, upper and lower portion 131A comprise a first sized circumference, and middle portion 131B comprises a second sized circumference, and the second circumference is greater than the first circumference. A steering follower 133 comprises a first aperture 133A and an arced aperture 133B. The arced aperture 133B is sized and shaped to couple to lower portion 131A of support sleeve 131. Arced aperture 133B may be keyed to lower portion 131A so that a rotation of steering follower 133 rotates the support sleeve 131.

Second wheel linkage assembly 130 also comprises a wheel coupler assembly 135. Wheel coupler assembly 135 includes a shoulder screw 136 configured to sit within aperture 132. Shoulder screw 136 may include a threaded portion configured to thread to a threaded aperture 132. That is, shoulder screw 136 is coupled to support sleeve 131 at aperture 132. Wheel coupler assembly 135 also comprises a pair of bearings 137 and a bushing 138 that are placed around shoulder screw 136 and are configured to sit, and couple, within front ground engaging member 4. Bearings 137 and bushing 138 are configured to support shoulder screw 136 within front ground engaging member 4.

Still referring to FIGS. 14-16, front suspension 100 also includes a support member 110 coupled to suspension arm 101. Support member 110 is also coupled to front portion 12 of frame 10 such that suspension arm 101 is positioned longitudinally intermediate support member 110 and front portion 12. Support member 110 includes an aperture 111 extending through support member 110 and configured to align with sleeve 105 and a fastener 107 is configured to extend through aperture 111 of support member 110 and sleeve 105 and a first aperture 12A within front portion 12. Fastener 107 is a screw or bolt configured to thread with a nut 107A, such that a clamping force is placed on front portion 12, suspension arm 101 and support member 110. Support member 110 comprises a second aperture 116 positioned vertically above aperture 111. Second aperture 116 is configured to align with a second aperture 12B in front portion 12. A fastener 117 extends through second aperture 116 and threads into second aperture 12B. Illustratively, fastener 117 is a screw or bolt and each of second aperture 116 and second aperture 12B are threaded such that when fastener 117 is threaded within second aperture 116 and second aperture 12B, support member 110 is coupled to front portion 12. Further, support member 110 is coupled to front portion 12 at two locations, and therefore support member 110 is rotationally fixed to front portion 12. Suspension arm 101 is coupled between support member 110 and front portion 12 and is capable of rotating relative to both support member 110 and front portion 12.

Suspension arm 101 comprises a first shock mounting portion 108 positioned on first side arm 103 and a second shock mounting portion 109 on second side arm 104. Further, support member 110 includes a first shock mounting arm 112 and a second shock mounting arm 113. A first biasing member 140 extends between first shock mounting portion 108 and first shock mounting arm 112 and a second biasing member 141 extends between second shock mounting portion 109 and second shock mounting arm 113. As suspension arm 101 rotates relative to support member 110 and front portion 12, first biasing member 140 and second biasing member 141 dampen the rotational motion of suspension arm 101. First biasing member 140 and second biasing member 141 may be a pneumatic shock absorber or a hydraulic shock absorber. First biasing member 140 and second biasing member 141 may be a spring, or other type of linear force element.

Support member 110 also comprises a tab 114 extending longitudinally forward from support member 110. Further, tab 114 comprises an aperture 115. Tab 114 generally creates an upward facing platform. Further, front portion 12 includes a tongue 165 extending longitudinally forward and vertically above suspension arm 101 and support member 110. Tongue 165 includes an aperture 166 facing generally upwardly. In the present embodiment, tab 114 and tongue 165 extend along nominally parallel planes.

Figure 25:
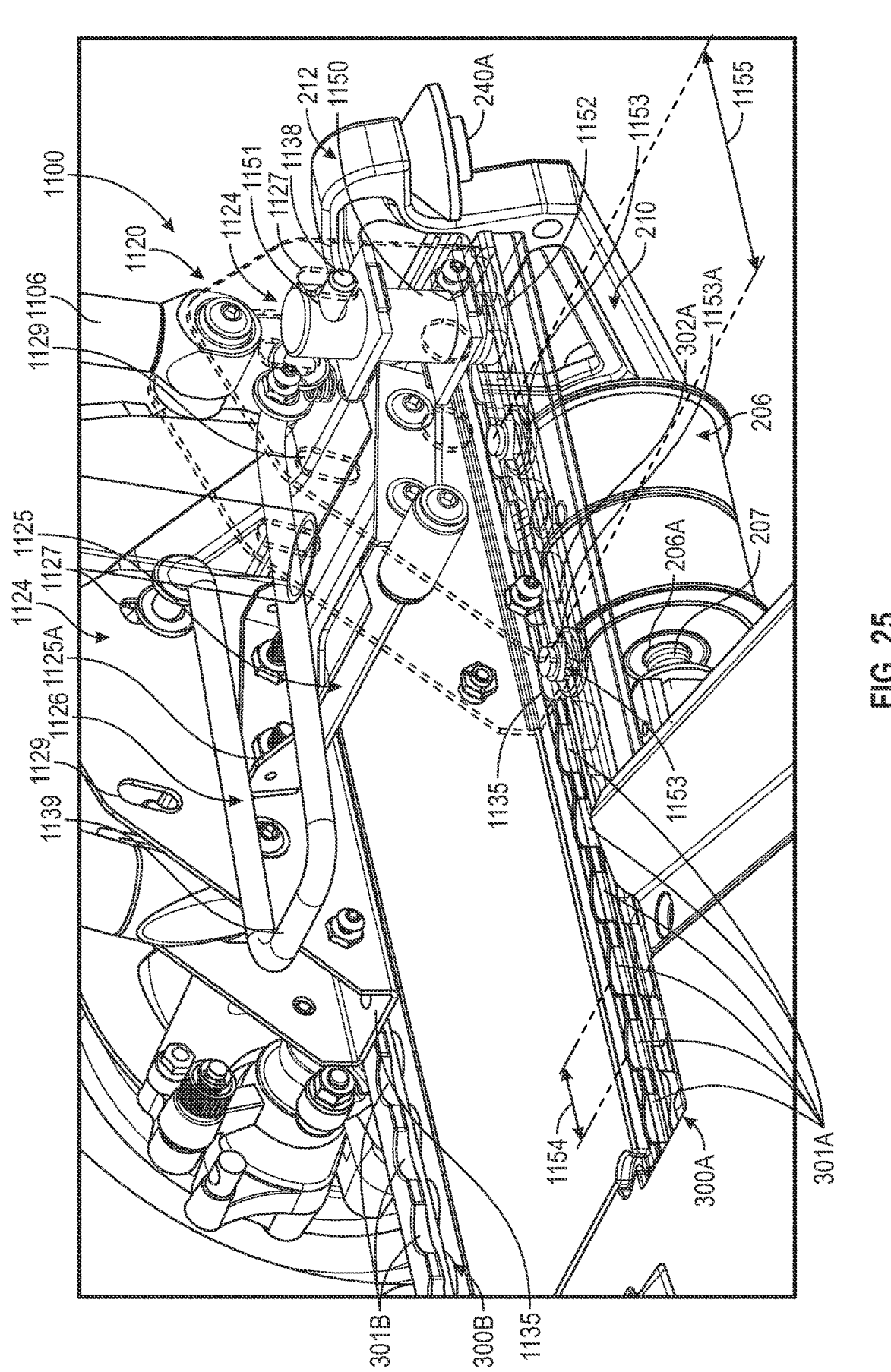
FIG. 25 is a front left perspective view of the seating base adjustment assembly of FIG. 24 in a locked position.
Figure 26:
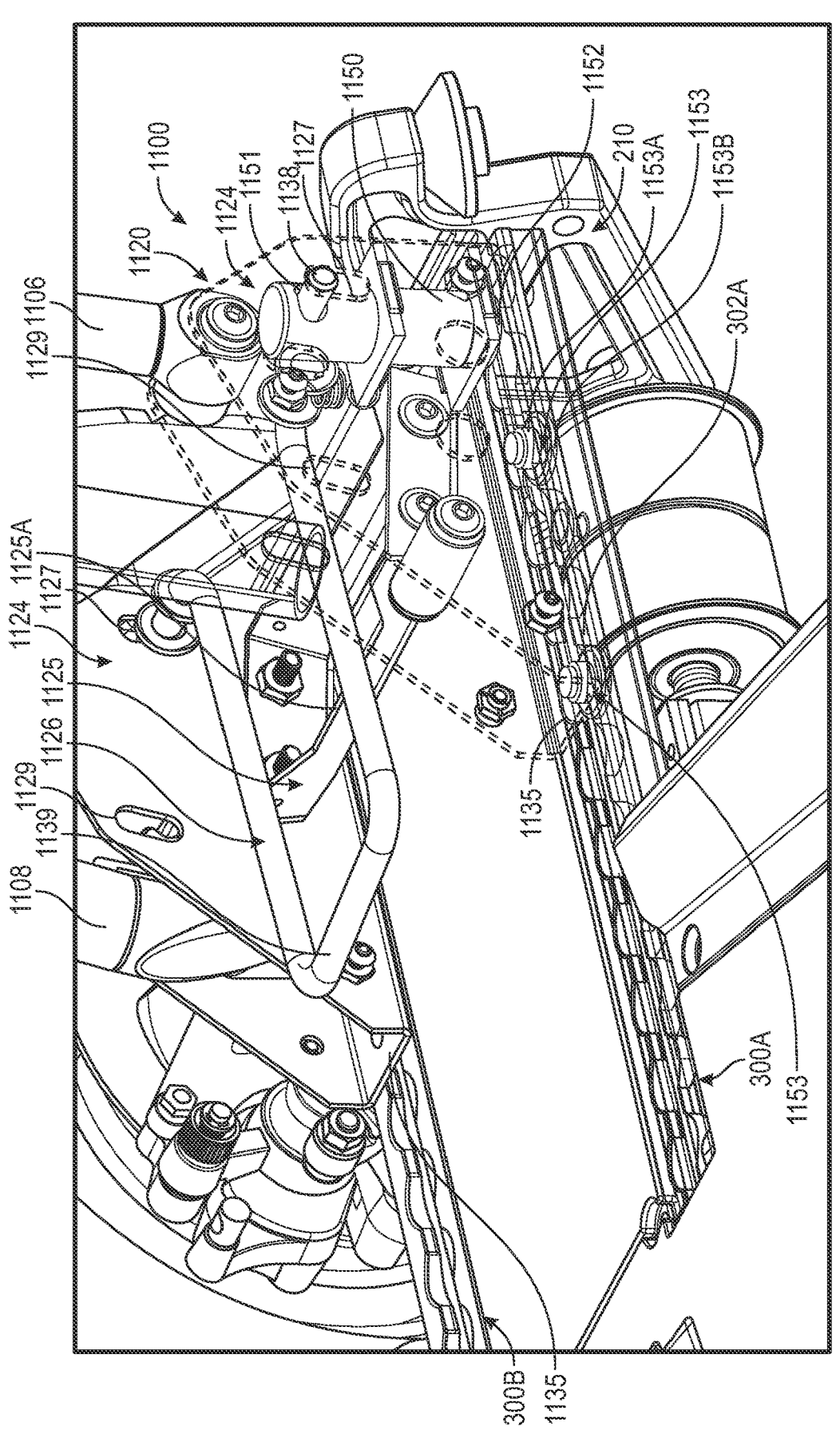
FIG. 26 is a front left perspective view of the seating base adjustment assembly of FIG. 24 in an unlocked position.

In the present embodiment, rear suspension 200 operates in substantially the same manner as front suspension 100. Referring to FIGS. 9 and 25-26, rear suspension 200 includes a rear suspension arm 201 and a rear support member 210. Rear support member 210 is fixedly coupled to frame 10, and more specifically rear portion 13, and rear suspension arm 201 is rotatably coupled between rear portion 13 and rear support member 210. A bearing 206 is positioned within rear suspension arm 201 which comprises a bearing aperture 206A configured to receive fastener 107. Fastener 107 extends through, and couples together, rear support member 210, suspension arm 201, and rear portion 13.

Rear support member 210 includes a first shock mounting arm 212 and a second shock mounting arm 213. Illustratively, first shock mounting arm 212 comprises a first shock mounting point 240A and second shock mounting arm 213 comprises a second shock mounting point 241A. A third biasing member 240 extends between first shock mounting point 240A and suspension arm 201 and a fourth biasing member 241 extends between second shock mounting point 241A. As suspension arm 201 rotates relative to support member 210 and rear portion 13, third biasing member 240 and fourth biasing member 241 dampen the rotational motion of suspension arm 201. Third biasing member 240 and fourth biasing member 241 may be a pneumatic shock absorber or a hydraulic shock absorber. Third biasing member 240 and fourth biasing member 241 may be a spring, or other type of linear force element.

In various embodiments, vehicle 2 comprises a suspension sensor 38 or a plurality of suspension sensors 38. Suspension sensors 38 may be located adjacent each of first biasing member 140, second biasing member 141, third biasing member 240, and fourth biasing member 241. In various embodiments, suspension sensors 38 may be located within each of first biasing member 140, second biasing member 141, third biasing member 240, and fourth biasing member 241. Each of suspension sensors 38 are communicably coupled to controller 50 and configured to send suspension sensor information regarding each of first biasing member 140, second biasing member 141, third biasing member 240, and fourth biasing member 241 to controller 50. In the present embodiment, first biasing member 140 is a front left shock absorber, second biasing member 141 is a front right shock absorber, third biasing member 240 is a rear left shock absorber, and fourth biasing member 241 is a rear right shock absorber. In various embodiments, each of first biasing member 140, second biasing member 141, third biasing member 240, and fourth biasing member 241 is an adjustable shock absorber configured with at least one shock absorber characteristic configured to be altered by controller 50. The shock absorber characteristic may be a compression damping value, a rebound damping value, or another value. In various embodiments, a user may alter the at least one shock absorber characteristic by user interface 8, display 9, cloud network 40, mobile device 41, vehicle 42, or cellular network 43. Additional details regarding adjustable suspensions and methods of use thereof can be found in U.S. application Ser. No. 17/355,650, filed Jun. 23, 2021, titled "VEHICLE HAVING ADJUSTABLE SUSPENSION" and U.S. application Ser. No. 16/198,280, filed Nov. 21, 2018, titled "VEHICLE HAVING ADJUSTABLE COMPRESSION AND REBOUND DAMPING," the entire disclosures of which are expressly incorporated herein by reference.

Still referring to FIGS. 14-16, steering assembly 150 comprises steering shaft 151 and a collar 190 positioned on the steering shaft. Steering shaft 151 comprises a lower steering shaft 151A positioned vertically below collar 190. In the present embodiment, collar 190 includes a pair of tabs 191 disposed on opposite sides of collar 190. In the present embodiment, tabs 191 are disposed on either lateral said of collar 190. Lower steering shaft 151A includes a pair of oppositely disposed apertures adjacent a lower end of collar 190. Steering shaft 151 and lower steering shaft 151A are circular tubes, however, in various embodiments, steering shaft 151 and lower steering shaft 151A may take any shape with a suitable cross-section. In the present embodiment, collar 190 may be configured to lock the length or height of steering shaft 151, such that when the collar 190 is locked, steering shaft 151 has a set height, but when collar 190 is unlocked, steering shaft 151 may be shortened or lengthened to decrease or increase the height thereof. Additional details regarding an adjustable length steering shaft can be found in International Application No. PCT/US22/14215, filed Jan. 28, 2022, titled CONVERTIBLE RECREATIONAL SIT-DOWN TO STAND-UP VEHICLE, the entire disclosure of which is expressly incorporated herein by reference.

Adjustment assembly 160 of steering assembly 150 includes an adjustment bracket 159 including a first arm 162A and a second arm 162B extending upward from a base 161 parallel to each other. Adjustment bracket 159 comprises an aperture 161A extending through base 161. First arm 162A and second arm 162B generally comprise an arced upper portion. First arm 162A includes a first aperture 163A and further comprises a first notch or indent 164A positioned at its upper extent. Second arm 162B includes a second aperture 163B aligned with first aperture 163A and further comprises a second notch or indent 164B positioned at its upper extent aligned with first indent 164A. Base 161 may be configured with an octagonal circumference configured to extend through aperture 166. In various embodiments, base 161 has another geometric circumference.

A sleeve 188 is configured to extend between first arm 162A and second arm 162B aligned with first aperture 163A and second aperture 163B, and a bearing 186 is configured to surround sleeve 188. A first fastener 187A and a second fastener 187B are configured to extend through apertures 163A, 163B, respectively, and couple sleeve 188 and bearing 186 between adjustment bracket 159 such that bearing 186 can rotate about sleeve 188 between first arm 162A and second arm 162B. Adjustment assembly 160 also includes a bracket 180 with a cylindrical base 181, as well as a first arm 182A and a second arm 182B. First arm 182A and second arm 182B extend upward from base 181 and may be nominally parallel to each other. Illustratively, an outer surface of each of first arm 182A and second arm 182B are arcuate, with a constant radius. Adjustment bracket 159 also comprises a retention portion 181A positioned on an upper face of base 181, intermediate first arm 182A and second arm 182B. Each of first arm 182A and second arm 182B includes an aperture 189A. Further, a pin 189 extends through apertures 189A of bracket 180 as well as apertures 151B to couple bracket 180 to lower steering shaft 151A. That is, as steering shaft 151 is pulled upward, lower steering shaft 151A and bracket 180 are also pulled upward.

A retainer 183 is configured to fit around base 181, and retainer 183 has a diameter approximately equal to, or slightly smaller than, the diameter of lower shaft 151A. Further, a biasing member 184 is configured to sit within retention portion 181A of bracket 180 and is positioned intermediate first arm 182A and second arm 182B. In the present embodiment, biasing member 184 is a spring, however, in various embodiments, biasing member 184 may be another type of biasing member. A spring retainer 185 is positioned on an upper extent of biasing member 184, and spring retainer 185 comprises a base 185B shaped and sized to fit within an upper extent of biasing member 184. Further, spring retainer 185 comprises an arcuate upper surface 185A that interfaces with bearing 186. That is, when assembled, upper surface 185A receives bearing 186.

As best seen in FIG. 15, when fully assembled, adjustment assembly 160 is positioned about lower steering shaft

151A. Spring retainer 185 is positioned on top of biasing member 184, intermediate first arm 182A and second arm 182B. Bracket 180, biasing member 184 and spring retainer 185 are positioned within the inner portion of lower steering shaft 151A, and bracket 180 is pinned to lower steering shaft 151A by pin 189. Further, bearing 186 and sleeve 188 are positioned vertically above spring retainer 185, and between first arm 182A and second arm 182B, and when placed within lower steering shaft 151A, first fastener 187A and second fastener 187B are positioned through first aperture 163A and second aperture 163B to couple bearing 186 and sleeve 188 relative to adjustment bracket 159. Further, each of bracket 180, biasing member 184, spring retainer 185, bearing 186, and sleeve 188 are held within the inner portion of lower steering shaft 151A by retainer 183.

Figure 17:
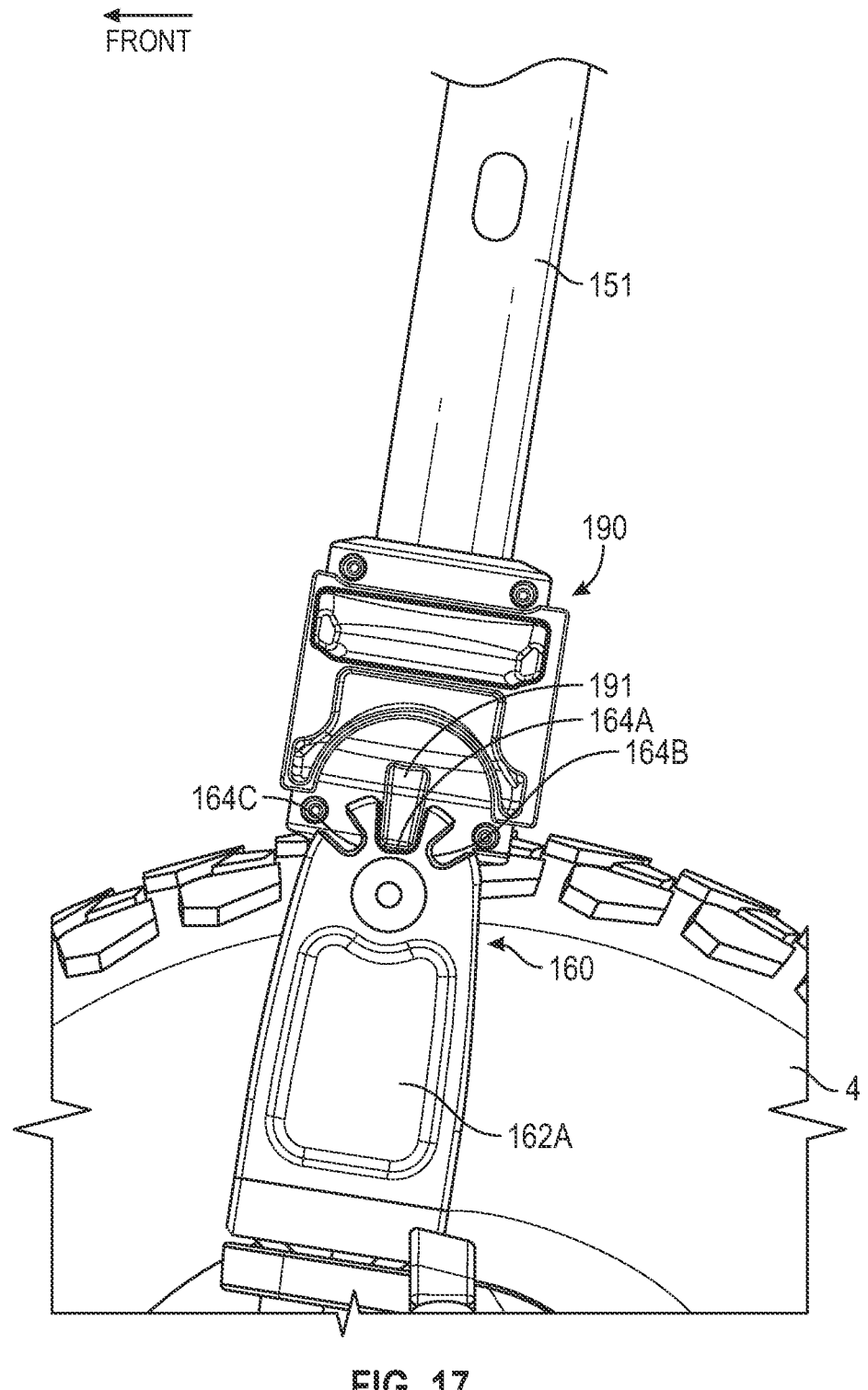
FIG. 17 is a left view of the steering adjustment assembly of the steering assembly of FIG. 14 in a locked and upright position.
Figure 18:
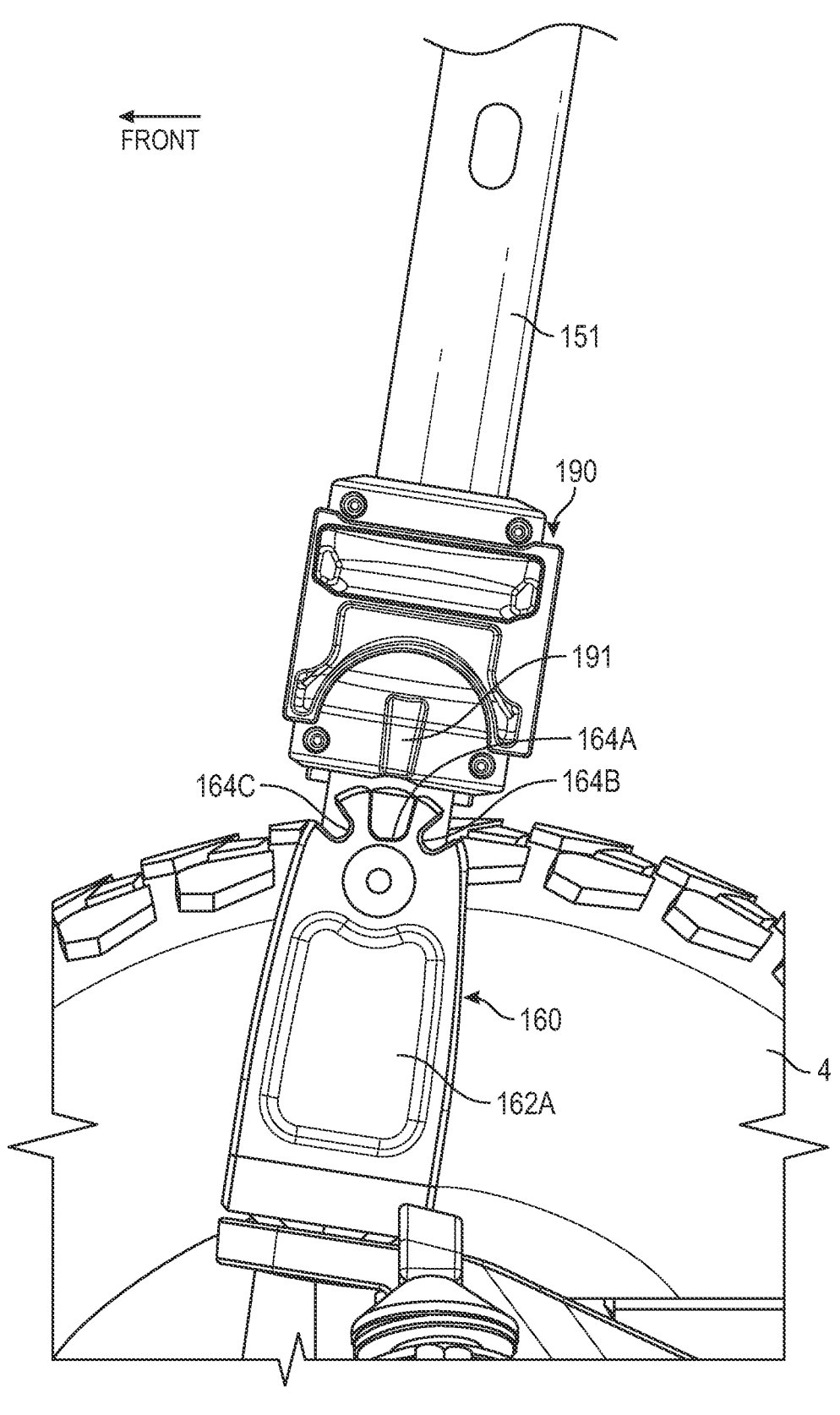
FIG. 18 is a left view of the steering adjustment assembly of the steering assembly of FIG. 14 in an unlocked position.

Referring now to FIGS. 14-20, the operation of adjustment assembly 160 will be described in greater detail. In the present embodiment, when steering shaft 151 is pulled upwardly by an operator, adjustment assembly 160 will be unmoved and steering shaft 151 is in a raised position (FIG. 18). That is, steering shaft 151 is movable relative to adjustment assembly 160 because when steering shaft 151 is pulled upwardly, bracket 180 is moved upwardly toward bearing 186 because bracket 180 is pinned to steering shaft 151, and steering shaft 151 is restrained in the upward direction by the presence of biasing member 184 and spring retainer 185 contacting bearing 186. Further, when an operator releases the steering shaft 151, the steering shaft will return to a lowered position (FIG. 15) under the biasing force of the biasing member 184.

In the present embodiment, when steering shaft 151 is in the raised position (FIG. 18), an operator of the vehicle can rotate the steering shaft 151 to alter an angle between the steering shaft 151 and operator support area 270. In the present embodiment, an operator can rotate the steering shaft 151 either forwardly or rearwardly. Further, vehicle 2 comprises a plurality of discrete positions for steering shaft 151 to be positioned. Illustratively, a first indent 164A, a second indent 164B, and a third indent 164C are provided. As shown in FIG. 17, first indent 164A represents a neutral steering position for an operator of vehicle 2. When tab 191 is positioned within first indent 164A, angle 195 is approximately 75-95 degrees and may be approximately 85 degrees.

Figure 19:
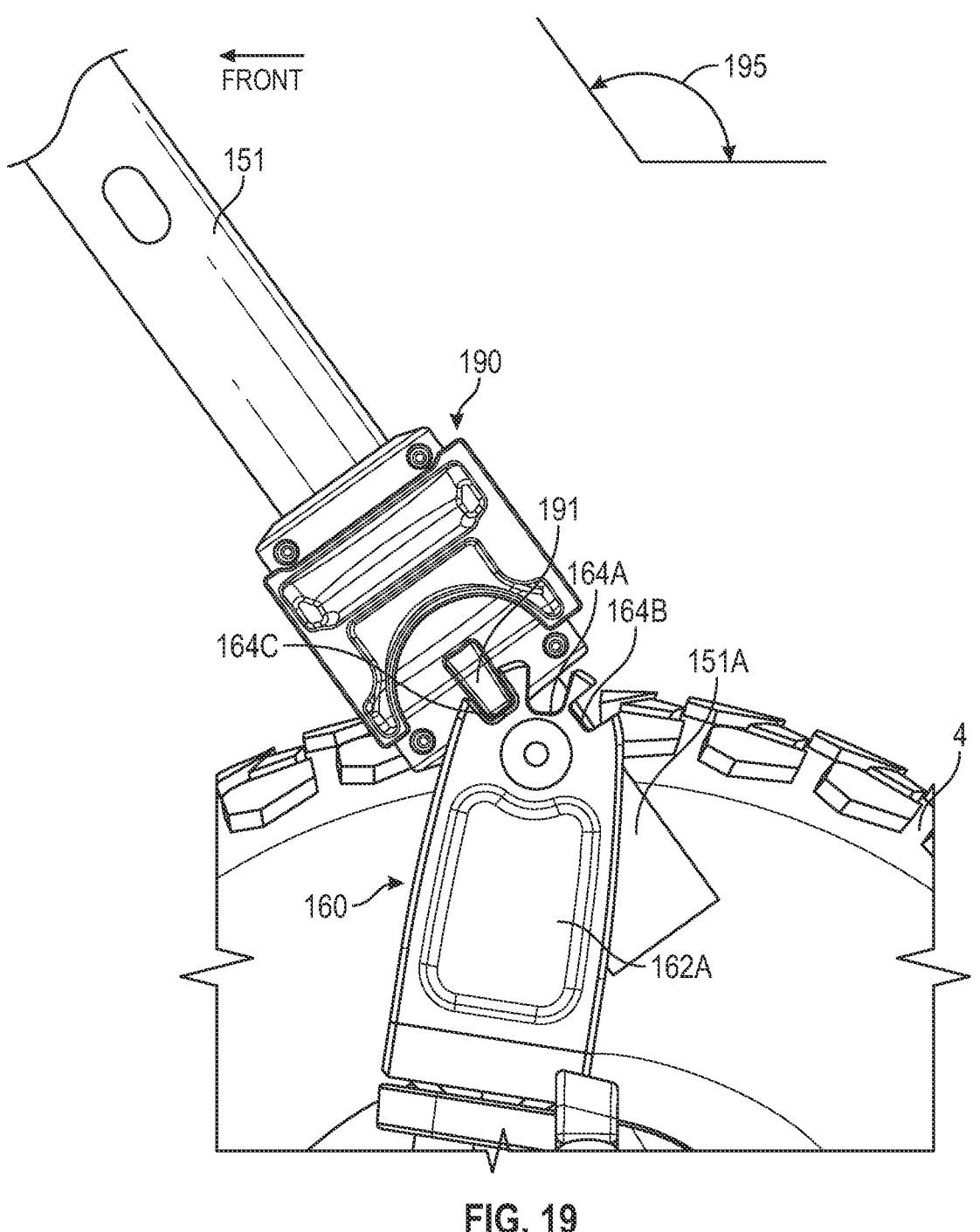
FIG. 19 is a left view of the steering adjustment assembly of the steering assembly of FIG. 14 in a forward position.

Turning to FIG. 19, an operator of vehicle 2 can alter angle 195 so that steering shaft 151 is angled forwardly away from an operator positioned on support area 270 and tab 191 is positioned within indent 164C. Illustratively, when tab 191 is positioned within third indent 164C, angle 195 is approximately 100-130 degrees and may be approximately 120 degrees. In the present embodiment, steering shaft 151 may be angled away from vehicle 2 so that an operator may push vehicle 2 in a reverse direction for use with an implement, such as a dump box, a plow, a scissor lift, or other implement or accessory which will be described in greater detail below.

Figure 20:
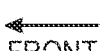
FIG. 20 is a left view of the steering adjustment assembly of the steering assembly of FIG. 14 in a rearward position.
Figure 21:
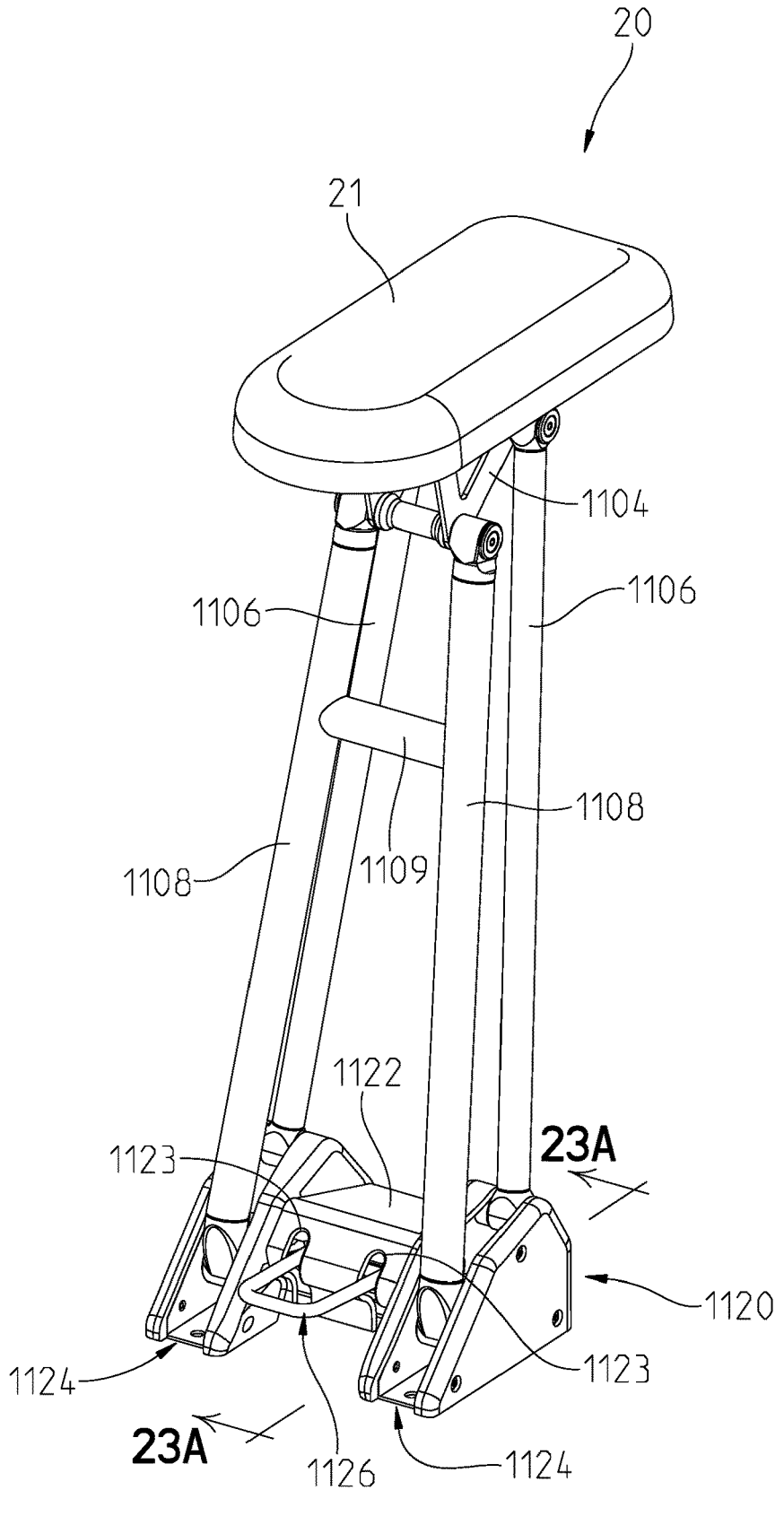
FIG. 21 is a front left perspective view of a seating assembly of a vehicle of the present disclosure.
Figure 22:
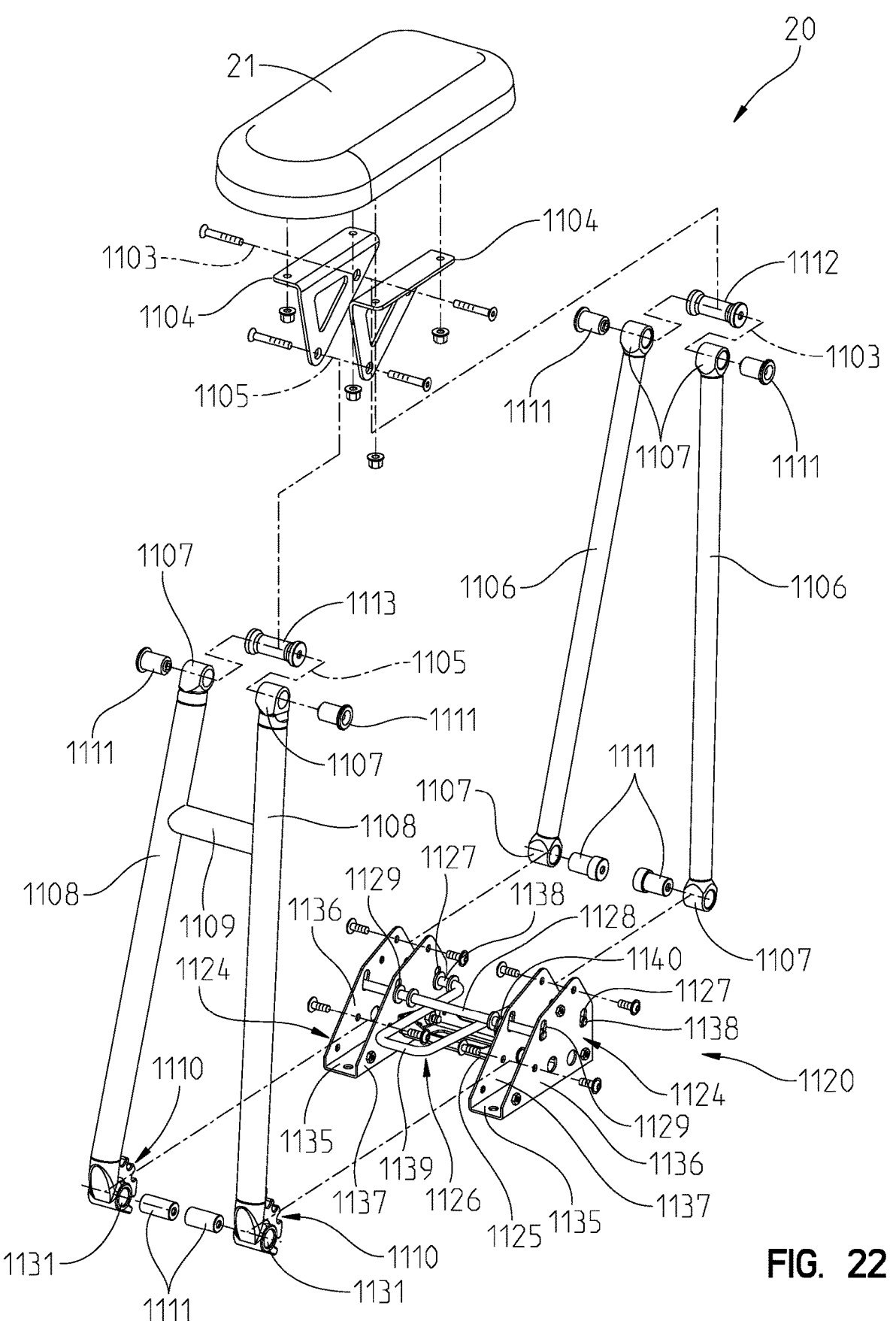
FIG. 22 is an exploded view of the seating assembly of FIG. 21.

Turning to FIG. 20, an operator of vehicle 2 can alter angle 195 so that steering shaft 151 is angled toward an operator positioned on support area 270 and tab 191 is positioned within indent 164B. Illustratively, when tab 191 is positioned within second indent 164B, angle 195 is approximately 10-50 degrees and may be approximately 30 degrees. In the present embodiment, steering shaft 151 may be angled further towards an operator of vehicle 2 if, for example, seating assembly 20 is positioned in a lowered orientation. Steering assembly 150 may also include a steering shaft angle sensor 34 configured to detect a position of steering shaft 151. In the present embodiment, steering shaft angle sensor 34 may be a potentiometer placed about or within sleeve 188 such that the rotation of steering shaft 151 provides a different output voltage to controller 50. Steering shaft angle sensor 34 may also be configured as a visual sensor, an infrared sensor, or another type of sensor.

Returning now to FIGS. 14-16, steering assembly 150 further comprises a steering bracket 170 operably coupled to adjustment assembly 160. Steering bracket 170 comprises an upper aperture 171 that is complementary to base 161 of adjustment bracket 159. That is, base 161 of adjustment bracket 159 has an octagonal circumference, as previously described. Upper aperture 171 has a complementary circumference shaped and sized to receive base 161. That is, when base 161 is received within aperture 171, adjustment bracket 159 and steering bracket 170 are rotatably coupled together. Further, steering bracket 170 extends between tab 114 and tongue 165. A fastener 115A rotatably couples steering bracket 170 to tab 114 such that steering bracket 170 is able to rotate about tab 114 on a steering axis of rotation 119. Steering bracket 170 also comprises an extension 172 which extends outward from the axis of rotation 119. Extension 172 also comprises a generally upward facing aperture 173.

Steering assembly 150 also comprises a first steering rod 157 and a second steering rod 158. First steering rod 157 comprises a first end 157A and a second end 157B, and second steering rod 158 includes a first end 158A and a second end 158B. Each of first end 157A, second end 157B, first end 158A, and second end 158B are a spherical joint. A fastener 174 extends through first end 157A, first end 158A, and upward facing aperture 173 to couple each of first steering arm 157 and second steering arm 158 to steering bracket 170. Further, second end 157B is coupled to the front left ground engaging member 4 at first aperture 123A of steering follower 123. Further second end 158B is coupled to the front right ground engaging member 4 at first aperture 133A of steering follower 133.

An operator can provide a steering input to steering assembly 150, and the steering input is translated through adjustment assembly 160 to steering bracket 170. Steering bracket 170 rotates and pushes and pulls on first steering arm 157 and second steering arm 158 accordingly. In the present embodiment, when a right turn is provided as a steering input to steering assembly 150, extension 172 is rotated about steering axis of rotation 119 in a clockwise direction 196 when viewed from a top view. When a left turn is provided as a steering input to steering assembly 150, extension 172 is rotated about steering axis of rotation 119 in a counterclockwise direction 197 when viewed from a top view.

As previously described, when steering follower 133 and steering follower 123 are rotated, both front ground engaging members 4 are rotated, also. When extension 172 is rotated in a clockwise 196 direction, front ground engaging members 4 are also rotated to the right and vehicle 2 is steered toward the right. When extension 172 is rotated in a counterclockwise direction 197, front ground engaging members 4 are also rotated to the left and vehicle 2 is steered toward the left. Illustratively, the connection point of first end 157A and first end 158A at upward facing aperture 173 is positioned longitudinally forward of suspension arm 101, shock absorber 140 and shock absorber 141. Further, in a neutral, straight-steering position, each of first end 157A and first end 158A are positioned along vehicle centerline 25. The present invention provides a simplified linkage assembly for steering vehicle 2 which provides weight and cost savings.

Referring to FIGS. 21-26, vehicle 2 further comprises a seating assembly 20 located generally between rear ground engaging members 5. Seating assembly 20 includes a seat 21 supported by one or more seat frame(s) 1104 disposed underneath seat 21. Seat frame 1104 is illustratively shown as a pair of seat frames 1104 which are laterally spaced apart from each other. Seat frames 1104 are generally triangularly shaped and separated by a rear spacer 1112 and a front spacer 1113. Illustratively, rear spacer 1112 is positioned along a first seat rotation axis 1103 and front spacer 1113 is positioned along a second seat rotation axis 1105. Generally, second seat rotation axis 1105 is vertically lower than, and forward of, first seat rotation axis 1103. Seating assembly 20 further includes a pair of rear upstanding frame members 1106 and a pair of front upstanding frame members 1108. Each rear upstanding frame member 1106 has a sleeve 1107 positioned at its upper extent and is rotatably coupled to a corresponding seat frame 1104 at sleeve 1107 along first seat rotation axis 1103. Each front upstanding frame member 1108 has a sleeve 1107 positioned at its upper extent and is rotatably coupled to seat frame 1104 at sleeve 1107 along second seat rotation axis 1105. Each sleeve 1107 has an opening extending generally transverse of vehicle 2, 2' and the opening is configured to receive a bushing 1111. When bushings 1111 are received within the sleeves 1107 of both rear upstanding frame members 1106, bushings 1111, the openings of sleeves 1107, and rear spacer 1112 are aligned along first seat rotation axis 1103. When bushings 1111 are received within the sleeves 1107 of both front upstanding frame members 1108, bushings 1111, the openings of sleeves 1107, and front spacer 1113 are aligned along second seat rotation axis 1105.

Front upstanding frame members 1108 further include a cross member 1109 positioned vertically intermediate their lower extent and their upper extent, coupled between front upstanding frame members 1108. Further, front upstanding frame members 1108 each include a geared end 1110 positioned at their lower extent. In the present embodiment, the geared end 1110 includes a plurality of teeth 1132 and a plurality of roots 1110A, 1110B, 1110C, 1110D between teeth 1132. Teeth 1132 extend in an arc approximately 135 degrees in length surrounding sleeve 1131. In various embodiments, geared end 1110 may comprise a greater number of teeth 1132, a greater arc length of teeth 1132, fewer number of teeth 1132, or a shorter arc length of teeth 1132. Geared end 1110 receives bushings 1111 within sleeve 1131.

Each rear upstanding frame members 1106 also includes a sleeve 1107 positioned at its lower extent. Sleeve 1107 also includes an opening extending transversely relative to vehicle centerline 25. A bushing 1111 is received within the opening of sleeve 1107. Sleeves 1107 may be affixed to either end of rear upstanding frame member 1106 and on an upper extent of front upstanding frame member 1108 through a weld, a thread, an adhesive, a fastener, friction fit, pin, or other affixing or coupling method/mechanisms.

Seating assembly 20 further comprises seating adjustment assembly 1120. Seating adjustment assembly 1120 includes a pair of U-shaped brackets 1124, and each U-shaped bracket 1124 includes a channel 1135 extending between an outer wall 1136 and an inner wall 1137. The U-shaped brackets 1124 are coupled to, and separated by, a coupling bracket 1125, which extends between inner walls 1137. Coupling bracket 1125 may be coupled to inner walls 1137 using fasteners, welds, adhesives, or other coupling methods/mechanisms. Each bracket 1124 comprises rear channels 1127 and forward channels 1129 within each outer wall 1136 and inner wall 1137. When U-shaped brackets 1124 are properly coupled to coupling bracket 1125, all rear channels 1127 are laterally aligned, and all forward channels 1129 are laterally aligned.

Each bracket 1124 receives one of the rear upstanding frame members 1106 within channel 1135, and sleeve 1107 and/or bushing 1111 extends between outer wall 1136 and inner wall 1137. Illustratively, rear upstanding frame members 1106 are rotatably coupled to brackets 1124 about third seat rotation axis 1133. Each bracket 1124 also receives one of front upstanding frame members 1108 within channel 1135, and bushing 1111 and/or sleeve 1131 extends between outer wall 1136 and inner wall 1137. Illustratively, front upstanding frame members 1108 are rotatably coupled to brackets 1124 along fourth seat rotation axis 1145.

Seating assembly 20 also includes a lever 1126 and a rod 1128. Rod 1128 extends between and within the entirety of forward channels 1129. Illustratively, rod 1128 is configured to move vertically within channels 1129. Lever 1126 is generally U-shaped and includes a pair of ends 1138 and a handle 1139, and each end 1138 extends through rear channels 1127 and handle 139 extends forwardly and vertically below and forward of rod 1128. A spring 1140 is coupled to, and extends between, rod 1128 and coupling bracket 1125. Spring 1140 biases rod 1128 and coupling bracket 1125 together; that is, rod 1128 is biased downwardly to be positioned at the vertically lowest point of forward channel 1129.

In the present embodiment, a user may provide an upward force to handle 1139 and raise lever 1126, which in turn raises rod 1128. In the present embodiment, when no user force is placed on handle 1139, rod 1128 rests across the top of handle 1139. In various embodiments, rod 1128 may be placed adjacent, but not in contact with, the top of handle 1139. When no user force is placed on handle 1139, both handle 1139 and rod 1128 are positioned at a lowermost position of rearward channel 1127 and forward channel 1129, respectively, and are positioned in a locked position. When a sufficient force is used to raise handle 1139, and rod 1128 is raised to be in an uppermost position of forward channel 1129, both handle 1139 and rod 1128 are in an unlocked position. Seating adjustment assembly 1120 further comprises a cover 1122 configured to conceal the components described herein, except for handle 1139. Illustratively, cover 1122 includes slots 1123 configured to receive handle 1139 and are sized to allow handle 1139 to vertically move within cover 1122.

Figures 23A, 23B:
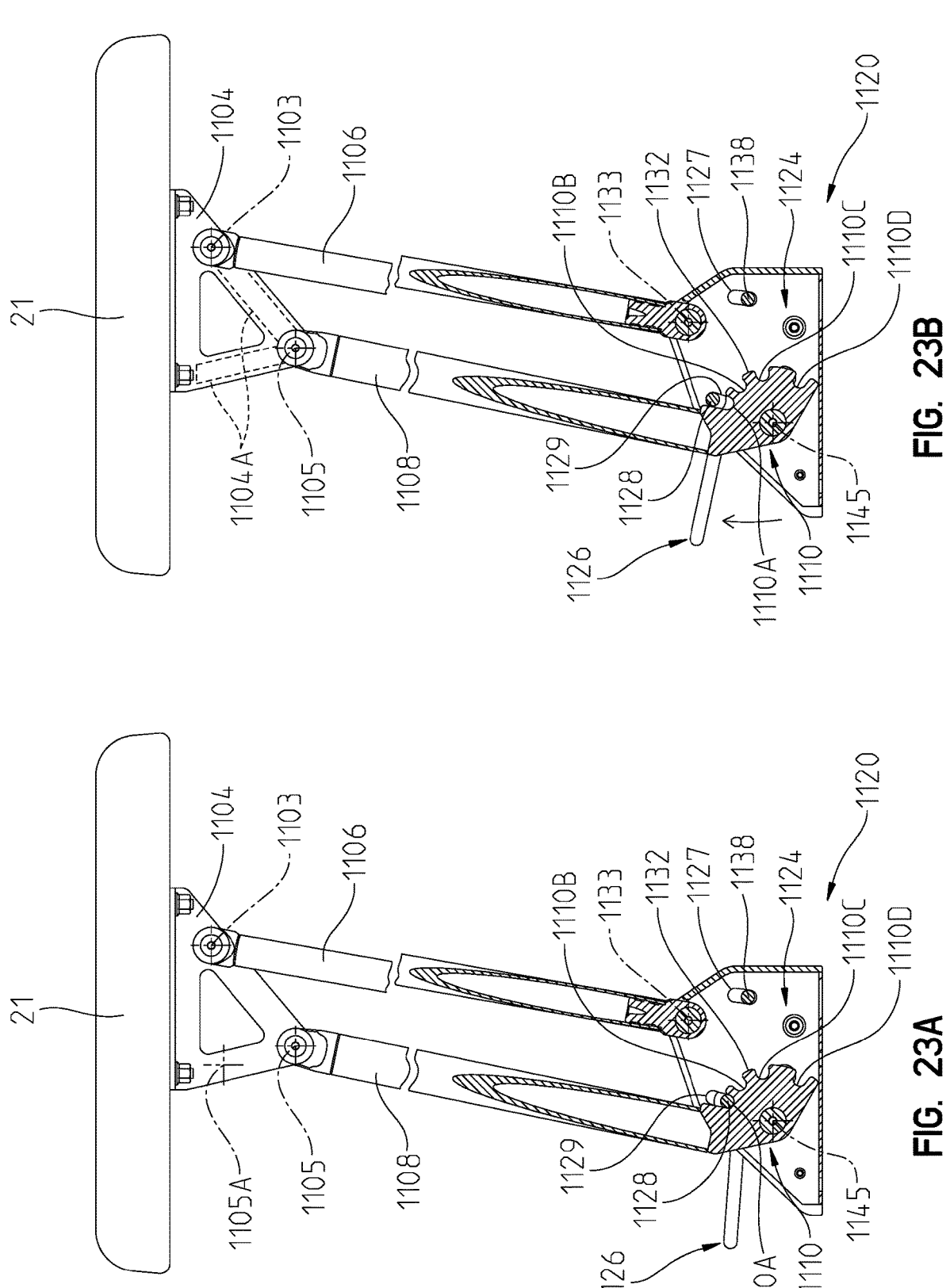
FIG. 23A is a section view of the seating assembly of FIG. 21 taken along line 23A-23A positioned in a locked, upright position.
FIG. 23B is a section view of the seating assembly of FIG. 21 taken along line 23A-23A positioned in an unlocked position.
Figure 23C:
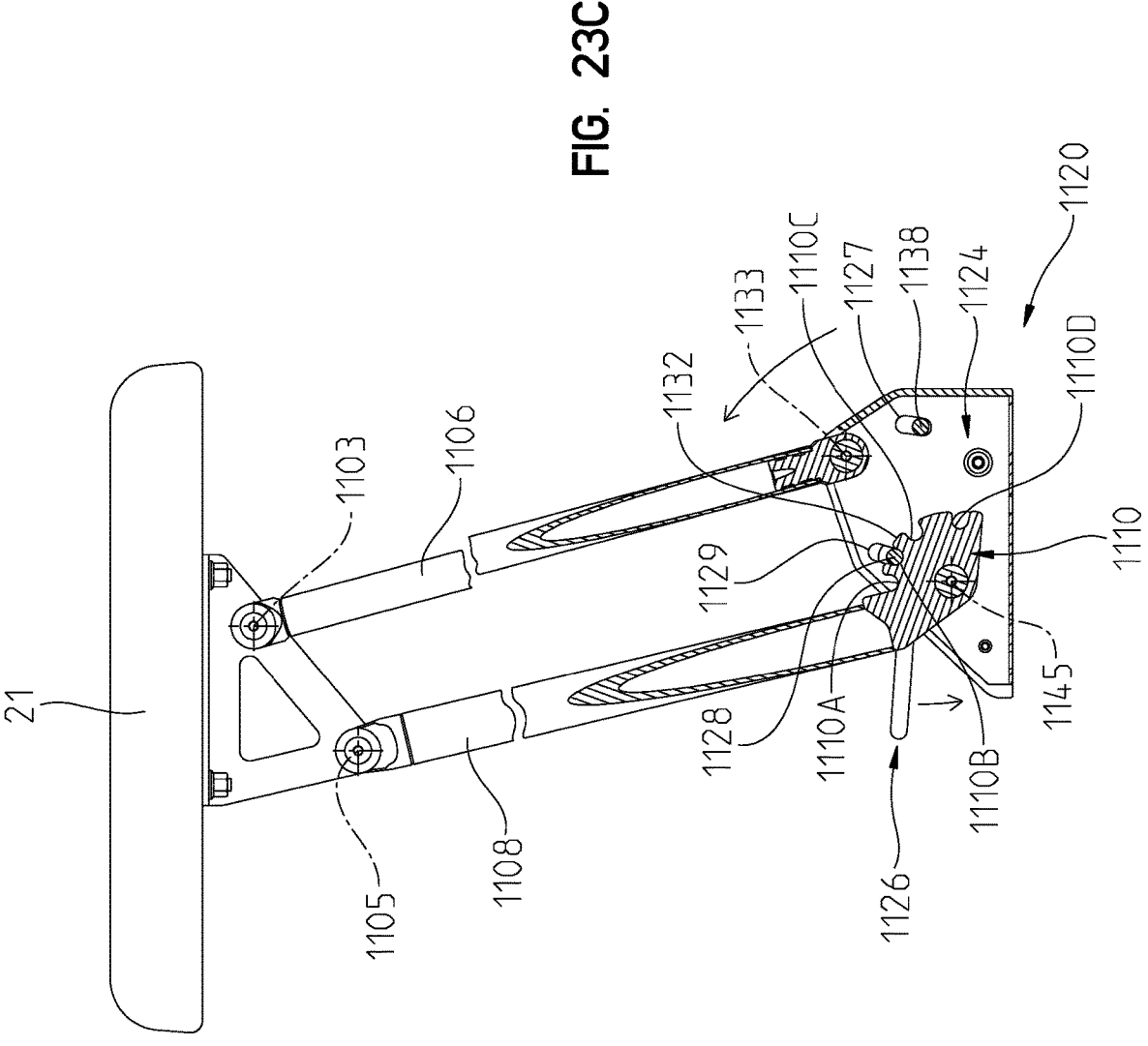
FIG. 23C is a section view of the seating assembly of FIG. 21 taken along line 23A-23A positioned in a locked, forward position.
Figure 24:
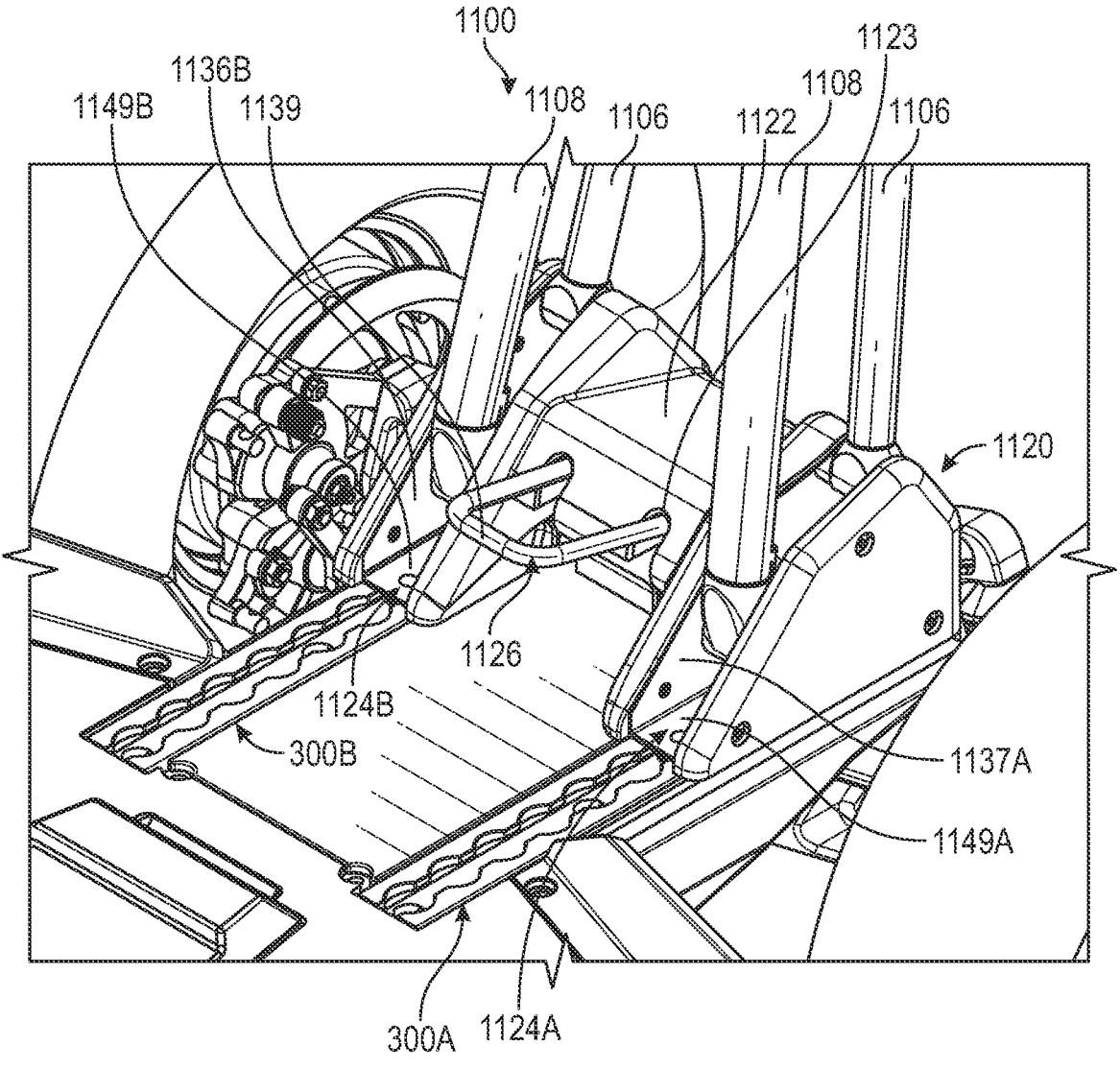
FIG. 24 is a front left perspective view of the seating base adjustment assembly of a seating assembly of a vehicle of the present disclosure.

Referring now to FIGS. 23A-23C, the adjustment of seat 21 using seating adjustment assembly 1120 will be explained in greater detail. As shown in FIG. 23A, seating assembly 20 is shown in a locked position. Illustratively, lever 1126 and rod 1128 are shown in a locked position, and rod 1128 is received within root 1110A. When rod 1128 is in the locked position, it is received by any of roots 1110A, 1110B, 1110C, 1110D of geared end 1110. Rod 1128 is biased into engagement with geared end 1110 due to the biasing effect of spring 1140. Further, when rod 1128 is received within any of roots 1110A, 1110B, 1110C, 1110D, geared end 1110 is prohibited from rotating about channel 1135.

Now referring to FIG. 23B, seating assembly 20 is shown in an unlocked position. That is, lever 1126 is raised upwardly and rod 1128 is raised as lever 1126 is raised. Illustratively, rod 1128 is raised out of engagement with geared end 1110 and is adjacent an upper extent of forward channels 1129. When rod 1128 is no longer in engagement with geared end 1110, geared end 1110 is able to rotate about channel 1135. As geared end 1110 rotates about channel 1135, seating assembly 20 is moved downwardly and forwardly.

As shown in FIG. 23C, geared end 1110 is rotated forwardly from the position in FIG. 19A. Further, rod 1128 is shown engaged with root 1110B, therefore not allowing geared end 1110 to rotate further. Rod 1128 engages with root 1110B by a user reducing the force on lever 1126 and allowing rod 1128 to be biased downwardly through forward channels 1129 by spring 1140 and into engagement with root 1110B. Illustratively, geared end 1110 could be rotated such that rod 1128 is in engagement with any of roots 1110A, 1110B, 1110C, 1110D, so that a variety of discrete positions of seat 21 may be achieved.

Seating assembly 20 may further include the ability to rotate seat 21 independent of seating adjustment assembly 1120. Seat 21 may be rotated to near vertical, or completely vertical, with the top of seat 21 (i.e., the seating surface for the user) facing forward, so that an operator may use seat 21 as a back rest, or a support to lean against, or sit against. In one embodiment, front upstanding frame members 1108 and rear upstanding frame members 1106 may be vertically adjustable. Rear upstanding members 1106 may be adjusted vertically upward, which in turn rotates seat 21 forwardly. Front upstanding frame members 1108 may be adjusted vertically downward, which in turn rotates seat 21 forwardly. In various embodiments, rear upstanding frame members 1106 may be adjusted vertically upward while front upstanding members may simultaneously be adjusted vertically downward, which in turn rotates seat 21 forwardly. In various embodiments, rear upstanding frame members 1106 and front upstanding frame members 1108 may be vertically adjusted using hydraulics, a shaft clamp, pin style discrete positions, or other methods of vertical adjustment.

In various embodiments, seat frames 1104 may comprise additional mounting points, defining an additional rotational axis, similar to first seat rotation axis 1103 and second seat rotation axis 1105. For example, as shown in FIG. 19A, front upstanding frame member 1106 may be removably coupled to frame member 1104 and may be moved to couple about a fifth seat rotation axis 1105A. Seat 21 may then be rotated downwardly without changing the overall length of front upstanding member 1108. In various embodiments, as shown in FIG. 19B, frame members 1104 may include channels 1104A in which sleeves 1107 may move and affect the angle of seat 21.

Now referring to FIGS. 24-27B, adjustment assembly 1120 includes a first bracket 1124A and a second bracket 1124B which extend generally parallel to each other. In the present embodiment, first bracket 1124A and second bracket 1124B are substantially similar and comprise substantially similar features. Each of first bracket 1124A and second bracket 1124B are generally U-shaped. That is, first bracket 1124A comprises a first base 1149A positioned at a bottom of channel 1135, as well as a first outer wall 1136A and a first inner wall 1137A. Second bracket 1124B comprises a second base 1149B, as well as a second outer wall 1136B and a second inner wall 1137B. Coupling bracket 1125 is coupled to first bracket 1124A at the first inner wall 1137A and further coupled to second frame 1124B at second inner wall 1137B. Illustratively, coupling bracket 1125 has an upper edge 1125A at a front extent thereof.

First bracket 1124A and second bracket 1124B each comprise rear channels 1127. Each of rear channels 1127 are elongated, generally in the shape of an obround, having two semicircles coupled by parallel lines at their end points.

Each of rear channels 1127 extend in a generally upward direction. Each of ends 1138 of lever 1126 are able to translate along the length of rear channels 1127.

Adjustment assembly 1120 also includes a first post 1150 positioned within first bracket 1124A. A second post (not shown) is positioned within second bracket 1124B, and the second post is laterally aligned with the first post 1150. Each post 1150 includes an aperture 1151 extending generally laterally. Further, each of posts 1150 comprises a lower portion 1152. In the present embodiment, each of ends 1138 extends through apertures 1151, that is, lever 1126 is coupled to posts 1150 at apertures 1151.

Vehicle 2 also comprises a first rail 300A and a second rail 300B, and the first rail 300A and second rail 300B extend generally parallel to each other. In the present embodiment, each of first rail 300A and second rail 300B are supported by an upper face of the rear portion 13. In various embodiments, each of first rail 300A and second rail 300B are supported by an upper face of middle portion 11. In various embodiments, first rail 300A and second rail 300B are supported by each of rear portion 13 and middle portion 11. In various embodiments, first rail 300A and second rail 300B are supported, at least in part, by front portion 12. In the present embodiment, at least a portion of first rail 300A and second rail 300B are positioned above suspension arm 201.

In the present embodiment, first rail 300A and second rail 300B extend nominally parallel to vehicle centerline 25. In the present embodiment, frame 10 is defined by a frame length 16 extending the length of frame 10. That is, frame length 16 is defined by the length extending from a rearward extent of rear support member 210 to a front extent of steering bracket 170. Further, each of first rail 300A and second rail 300B extend a rail length 310. In the present embodiment, rail length 310 is approximately 30% of frame length 16. In various embodiments, rail length 310 is at least 25% of frame length 16. In various embodiments, rail length 310 is at least 40% of frame length 16. In yet another embodiment, rail length 310 is at least 10% of frame length 16.

Each of first rail 300A and second rail 300B comprises an outer facing edge 302A, 302B, respectively. In the present embodiment rear portion 13 comprises a rear portion width 17. Further, the distance between outer facing edge 302A and outer facing edge 302B is defined by a rail system width 311. In the present embodiment, rail system width 311 is at least 60% of the rear portion width 17. In various embodiments, rail system width 311 is at least 80% of the rear portion width 17. In various embodiments, rail system width 311 is nominally equal to rear portion width 17. In the present embodiment, each of outer facing edge 302A and outer facing edge 302B are positioned laterally inward from first shock mounting point 240A and second shock mounting point 241A.

In the present embodiment, first rail 300A comprises a first plurality of apertures 301A and a second rail 300B comprises a second plurality of apertures 301B. The first plurality of apertures 301A extend the length of first rail 300A and may be evenly spaced and the second plurality of apertures 301B extend the length of second rail 300B and may be evenly spaced. In the present embodiment, first rail 300A and second rail 300B each comprise twelve apertures. In various embodiments, each of first rail 300A and second rail 300B comprise four apertures, six apertures, eight apertures, ten apertures, or more apertures. In various embodiments, first rail 300A and second rail 300B comprise a different number of apertures.

Each of first bracket 1124A and second bracket 1125 comprises a pair of buttons or glides 1153. A first pair of buttons 1153 are coupled to, and extend below, first base 1149A and a second pair of buttons 1153 are coupled to, and extend below, second base 1149B. Each of buttons 1153 are sized and shaped to be received within apertures 301A, 301B. That is, each button 1153 has a circular middle portion 1153B and a circular lower portion 1153A. Circular lower portion 1153A has a greater diameter than middle portion 1153B. Middle portion 1153B extends downwardly from base 1149A, and lower portion 1153A is positioned on a bottom extent of middle portion 1153B. Illustratively, the pair of buttons is spaced apart by a button spacing distance 1155. Further, each of the apertures 301A and each of the apertures 301B are spaced by an aperture spacing distance 1154. In the present embodiment, button spacing distance 1155 may be three times the size as aperture spacing distance 1154. That is, when one of the pair of buttons 1153 is placed in an aperture 301A, the other of the pair of buttons is placed in another aperture 301A, and two apertures 301A are positioned intermediate the pair of buttons 1153. That is, the pair of buttons 1153 are spaced by the distance between three apertures. In various embodiments, button spacing distance 1155 is two times the size of aperture spacing distance 1154. In various embodiments, button spacing distance 1155 is four times the size of aperture spacing distance 1154. In various embodiments, button spacing distance 1155 is equal to any integer spacing so that each button 1153 can fit into rail 300A, 300B at the same time.

Figure 27A:
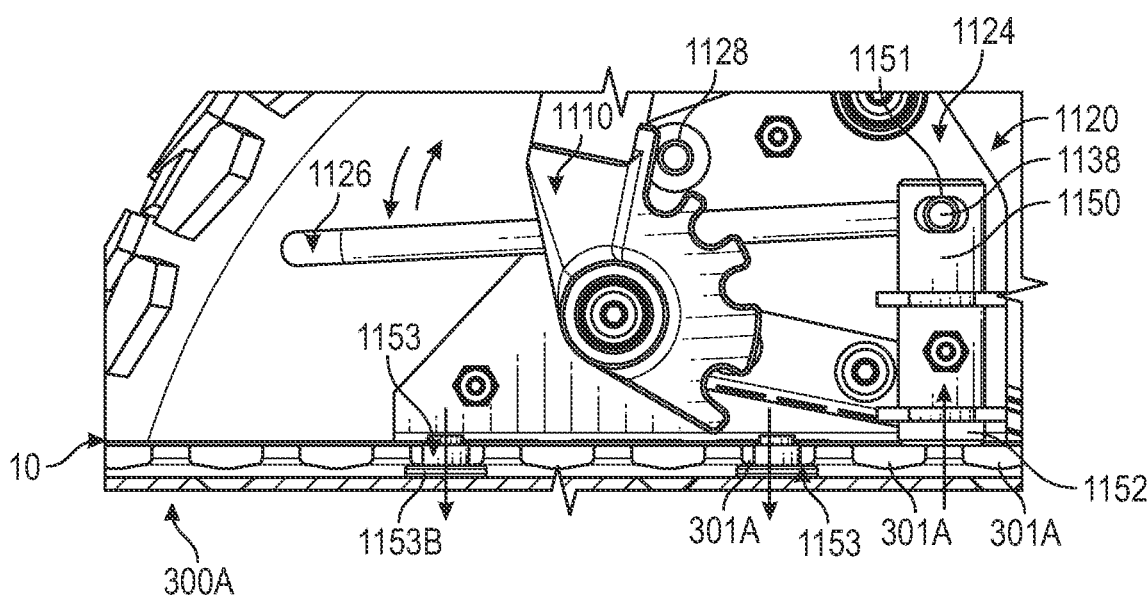
FIG. 27A is a left side view of the seating base adjustment assembly of FIG. 24 unlocked and positioned in apertures of an adjustment rail of a vehicle of the present disclosure.
Figure 27B:
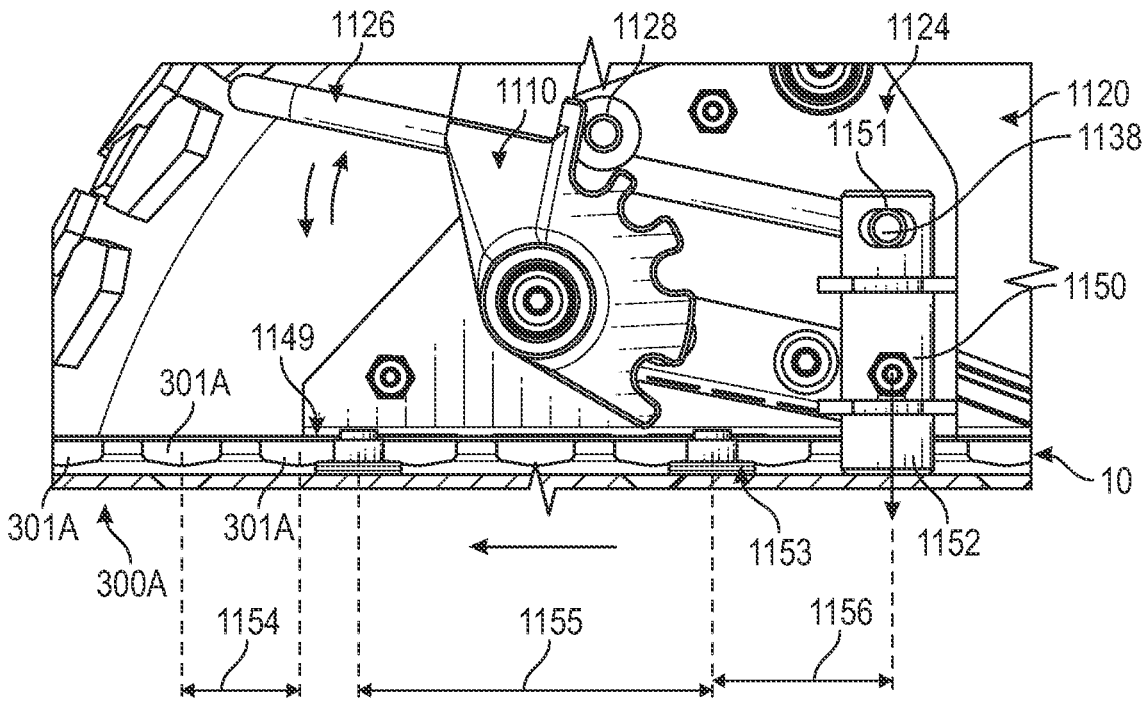
FIG. 27B is a left side view of the seating base adjustment assembly of FIG. 24 locked and positioned in an adjustment rail of a vehicle of the present disclosure.

Now referring to FIGS. 25-27B, the function of inserting and translating seating assembly 20 within rails 300A, 300B will be explained in greater detail. Illustratively, FIG. 27A shows an unengaged and unlocked position of seating adjustment assembly 1120, and FIG. 27B shows an engaged and locked position of seating adjustment assembly 1120. That is, in FIG. 27A, seating adjustment assembly 1120 is able to be removed from rails 300A, 300B or translate within rails 300A, 300B. In FIG. 27B, seating adjustment assembly 1120 is locked within rails 300A, 300B and is restricted from moving relative to frame 10.

As shown in FIG. 27A, seating assembly 20 is positioned on frame 10, and each of buttons 1153 on first bracket 1124A and buttons 1153 on second bracket 1124B extend through apertures 301A, 301B, respectively, to sit within rails 300A, 300B. Further, when buttons 1153 are positioned within, and aligned with apertures 301A, 301B, post 1150 is misaligned with any of apertures 301A, 301B and may not sit within any of apertures 301A, 301B. In the unengaged position of FIG. 27A, lever 1126 rotated downwardly about ends 1138 until handle 1139 contact upper edge 1125A. Illustratively, when handle 1139 contacts upper edge 1125A, ends 1138 move upwardly within rear channels 1127, and posts 1150 are translated upwardly, to a post upper position.

Further, as shown in FIG. 27B, seating assembly 20 is positioned on frame 10, and each of buttons 1153 on first bracket 1124A and buttons 1153 on second bracket 1124B are positioned within rails 300A, 300B, respectively. Illustratively, seating adjustment assembly 1120 has been pushed forwardly from the unengaged, unlocked position shown in FIG. 27A to the current locked position in FIG. 27B. That is, seating adjustment assembly 1120 is able to lock into place when post 1150 is able to be pushed downwardly to sit within an aperture 301A, 301B. When post 1150 is able to sit within an aperture 301A, 301B, each of buttons 1153 are misaligned with apertures 301A, 301B such that buttons 1153 may not be pulled upward and out of rail 300A, 300B. That is, post 1150 is separated from each of the buttons 1153 by a post separation distance 1156. In the present embodiment, post separation distance 1156 is 1.5 times the aperture spacing distance 1154. In various embodiments, post separation distance 1156 is any non-integer multiple of aperture spacing distance 1154. That is, when buttons 1153 are aligned with any of apertures 301A, 301B, post 1150 is not aligned with any of apertures 301A, 301B. Further, when post 1150 is aligned with any of apertures 301A, 301B, buttons 1153 are not aligned with any of apertures 301A, 301B.

In the present embodiment, seating adjustment assembly 1120 is configured to both rotate seat 21 as well as translate seating adjustment assembly 1120 along rails 300A, 300B. That is, as previously described, when an operator rotates lever 1126 upwardly from a neutral state, a user may rotate seat 21 forwards or backwards, and when an operator rotates lever 1126 downwardly from a neutral state, a user is capable of translating seating adjustment assembly 1120 along rails 300A, 300B. Stated otherwise, lever 1126 is able to rotate both in a first direction, e.g., clockwise, and a second direction, e.g., counterclockwise. When lever 1126 is moved in a first direction, seating assembly 20 is capable of being moved by a first method, and when lever 1126 is moved in a second direction, seating assembly 20 is capable of being moved by a second method.

Similarly, in order to remove seating adjustment assembly 1120 from vehicle 2, an operator rotates lever 1126 downwardly to lift post 1150 out of aperture 301A, 301B and translates buttons 1153 so that each of buttons 1153 align with apertures 301A, 301B. Buttons 1153 may then be pulled out of rails 300A, 300B and seating assembly 20 can then be pulled up and away from vehicle 2.

Seating assembly 20 may also include a seating adjustment sensor 35 configured to determine a position of seat 21. Seating adjustment sensor 35 is configured to determine a rotational position of seat 21 relative to seating adjustment assembly 1120 and is also configured to determine a longitudinal distance between seating adjustment assembly 1120 and steering assembly 150. Seating adjustment sensor 35 is communicably coupled to controller 50 and configured to provide seat position information to controller 50.

Figure 28:
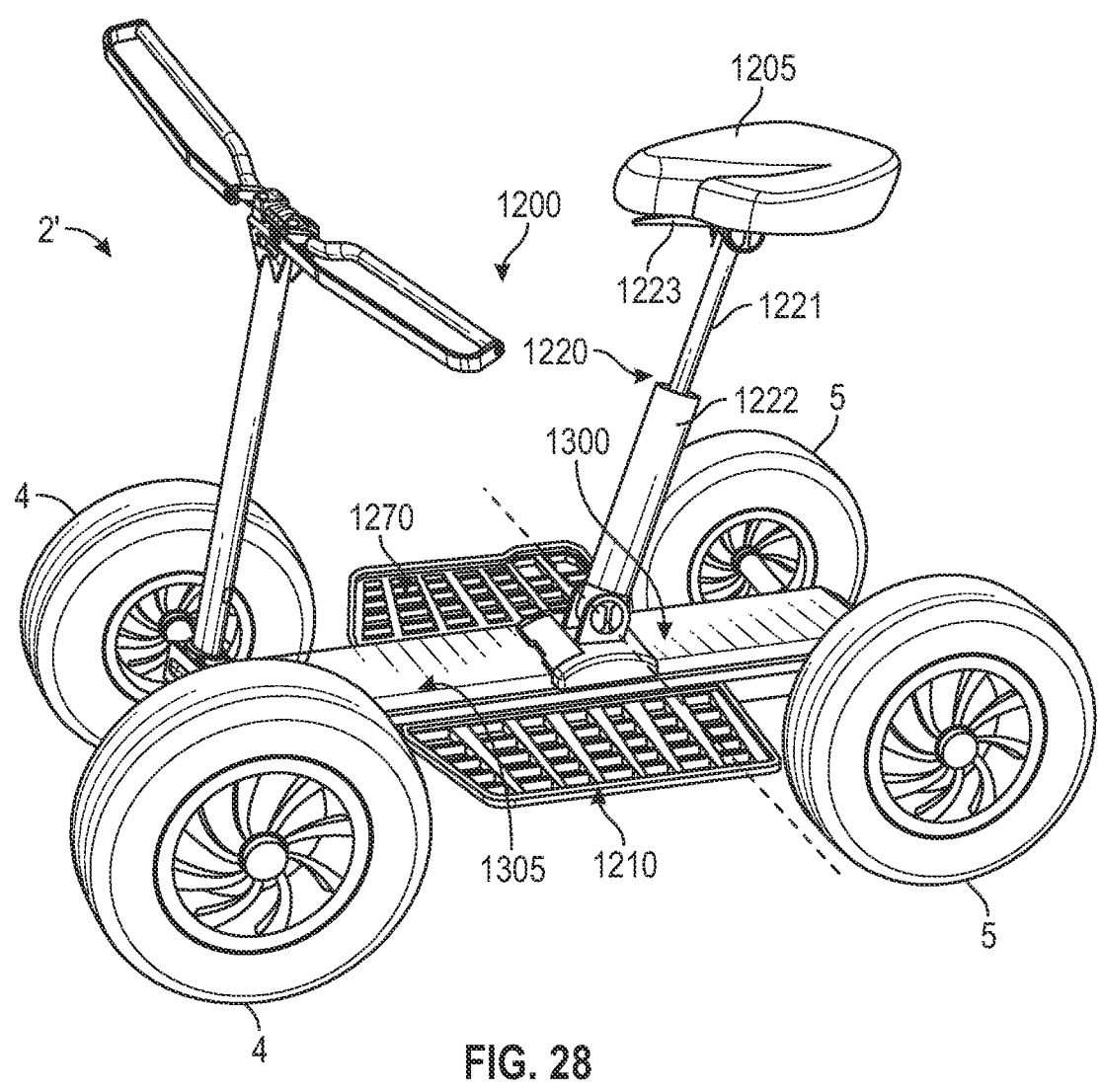
FIG. 28 is a left side perspective view of an alternate seating assembly of the present disclosure for any vehicle of the present disclosure.

Now referring to FIGS. 28-30, an alternate seating adjustment assembly 1200 will be described. Vehicle 2' includes a chassis 1210 supported by ground engaging members 4, 5. Further, chassis 1210 includes support area 1270 configured to support an operator of vehicle 2'. Vehicle 2' also includes a track 1305 extending the length of chassis 1210. Track 1305 comprises a raised portion 1306, a first lower portion 1307A positioned on a first lateral side of raised portion 1306 and a second lower portion 1307B positioned on a second lateral side of raised portion 1306. Raised portion 1306 includes a first overhang 1306A extending over first lower portion 1307A and a second overhang extending over second lower portion 1307B.

In various embodiments, a vehicle 2' may include seating adjustment assembly 1120 or alternate seating adjustment assembly 1200 positioned along track 1305. Alternate seating adjustment assembly 1200 includes a base assembly 1300 and a linear force element 1220 extending between base assembly 1300 and a seat 1205. Linear force element 1220 may be a shock absorber, a spring, or other type of dampener. Linear force element 1220 includes a rod 1221 and a body 1222. Body 1222 is configured to hold an incompressible fluid (or relatively incompressible fluid) such as water or oil. In various embodiments, body 1222 may be configured to hold air. Rod 1221 is configured with a head (not shown) which when actuated within body 1222 is configured to dampen a force placed on rod 1221. Linear force element 1220 also includes a lever 1223 which actuates the linear force element 1220 such that the height of seat 1205 can be altered.

Figure 29:
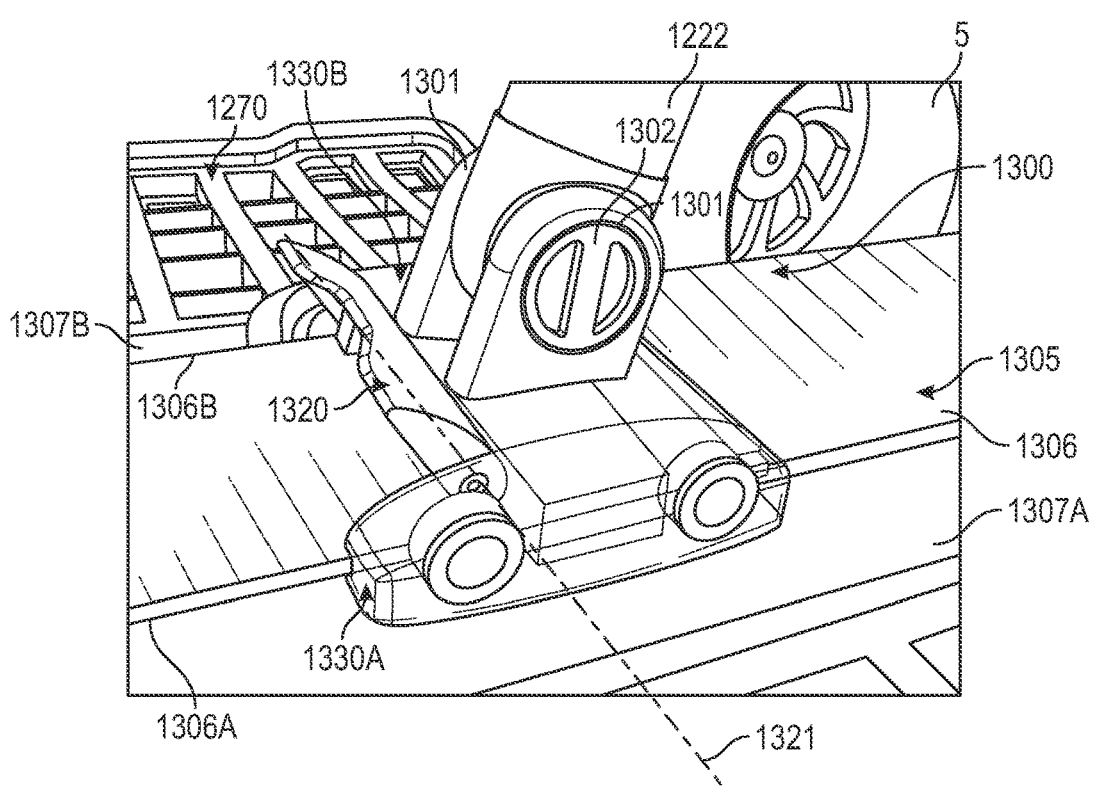
FIG. 29 is a left side perspective view of a seat base adjustment assembly of the seating assembly of FIG. 28.
Figure 30:
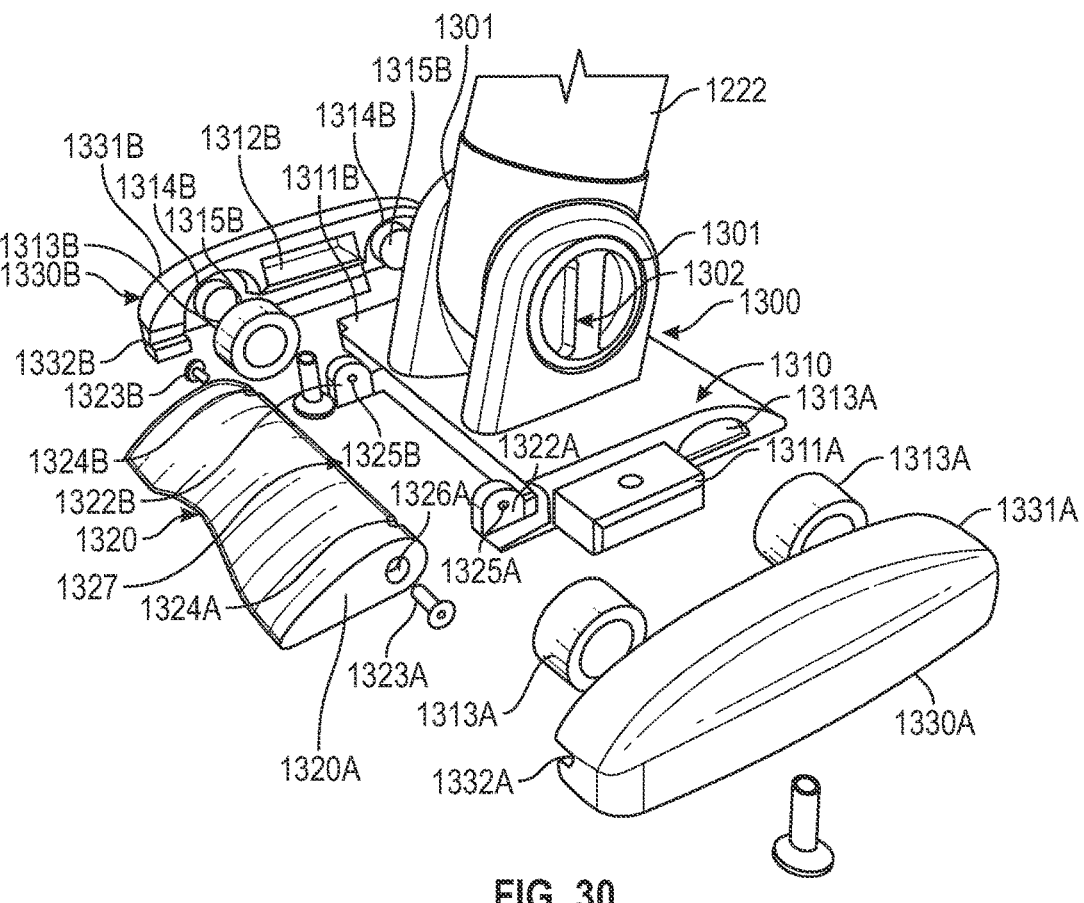
FIG. 30 is an exploded view of the seat base adjustment assembly of FIG. 29.

Referring to FIGS. 29-30, base assembly 1300 includes a base 1310 which comprises a pair of tabs 1301 extending upwardly therefrom. Tabs 1301 are spaced apart and sized to receive a lower portion of body 1222 of linear force element 1220 therebetween. A fastener 1302 extends through tabs 1301 and body 1222 to couple linear force element 1220 to base assembly 1300. In the present embodiment, fastener 1302 is threadedly engaged with linear force element 1220. Further, a user may loosen fastener 1302 and rotate linear force element 1220—and thus seat 1205—relative to base assembly 1300.

Base 1310 comprises a first extension 1311A positioned on a first lateral side of base 1310 and a second extension 1311B positioned on a second lateral side of base 1310. Base assembly 1300 further comprises a first wheel assembly 1330A positioned on the first lateral side of base 1310 and a second wheel assembly 1330B positioned on the second lateral side of base 1310. First wheel assembly 1330A includes a first body 1331A and second wheel assembly 1330B includes a second body 1331B. Each body 1331A, 1331B includes a recess (not shown), 1312B, respectively. Each recess 1312A, 1312B is configured to receive the first extension 1311A and second extension 1311B, respectively, such that first wheel assembly 1330A and second wheel assembly 1330B are coupled to base 1310. Wheel assembly 1330A comprises a pair of wheel wells (not shown) and wheel assembly 1330B comprises a pair of wheel wells 1314B. Each wheel well (e.g., 1314B and wheel well of wheel assembly 1330A) comprises an axle 1315B, respectively, extending inwardly toward base 1310. Each axle 1315B is configured to receive a wheel 1313A, 1313B, respectively.

Base 1310 also comprises a first tab 1322A and a second tab 1322B positioned longitudinally forward of tabs 1301. Each of tabs 1322A, 1322B includes apertures 1325A, 1325B, respectively. A latch 1320 comprises two slots 1324A, 1324B each configured to receive tab 1322A, 1322B, respectively. Latch 1320 also comprises a first lateral side 1320A with a first aperture 1326A and a second lateral side 1320B (not shown) with a second aperture 1326B (not shown). Further, latch 1320 includes a camming surface 1327 positioned at a rearward end thereof. Latch 1320 is positioned on base 1310 such that tab 1322A is positioned within slot 1324A and tab 1322B is positioned within slot 1324B. A first fastener 1323A extends through aperture 1326A and aperture 1325A and a second fastener 1323B extends through aperture 1326B and aperture 1325B such that latch 1320 is rotatably coupled to each of tabs 1322A, 1322B.

In the present embodiment, body 1331A comprises a slot 1332A sized and shaped to receive overhang 1306A and body 1331B comprises a slot 1332B sized and shaped to receive overhang 1306B. That is, the interface of 1332A, 1332B with overhangs 1306A, 1306B is configured to retain base assembly 1300 on track 1305.

Latch 1320 is configured to rotate between a lowered, latched position (FIG. 28), and a raised, unlatched position (FIG. 29). When latch 1320 is in the lowered, latched position, camming surface 1327 is applying a downward force onto raised portion 1306, and thereby, the frictional forces between slots 1332A, 1332B and overhangs 1306A, 1306B is increased. As such, base assembly 1300 is unable to move along track 1305 due to the increased frictional forces. Further, when camming surface 1327 is applying a downward force onto raised portion 1306, wheels 1313A, 1313B are raised away from, and disengage, lower portions 1307A, 1307B. When latch 1320 is in the raised, unlatched position, camming surface 1327 reduces the downward force onto raised portion 1306. As such, the frictional forces between slots 1332A, 1332B and overhangs 1306A, 1306B are decreased and base assembly 1300 is easily moved along track 1305. Further, when latch 1320 is in the raised position, wheels 1313A, 1313B are configured to engage lower portions 1307A, 1307B, and base assembly 1300 is configured to more easily move along track 1305.

Figures 31, 32:
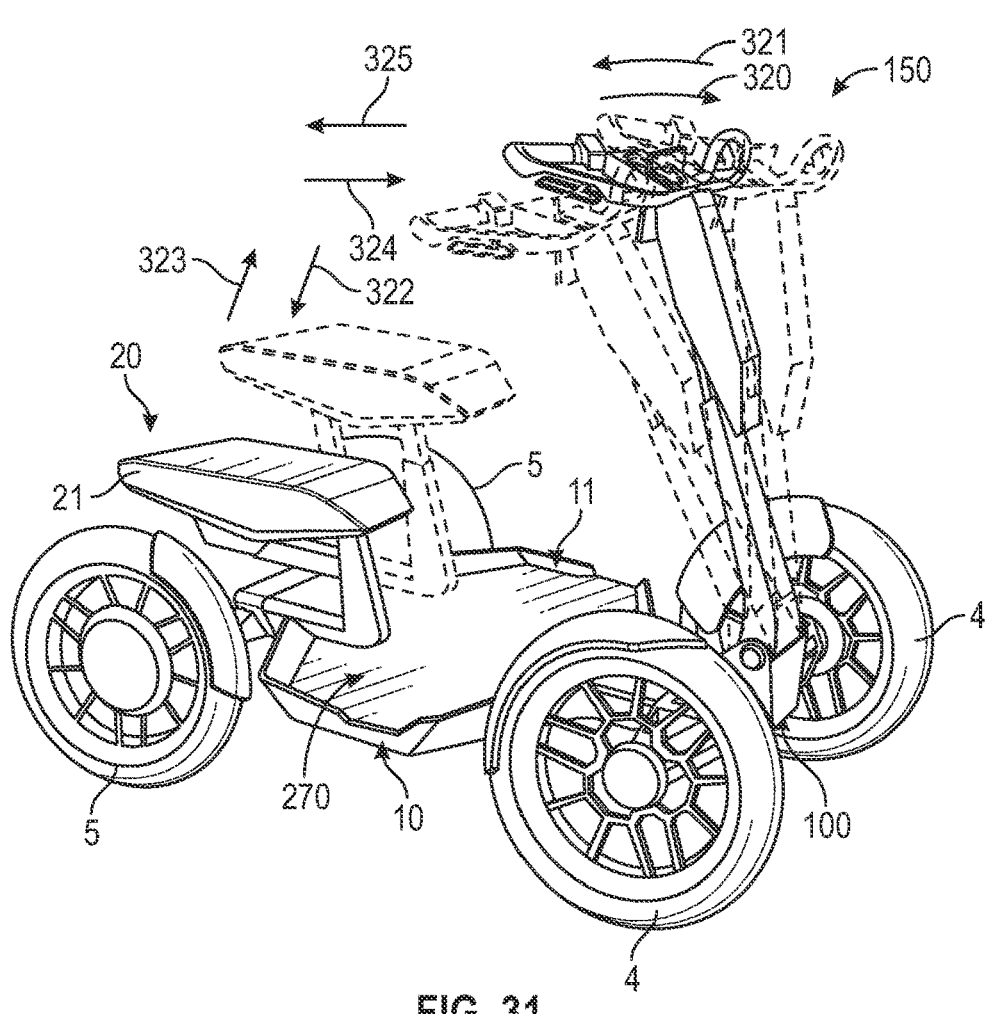
FIG. 31 is a front right perspective view of a vehicle of the present disclosure in a variety of adjusted orientations.
FIG. 32 is a diagrammatic view of a throttle of a vehicle of the present disclosure.

Referring now to FIG. 31, vehicle 2 may be adjusted, as previously described, in a variety of ways. Steering assembly 150 may be adjusted by adjustment assembly 160 in either a forward rotational direction 320 or a rearward rotational direction 321, and simultaneously, seating assembly 20 may be adjusted by seating adjustment assembly 1120 in either a downward direction 322, an upward direction 323, a forward direction 324 or a rearward direction 325. In this way, vehicle 2 is capable of being operated in a plurality of ergonomic positions for any operator. Further, an operator is capable of operating vehicle 2 while sitting on seat 21 or standing within support area 270.

Now referring to FIG. 32, either of, or both of right handlebar 152 or left handlebar 153 comprises a rotatable handgrip 350. Rotatable handgrip 350 includes a grip 351 and a flange 352. In the present embodiment, rotatable handgrip 350 is shown on right handlebar 152, however, in various embodiments, rotatable handgrip 350 may be inverted and positioned on left handlebar 153. In the present embodiment, rotatable handgrip 350 is able to rotate in either a forward rotational direction 357 or a rearward rotational direction 356. In the present embodiment, rotatable handgrip 350 is a throttle input 353 (FIG. 13) for vehicle 2. A user may rotate handgrip 350 in the forward rotational direction 357 and a positive throttle input 353 is provided to powertrain 60, 60'. A user may rotate handgrip 350 in a rearward rotational direction 356 and a negative throttle input 353 is provided to powertrain 60, 60'. That is, a positive throttle input 353 provides a first signal to motor controller 283, 288, 291, 293, 295, 297 to request a positive torque from motor assembly 80, 80' and a negative throttle input 353 provides a second signal to motor controller 283, 288, 291, 293, 295, 297 to request a negative torque from motor assembly 80, 80'.

In the present embodiment, when handgrip 350 is rotated forward, the angle of rotation determines the level of acceleration requested by powertrain 60, 60'. That is, the further the handgrip 350 is rotated forward, the greater the rotational angle of handgrip 350, and the greater level of acceleration that will be requested by powertrain 60, 60'. Further, when handgrip 350 is rotated forwardly, powertrain 60, 60' is placed in a 'Forward' mode. In the present embodiment, when a user stops rotating handgrip 350, a requested forward acceleration is reduced to zero and subsequently, a user may then provide a first rearward rotational force to handgrip 350 which places powertrain 60, 60' in a 'Reverse' mode. Further, a second, subsequent rearward rotational force to handgrip 350 provides the request to powertrain 60, 60' to provide a negative torque, or acceleration, to motor assembly 80, 80'.

In various embodiments, handgrip 350 is configured to provide a resistance to the user when rotated in either of, or both of, the forward direction 357 or the rearward direction 356. In various embodiments, as the rotational angle of rotatable handgrip 350 is increased in either forward direction 357 or rearward direction 356, the amount of resistance is increased.

Still referring to FIG. 32, in the present embodiment, the reverse acceleration requested by handgrip 350 being rotated in a rearward direction 356 at a first angle is less than the forward acceleration requested by handgrip 350 being rotated in a forward direction 357 at the first angle. In various embodiments, for a given first angle in both the forward direction 357 and rearward direction 356, the reverse acceleration is approximately one-half the forward acceleration. In various embodiments, for a given first angle in both the forward direction 357 and rearward direction 356, the reverse acceleration is approximately one-fourth the forward acceleration.

Further, display 9 may include a screen layout (not shown) configured to display if either the 'Forward' mode or the 'Reverse' mode is engaged. In various embodiment, when the 'Forward' mode is engaged, a bezel (not shown) of the display is lit up to be a green color. In various embodiments, when the 'Reverse' mode is engaged, the bezel of the display is lit up to be a red color. In various embodiments, the display is configured to display a rotational angle of the rotatable handgrip 350. In various embodiments, a forward rotation of handgrip 350 is represented by a positive angle and a rearward rotation of handgrip 350 is represented by a negative angle.

Rotatable handgrip 350 may also include visual indicators indicating whether handgrip 350 is rotated in the forward direction 357 or the rearward direction 356. Illustratively, handgrip 350 includes a reference line 358 positioned on the flange 352 and a neutral line 359 is positioned on grip 351. In the present embodiment, when neutral line 359 is aligned with reference line 358, the throttle input 353 is zero. That is, vehicle 2 is generally in a 'Neutral' state. Further, an 'F' character 360 is placed below the neutral line 359 and an 'It' character is placed above the neutral line 359. When a user rotates rotatable handgrip 350 in a forward direction 357, the 'F' character 360 will be generally aligned with the reference line 358 indicating that vehicle 2 is in a 'Forward' mode. Further, when a user rotates rotatable handgrip 350 in a rearward direction 356, the 'It' character 361 will be generally aligned with the reference line 358 indicating that vehicle 2 is in a 'Reverse' mode. In various embodiments, reference line 358 is positioned on right handlebar 152 and neutral line 359 is positioned on either flange 352 or grip 351.

Now referring to FIGS. 33-34B, an alternate vehicle 370 will be described. Vehicle 370 is understood to operate substantially similarly to vehicles 2, 2'. Vehicle 370 comprises a main frame portion 371 supported by at least one front ground engaging member 374 and at least one rear ground engaging member 375. In the present embodiment, vehicle 370 comprises a pair of front ground engaging members 374 and a pair of rear ground engaging members 375. Main frame portion 371 is comprised of a front frame portion 372, a rear frame portion 376, and an operator platform portion 373. Vehicle 370 also comprises a steering assembly 377 comprising a steering shaft 377A and a pair of handlebars 377B. Vehicle 370 also comprises a seating assembly 378 comprising a seat post 378A and a seat 378B supported by seat post 378A.

Illustratively, front frame portion 372 comprises a front casting 379 positioned laterally intermediate front ground engaging members 374. Front casting 379 may be made of aluminum, steel, a rigid plastic, a polymer, a metallic compound, or another rigid material. Front casting 379 is generally in the shape of a triangular pyramid with a first or rear face 379A, a second or left face 379B, and a third or right face 379C. An interior volume 372A is created between rear face 379A, left face 379B and right face 379C. Front casting 379 further comprises a first aperture 385A and a second aperture 385B facing rearwardly in first face 379A. Illustratively, each of first aperture 385A and second aperture 385B are positioned at an identical vertical height from a ground surface 400. Second face 379B comprises a first aperture 382A and third face 379C comprises a second aperture 382B. Vehicle 370 also includes a powertrain (not shown). In the present embodiment, the powertrain of vehicle 370 includes a motor (not shown) positioned within interior volume 372A, and a first halfshaft (not shown) extends from the motor through aperture 382A to a first of the pair of front ground engaging members 374 and a second halfshaft (not shown) extends from the motor through aperture 382B to a second of the pair of front ground engaging members 374. In various embodiments, a front drive is positioned within interior volume 372A and is operably coupled between the pair of halfshafts and the motor.

Front casting 379 also comprises a plurality of mounting points 383A on left face 379B and a plurality of mounting points 383B on right face 379C. Each of mounting points 383A, 383B are used to mount a front suspension (not shown) between front casting 379 and front ground engaging members 374. Front casting 379 also includes a first shock mounting point 384A and a second shock mounting point 384B positioned at an upper extent thereof. Illustratively, first shock mounting point 384A is positioned vertically above mounting points 383A and a shock absorber (not shown) extends between first shock mounting point 384A and the front suspension. Further, second shock mounting point 384B is positioned vertically above mounting points 383B and a shock absorber (not shown) extends between second shock mounting point 384B and the front suspension. Front casting 379 also includes a steering shaft aperture 381 positioned intermediate first shock mounting point 384A and second shock mounting point 384B. Steering shaft aperture 381 receives steering shaft 377A. Front casting 379 also includes a front hinge insert 393 positioned intermediate first aperture 385A and second aperture 385B. Front frame portion 372 also comprises a first frame member 380A coupled to front casting 379 at first aperture 385A and a second frame member 380B coupled to front casting 379 at second aperture 385B.

Rear frame portion 376 comprises a rear casting 386. Rear casting 386 comprises a first member receiver 388A and a second member receiver 388B. First member receiver 388A is configured to receive first frame member 380A and second member receiver 388B is configured to receive second frame member 380B. As best seen in FIG. 34B, member receivers 388A, 388B, allow frame members 380A, 380B to extend through first member receiver 388A, second member receiver 388B so that first member receiver 388A, second member receiver 388B can slide along frame members 380A, 380B. Rear casting 386 also comprises a rear hinge insert 391 positioned laterally intermediate first member receiver 388A and second member receiver 388B. Rear casting 386 also comprises a seat post receiver 389 extending generally upwardly. Seat post receiver 389 is configured to receive seat post 378A.

Figure 33:
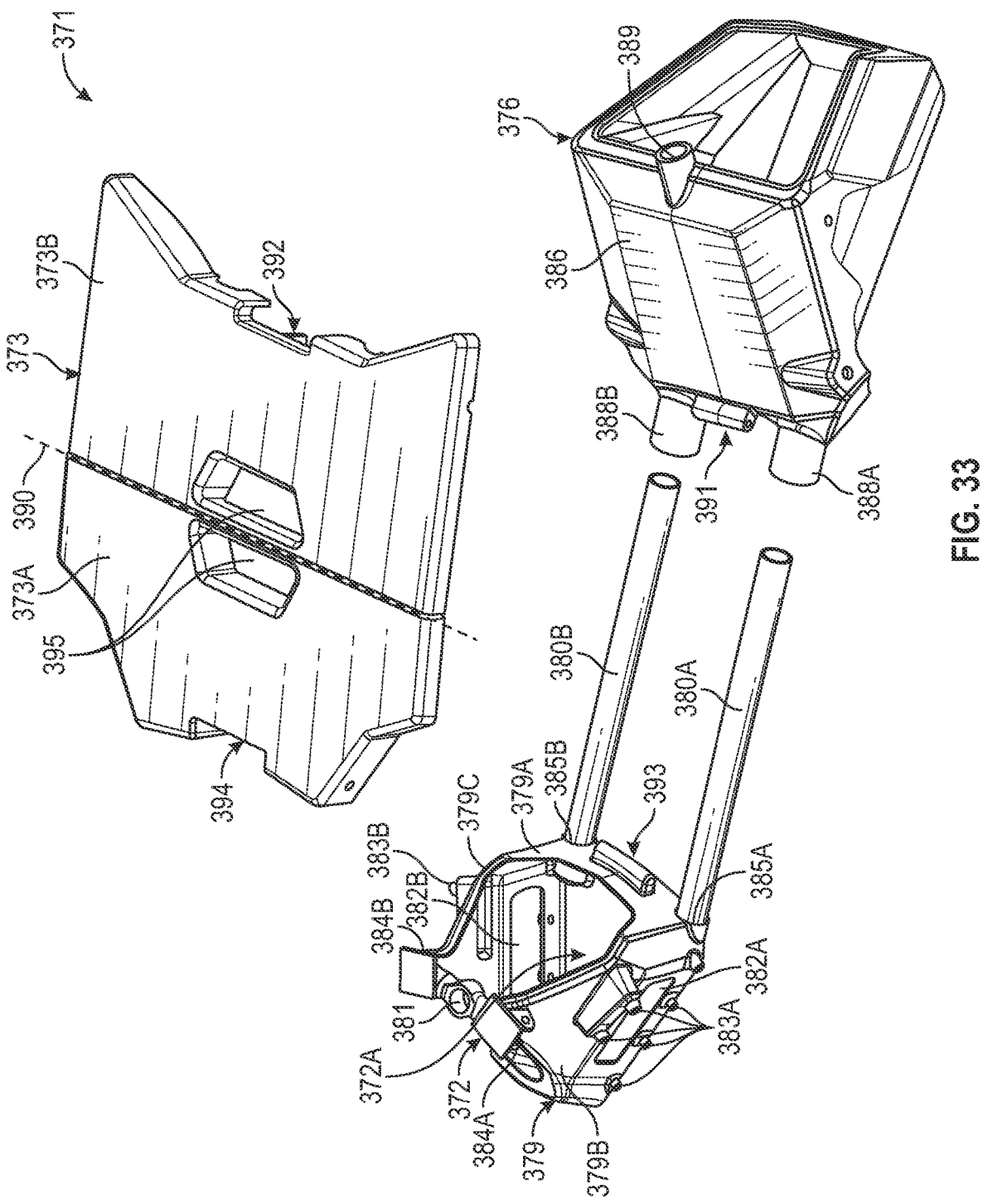
FIG. 33 is an exploded view of a portion of an alternate vehicle of the present disclosure.
Figure 34A:
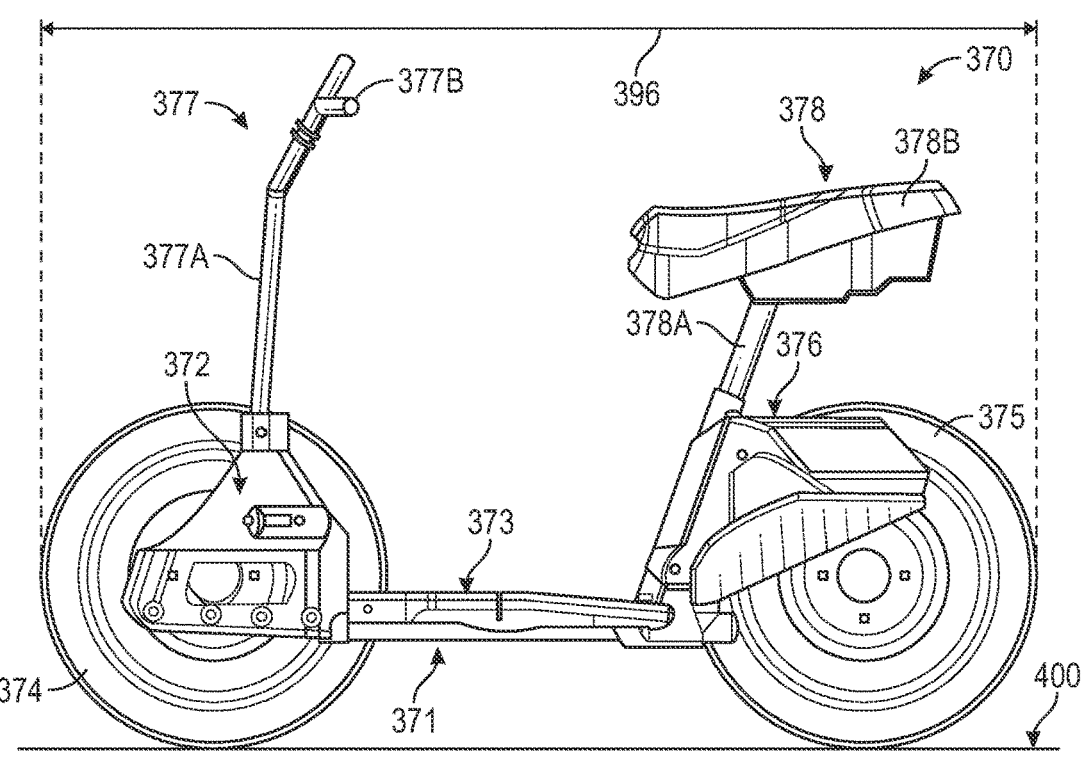
FIG. 34A is a left side view of an alternate vehicle of the present disclosure in an extended position with the components of FIG. 33.
Figure 34B:
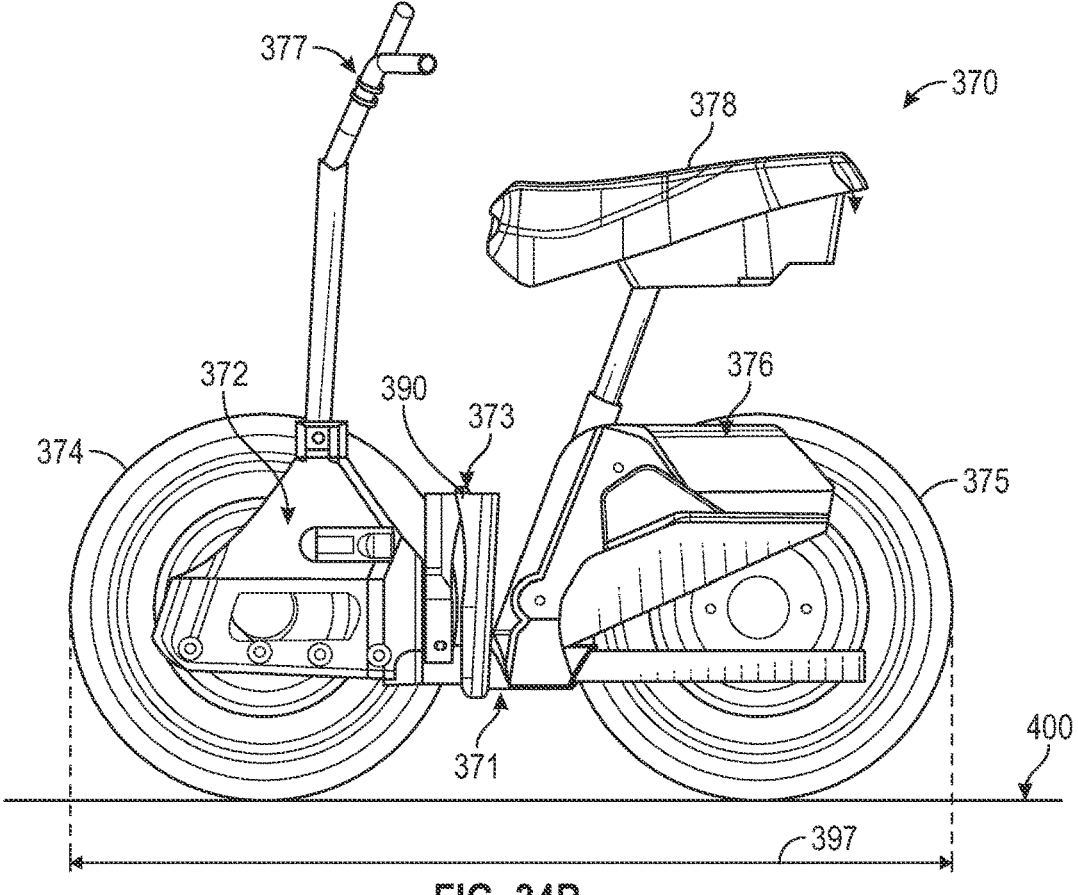
FIG. 34B is a left side view of the alternate vehicle of FIG. 34A in a compressed position.

Still referring to FIGS. 33-34B, in one embodiment, operator platform portion 373 is configured with a first portion 373A and a second portion 373B; however, in other embodiments, operator platform 373 may be a single platform. First portion 373A and second portion 373B are coupled along a folding axis 390. That is, first portion 373A and second portion 373B are configured to rotate relative to each other about folding axis 390. A hinge (not shown) is coupled to each of first portion 373A and second portion 373B to allow the folding of operator platform 373 about folding axis 390. In the present embodiment, a standard ball bearing hinge is used. In various embodiments, the hinge may be a spring-loaded hinge, barrel hinge, piano hinge or other type of hinge. First portion 373A comprises a front hinge receiver 394 configured to interface and couple with front hinge insert 393. Further, rear portion 373B comprises a rear hinge receiver 392 configured to interface and couple with rear hinge insert 391. First portion 373A and second portion 373B may also each include handles 395.

Now referring to FIGS. 34A-34B, vehicle 370 is shown in an operating, expanded position (FIG. 34A) and a folded position (FIG. 34B). As shown in FIG. 34A, vehicle 370 is an operable position. Operator platform portion 373 is unfolded and an operator may step onto operator platform portion 373 to operate vehicle 370. However, when in the folded position shown in FIG. 34B, rear frame portion 376 is pushed toward front frame portion 372 such that first member receiver 388A and second member receiver 388B slide along respective first frame member 380A and second frame member 380B, and operator platform portion 373 is folded about folding axis 390. In the folded position, vehicle 370 is reduced in length. As shown in FIG. 34A, when vehicle 370 is fully extended, vehicle 370 has a full length 396 and, as shown in FIG. 34B, when vehicle is folded, vehicle 370 has a folded length 397. In the present embodiment, folded length 397 is less than 90% of the full length 396. In various embodiments, folded length 397 is less than 75% of the full length 396. In various embodiments, folded length 397 is less than 50% of the full length 396. Vehicle 370 may be stored, moved, or otherwise utilized in the folded position when not being used. A user may more easily move through halls, stairwells, doorways, or around other obstacles in the folded position when transporting vehicle 370.

Figure 35:
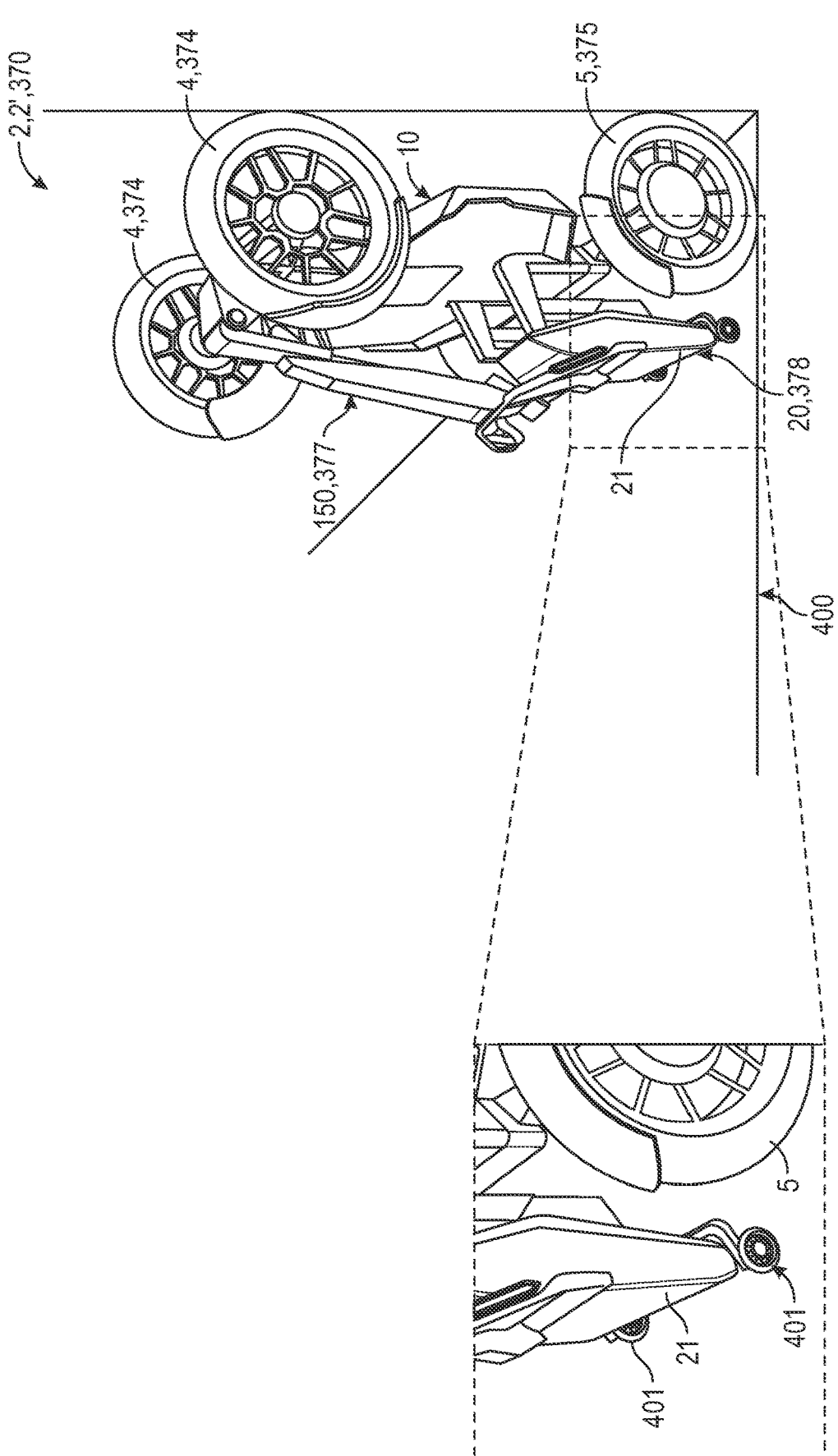
FIG. 35 is a conceptual view of a vehicle of the present disclosure in a folded, upright position with support wheels.

Now referring to FIG. 35, any of vehicles 2, 2', 370 may be configured such that they may be folded in a compact configuration. Illustratively, steering assembly 150, 377 is able to be folded downward into an operator area and a seating assembly 20, 378 may be moved downward and/or rotated downward into an operator area. In the present embodiment, when in a folded configuration (FIG. 35), it may be desirable to move vehicle 2, 2', 370 in the folded configuration. Vehicle 2, 2', 370 may be configured with a plurality of wheels 401 coupled to seating assembly 20. Illustratively, wheels 401 are coupled to a rearward extent of seat 21 such that when vehicle 2, 2', 370 is positioned substantially vertical, as shown in FIG. 35, wheels 401 contact the ground surface 400 along with rear ground engaging members 5, 375. Wheels 401 provide a larger support base for moving vehicle 2, 2', 370 when in the folded configuration.

Figure 36:
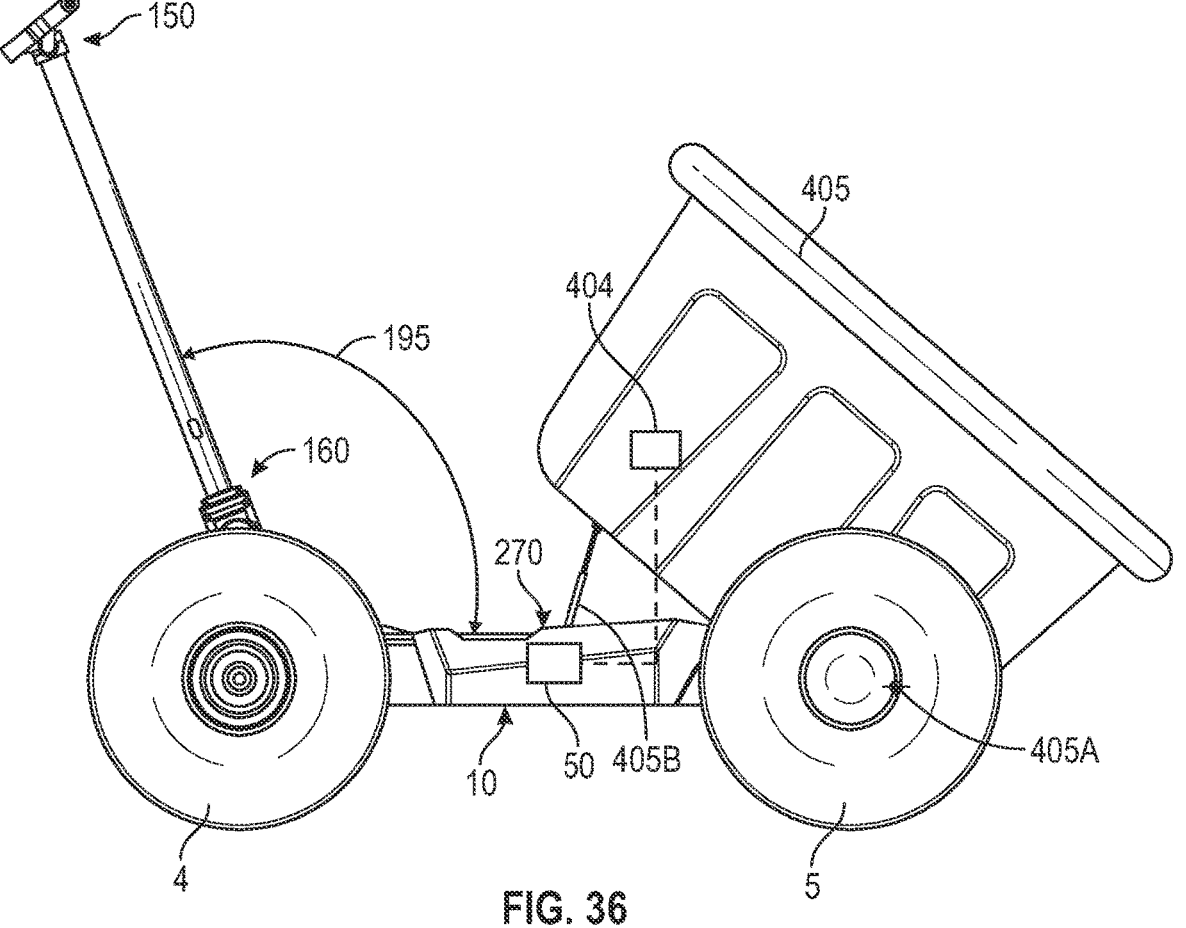
FIG. 36 is a left side view of a vehicle of the present disclosure with the steering assembly folded forward and a dump box.
Figure 37:
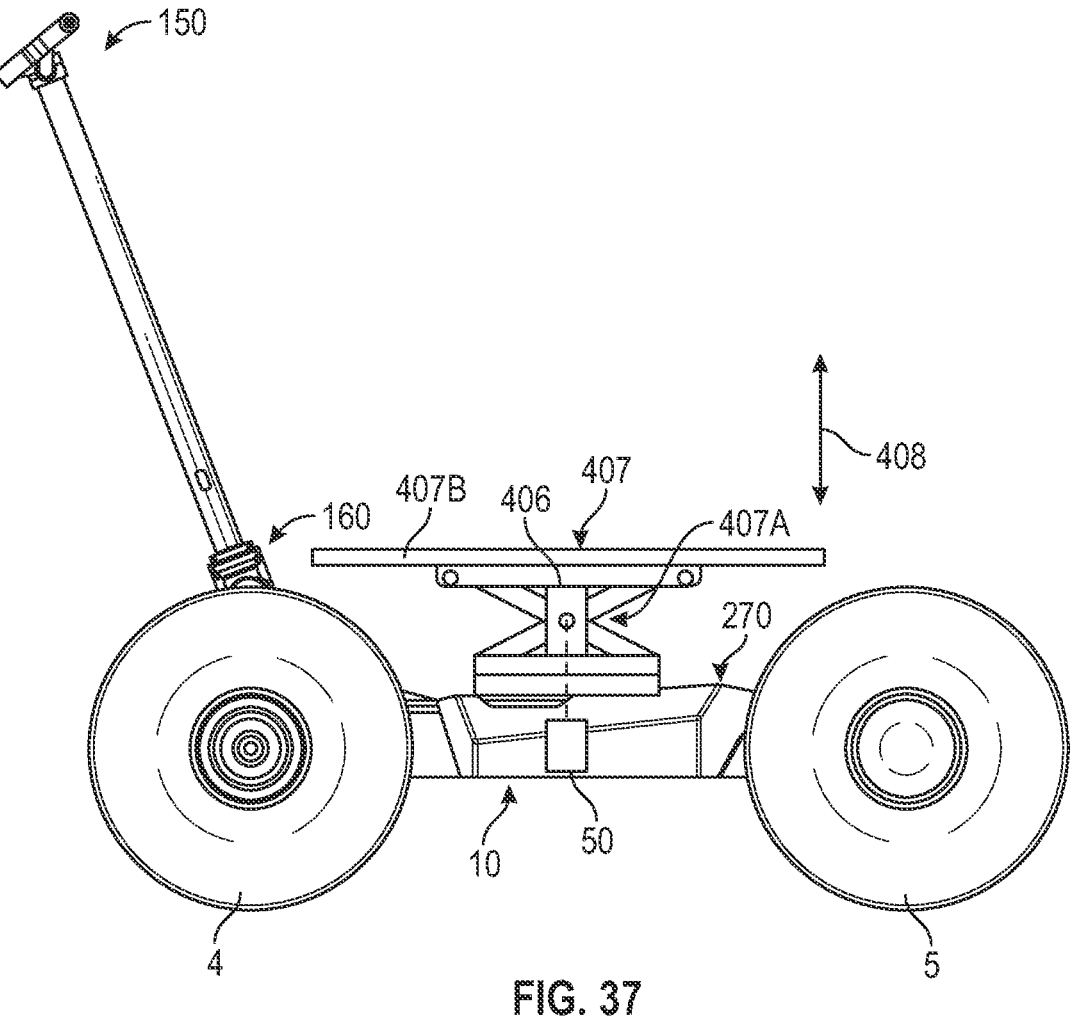
FIG. 37 is a left side view of a vehicle of the present disclosure with the steering assembly folded forward and a lifting assembly.

Now referring to FIGS. 36-39, vehicle 2 may be configured with a plurality of accessories. The plurality of accessories, as will be further described, may be operable with any of vehicles 2, 2', 370. As shown in FIG. 36, vehicle 2 may be configured with a dump box 405. Dump box 405 is configured to rotate about a rotational axis 405A. In the present embodiment, rotational axis 405A is positioned within an envelope defined by rear ground engaging members 5. In various embodiments, dump box 405 comprises a controller 404 configured to control a hydraulic shock absorber 405B. Controller 404 is communicably coupled to controller 50 and an operator of vehicle 2 may provide an input to user interface 8 or user input 15 to send instructions, by controller 50, to either raise or lower dump box 405. In the present embodiment, dump box 405 is removably coupled to vehicle 2.

Vehicle 2 may also be configured with a lift 407. In the present embodiment, lift 407 is positioned on top of operator support area 270. In various embodiments, lift 407 is coupled to frame 10. Lift 407 generally comprises a lift linkage 407A and a platform supported by the lift linkage. In the present embodiment, lift 407 is a scissor lift. Lift 407 may also comprise a controller 406 communicably coupled to controller 50. Controller 406 is operably coupled to a motor (not shown) of lift 407. An operator of vehicle 2 may provide an input to user interface 8 or user input 15 to send instructions, by controller 50, to raise or lower lift 407. In the present embodiment, lift 407 is removably coupled to vehicle 2.

Figure 38:
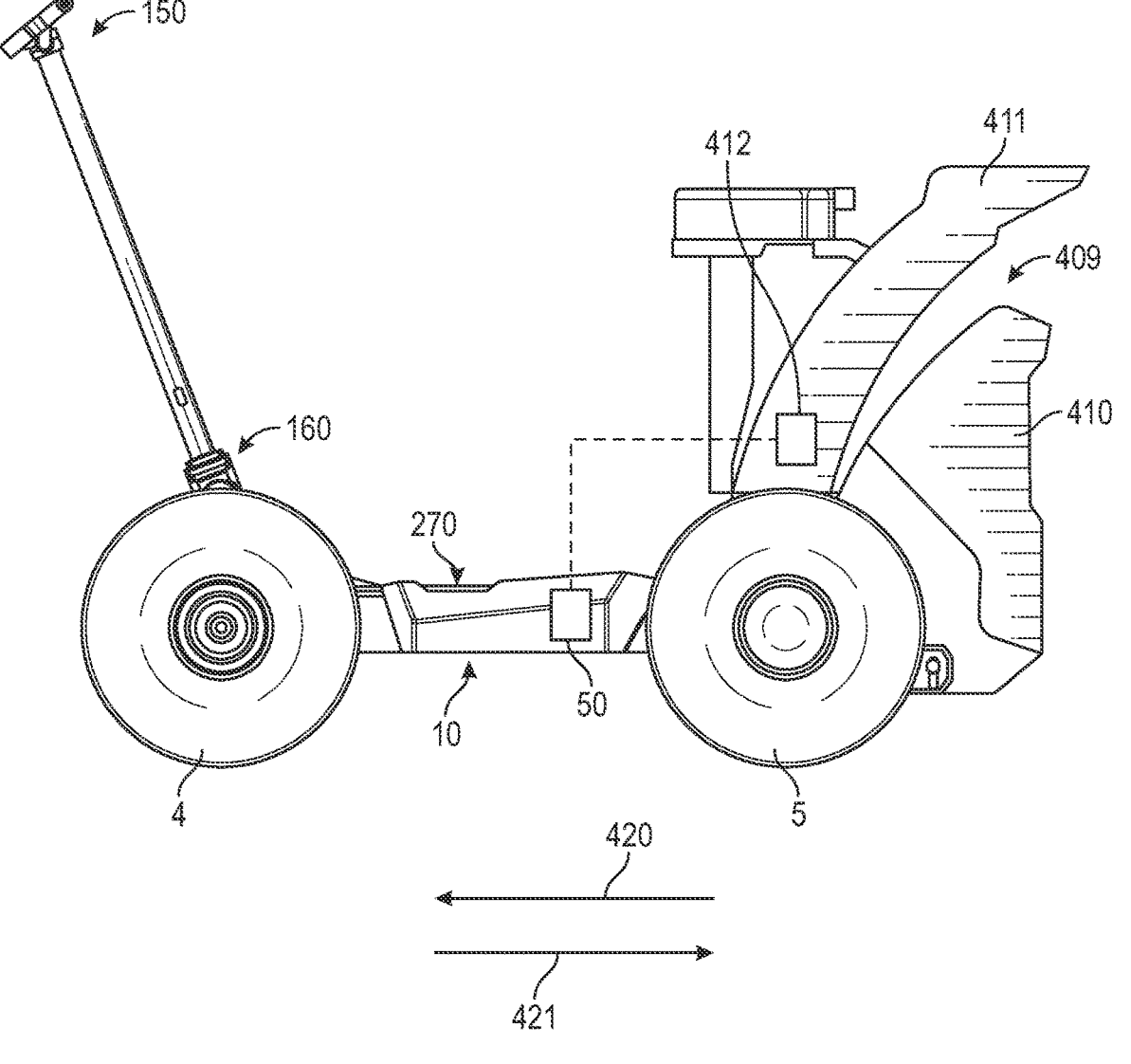
FIG. 38 is a left side view of a vehicle of the present disclosure with the steering assembly folded forward and a snowblower.

Now referring to FIG. 38, vehicle 2 may be configured with a snowblower 409. Snowblower 409 comprises a housing 410 coupled to the rear of vehicle 2. Illustratively, housing 410 is coupled intermediate rear ground engaging members 5. Snowblower 409 also includes a chute 411 fluidly coupled to housing 410. Snowblower 409 may also include a controller 412 configured to control the operation of snowblower 409. In one example, controller 412 is configured to control snowblower 409 between an ON position and an OFF position. In another example, controller 412 is configured to control a speed of snowblower 409. Controller 412 is communicably coupled to controller 50. An operator of vehicle 2 may provide an input to user interface 8 or user input 15 to send instructions, by controller 50 to control snowblower 409 between an ON position, an OFF position, or a speed of snowblower 409.

Figure 39:
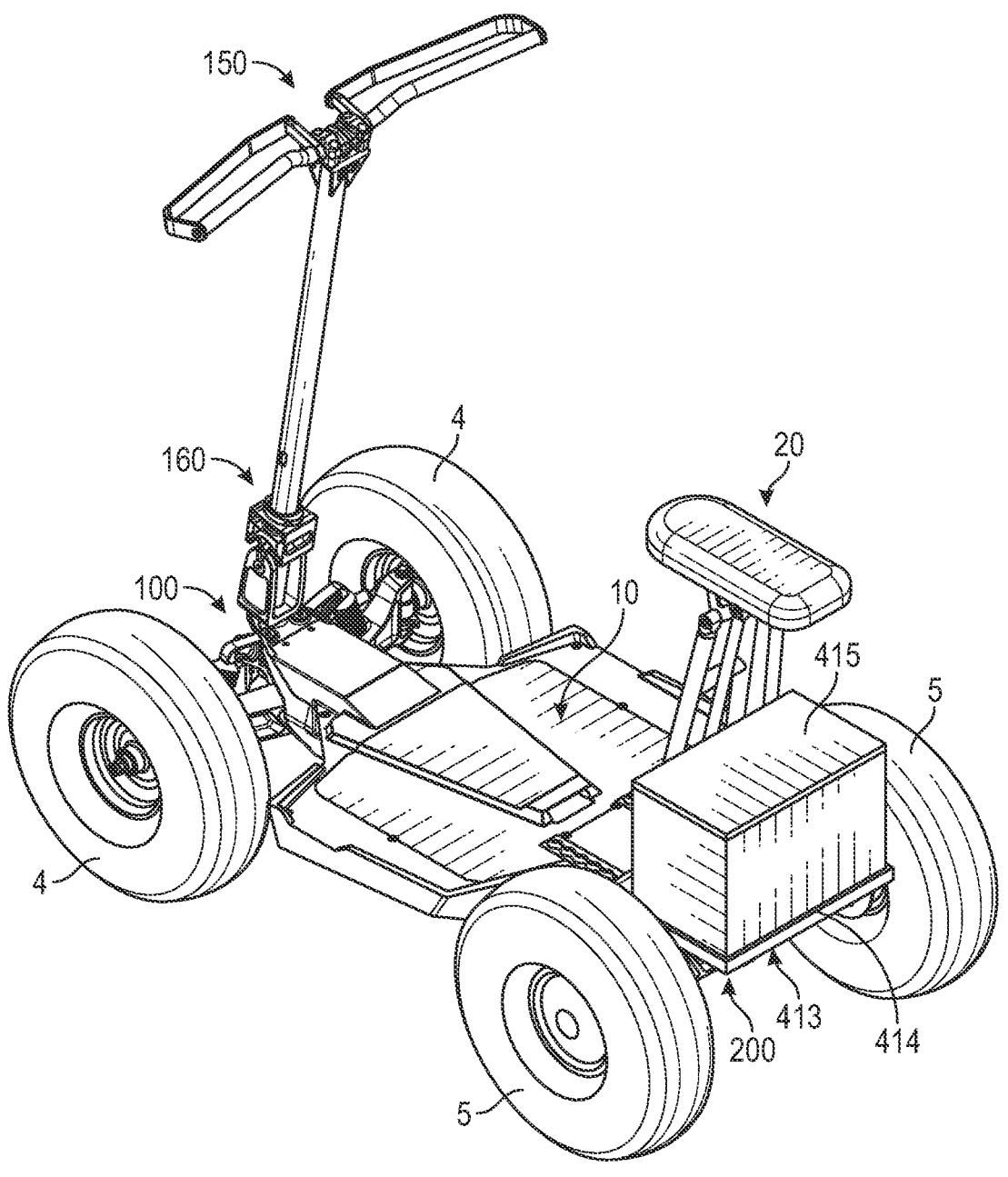
FIG. 39 is a rear left perspective of a vehicle of the present disclosure with a storage box.

Now referring to FIG. 39, vehicle 2 may also include a storage assembly 413 comprising a rear platform 414 coupled to frame 10. Platform 414 may be configured to hold a storage container 415. Illustratively, platform 414 and storage container 415 are positioned vertically above rear suspension 200 and rearward of seating assembly 20. In various embodiments, storage container 415 is lockable storage configured to be controlled by controller 50. An operator of vehicle 2 may provide an input to user interface 8 or user input 15 to send instructions, by controller 50 to control a LOCKED or UNLOCKED state of storage container 415.

In yet another embodiment, vehicle 2 may be configured with a lawn mower 417 (FIG. 13). Lawn mower 417 may be configured with a single blade (not shown) or a plurality of blades configured to mow a lawn. The lawn mower 417 may also comprise a controller (not shown) communicably coupled to controller 50. An operator of vehicle 2 may provide an input to user interface 8 or user input 15 to send instructions, by controller 50 to control lawn mower 417 between an ON position, an OFF position, or a speed of lawn mower 417.

In the present embodiment, vehicle 2 may be configured to receive any type of powered accessory (not shown). An accessory controller 36 (FIG. 13) may be configured to monitor and/or provide instructions to an additional powered accessory. Accessory controller 36 may also be configured to provide instructions to dump box 405, lift 407, snowblower 409, storage container 415, or lawn mower 417. Accessory controller 36 may be configured to provide an ON instruction, an OFF instruction, or a variable power instruction.

Figure 40:
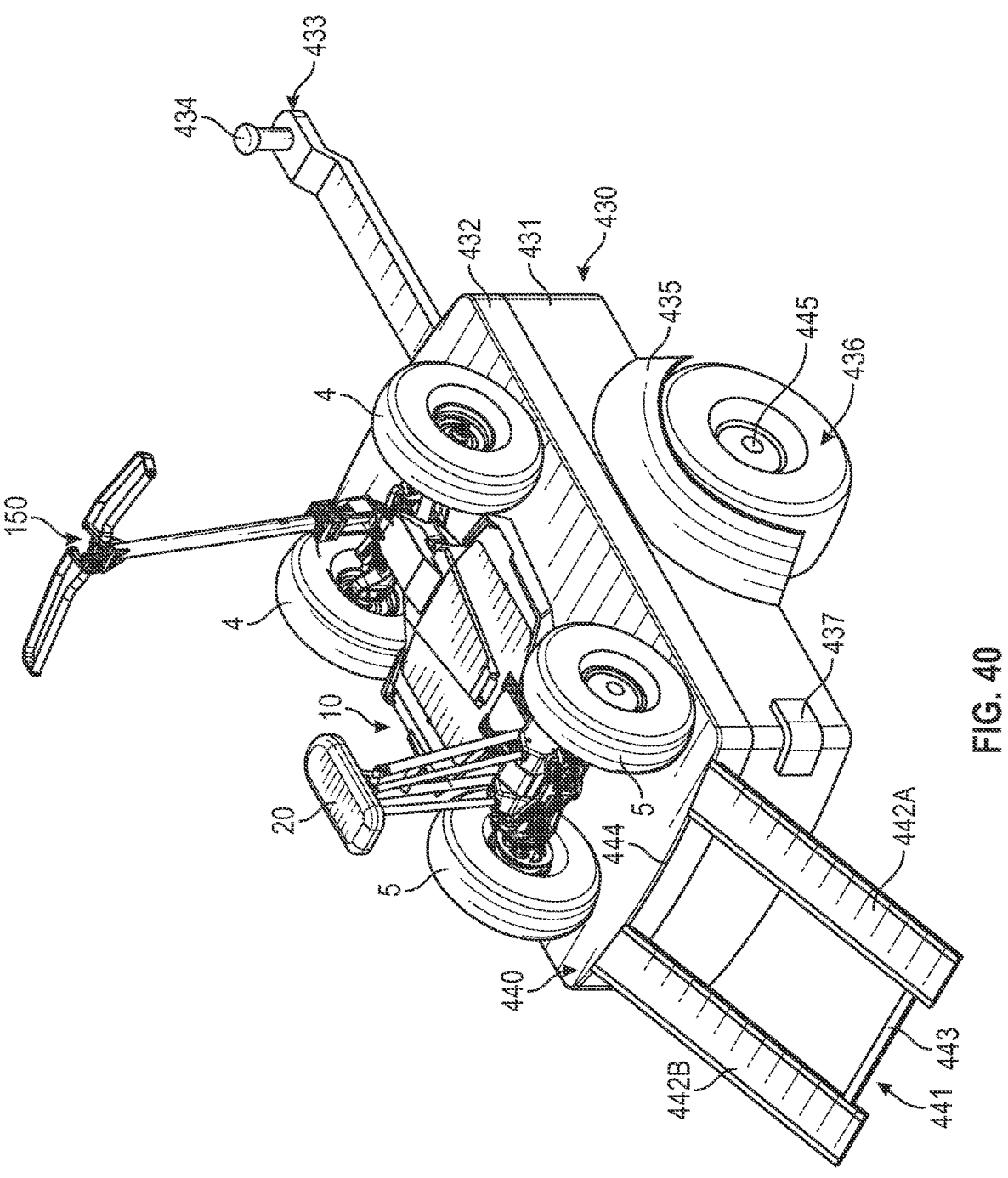
FIG. 40 is a rear right perspective view of a vehicle of the present disclosure and an accessory trailer.

Referring now to FIG. 40, an accessory trailer 430 is configured to interface with any of vehicles 2, 2', 370.

Accessory trailer 430 comprises a main frame 431 and a trailer cover 432. The interior of main frame 431 and trailer cover 432 comprises an interior volume (not shown) configured as a storage space. In various embodiments, the interior volume is configured to store tools, accessories, spare batteries, and other items. An upper surface 440 of trailer cover 432 is configured to support vehicle 2. Illustratively, each of ground engaging members 4, 5 are configured to be supported by trailer cover 432. Trailer 430 also comprises a pair of ground engaging members 436 (only one shown) coupled by an axle 445. In the present embodiment, ground engaging members 436 are wheels. In various embodiments, ground engaging members 436 are tracks, skis, or another type of ground engaging member. Main frame 431 and trailer cover 432 are supported by ground engaging members 436 and axle 445. A tongue 433 is coupled to main frame 431 and extends generally forwardly. Tongue 433 comprises a ball 434 positioned thereon configured to couple to another vehicle, which may be vehicle 2, 2', 370. Trailer 430 also comprises a fender 435 configured to extend laterally outward from main frame 431 and covers ground engaging members 436. Trailer 430 also comprises a pair of rear lights 437 (only one shown) configured to provide lighting indications by a driver of the vehicle towing trailer 430.

Trailer 430 also comprises a ramp assembly 441 comprising a first ramp 442A and a second ramp 442B. A support beam 443 is coupled intermediate first ramp 442A and second ramp 442B to increase the overall rigidity of ramp assembly 441. Trailer cover 432 also comprises an interior volume (not shown) accessible by an aperture 444 configured to receive and retain the ramp assembly 441. Illustratively, aperture 444 is sized and shaped to receive ramp assembly 441. In the present embodiment, trailer cover 432 is sized and shaped so that each of ground engaging members 4, 5 are positioned laterally inward of wheels 436 and fenders 435.

In various embodiments, vehicle 2, 2', 370 is configured to fit within the interior volume (not shown) of trailer 430. Vehicle 2, 2', 370 may be folded into a storage configuration and placed within the interior volume of trailer 430. In one embodiment, an operator of vehicle 2, 2', 370 may store vehicle 2, 2', 370 within trailer 430 and then tow trailer 430 and vehicle 2, 2', 370 to a desired operating area (e.g., park, trails, etc.) with a car, truck or other vehicle and remove vehicle 2, 2', 370 from trailer 430 for use.

In one embodiment, a user may store vehicle 2, 2', 370 on top of trailer 430 on trailer cover 432, the user may further store tools, equipment, or other accessories within trailer 430, and pull trailer 430 and vehicle 2, 2', 370 to a desired location (e.g., campsite, trailhead, etc.). The user can then unload vehicle 2, 2', 370 and couple trailer 430 to vehicle 2, 2', 370 to be towed to a campsite, for example.

Figure 41:
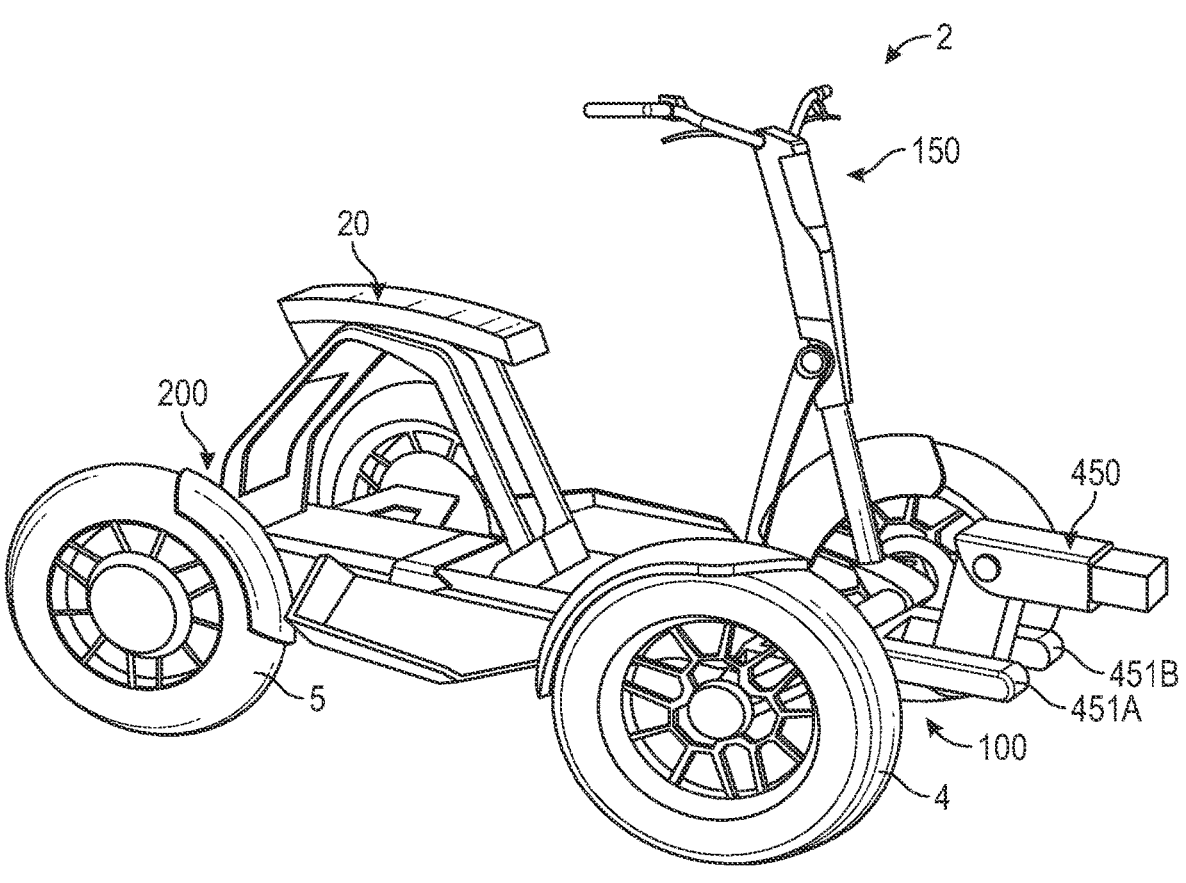
FIG. 41 is a front right perspective view of a vehicle of the present disclosure with a hitch assembly.
Figure 42A:
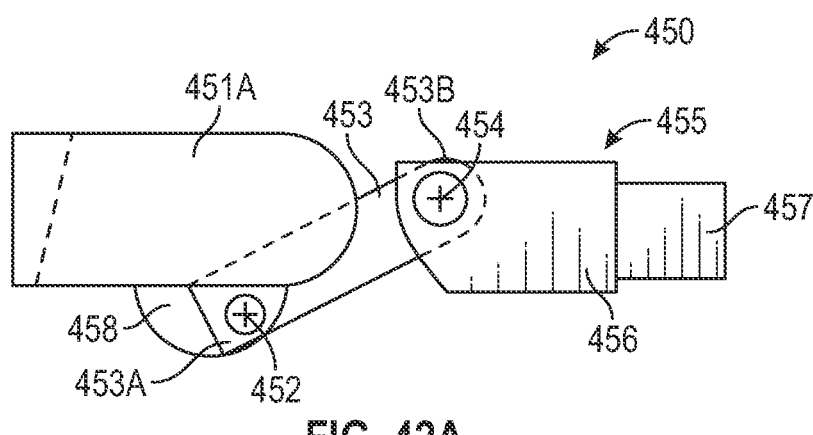
FIG. 42A is a side view of the hitch assembly of FIG. 41 in a first position.
Figure 42B:
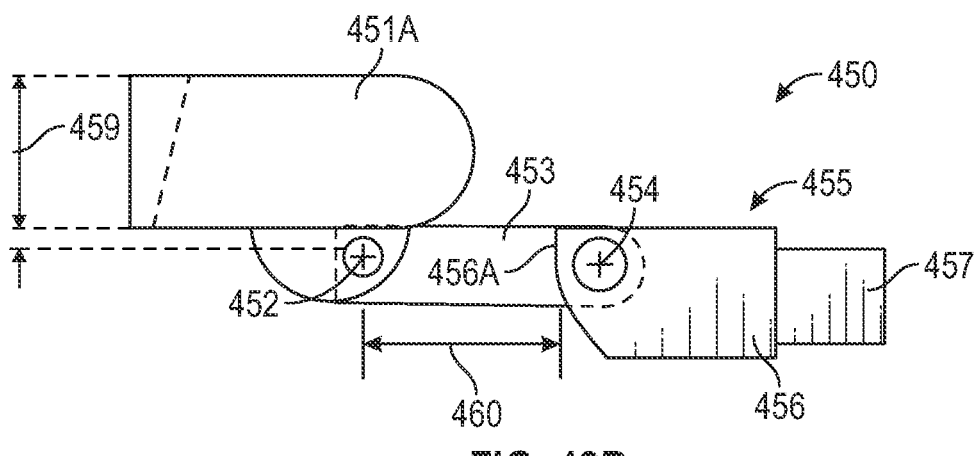
FIG. 42B is a side view of the hitch assembly of FIG. 41 in a second position.
Figure 42C:
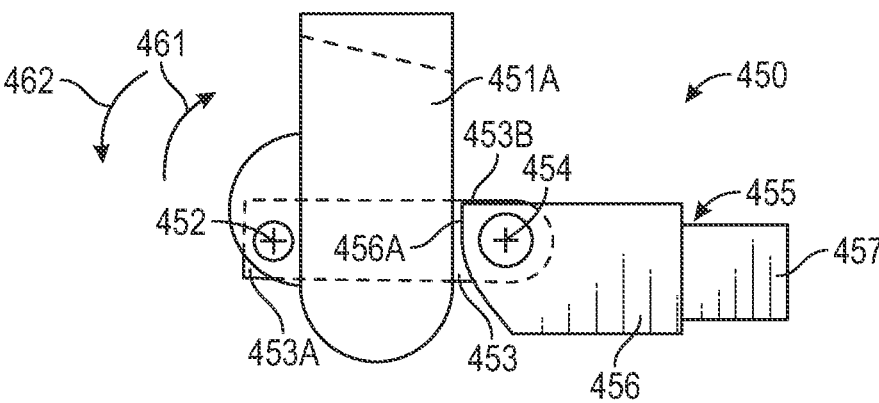
FIG. 42C is a side view of the hitch assembly of FIG. 41 in a third position.

Now referring to FIGS. 41-42C, a hitch assembly 450 will be described. In the present embodiment, hitch assembly 450 is operably coupled to any of vehicles 2, 2', or 370. In various embodiments, hitch assembly 450 is fixed to vehicle 2. In various embodiments, hitch assembly 450 is removably coupled to vehicle 2. In the present embodiment, hitch assembly 450 is coupled to a front portion of vehicle 2 adjacent front suspension 100 and steering assembly 150 and/or intermediate front ground engaging members 4. In various embodiments, hitch assembly 450 is coupled to a rear portion of vehicle 2 adjacent rear suspension 200 and/or intermediate rear ground engaging members 5.

Hitch assembly 450 comprises a first vehicle connection frame member 451A and a second vehicle connection frame member 451B. In the present embodiment, first vehicle connection frame member 451A and second vehicle connection frame member 451B are parallel to each other and laterally aligned. Each of first vehicle connection frame member 451A and second vehicle connection frame member 451B has a connection member height 459. Each of first vehicle connection frame member 451A and second vehicle connection frame member 451B comprises a semicircular member 458 positioned at a bottom-most, forward-most extent thereof. An intermediate link 453 is rotatably coupled to both first vehicle connection frame member 451A and second vehicle connection frame member 451B about a first pinned axis 452. First pinned axis 452 is positioned on semicircular member 458. A first end 453A of intermediate link 453 is positioned laterally intermediate first vehicle connection frame member 451A and second vehicle connection frame member 451B. A hitch member 455 is coupled to a second end 453B of intermediate link 453. Hitch member 455 generally comprises a support portion 456 and a hitch 457. Illustratively, second end 453B is pinned and rotatably coupled to hitch member 455 about second pinned axis 454.

In the present embodiment, hitch 457 is configured to be coupled to another vehicle, such as a car, SUV, truck, recreational vehicle, utility vehicle, ATV, or the like. That is, hitch assembly 450 is configured to couple between vehicle 2, 2', 370 and another vehicle, as previously described. As shown in FIGS. 42A-42C, hitch assembly 450 is configured to rotate and change positions to change orientation and/or packaging of vehicle 2, 2', 370 relative to another vehicle as previously described.

As shown in FIGS. 42A-42B, first vehicle connection frame member 451A and second vehicle connection frame member 451B are configured to move upwardly and downwardly as intermediate link 453 rotates about second pinned axis 454. When intermediate link 453 is substantially parallel (shown in FIG. 42B) to a ground level (not shown), first pinned axis 452 is positioned a first distance 460 from a first edge 456A of support portion 456. In the present embodiment, first distance 460 is greater than connection member height 459. As shown in FIG. 42C, first vehicle connection frame member 451A and second vehicle connection frame member 451B are configured to rotate in the first rotational direction 461 about first pinned axis 452 such that first vehicle connection frame member 451A and second vehicle connection frame member 451B are positioned around intermediate link 453, longitudinally intermediate first pinned axis 452 and first edge 456A. As shown in FIG. 42C, first vehicle connection frame member 451A and second vehicle connection frame member 451B are extending substantially perpendicular to the ground level and as such, vehicle 2 is upright and capable of being towed on the back of another vehicle, as previously described. Vehicle 2 may be turned so that it is positioned on the ground level by rotating vehicle 2, and thereby first vehicle connection frame member 451A and second vehicle connection frame member 451B in rotational direction 462.

Now referring to FIGS. 43-45, an alternate frame assembly 470 will be described. Frame assembly 470 is generally in the shape of a triangular prism, with a first lower frame member 471A and a second lower frame member 471B extending parallel to first lower frame member 471A. In the present embodiment, first lower frame member 471A and second lower frame member 471B are laterally aligned. Each of first lower frame member 471A and second lower frame member 471B extend the length of alternate frame assembly 470. Further, an upper frame member 472 extends parallel to, and vertically higher than both of first lower frame member 471A and second lower frame member 471B.

Frame assembly 470 includes a rear portion 475 and a front portion 480. Further, frame assembly 470 comprises a plurality of triangular supports positioned along the length of frame assembly 470. A first support 473 is positioned at a rear extent of frame assembly 470, the first support 473 comprising a first support member 473A extending upward from first lower frame member 471A and a second support member 473B extending upward from second lower frame member 471B. A second support 476 is positioned longitudinally forward of first support 473. Second support 476 comprises a third support member 476A extending upward from first lower frame member 471A to upper frame member 472 and a fourth support member 476B extending upward from second lower frame member 471B to upper frame member 472. Second support 476 also comprises a support member (not shown) extending between first lower frame member 471A, second lower frame member 471B, between third support member 476A and fourth support member 476B. An upper frame rear support 472B extends between third support member 476A, fourth support member 476B and first support member 473A, second support member 473B.

Frame assembly 470 also includes a first bracket 474 extending between first support member 473A and second support member 473B and a second bracket 477 extending between third support member 476A and fourth support member 476B. Frame assembly 470 also comprises a third support 478 positioned longitudinally forward of second support 476. Third support 478 comprises a fifth support member 478A extending between first lower frame member 471A and upper frame member 472 and a sixth support member 478B extending between second lower frame member 471B and upper frame member 472. Third support 478 also comprises a seventh support member 478C extending between first lower frame member 471A and second lower frame member 471B. Each of fifth support member 478A, sixth support member 478B, seventh support member 478C are positioned on a laterally extending vertical plane.

A fourth support 479 is positioned longitudinally forward of third support 478. Fourth support 479 comprises an eighth support member 479A extending between first lower frame member 471A and upper frame member 472 and a ninth support member 479B extending between second lower frame member 471B and upper frame member 472. Fourth support 479 also comprises a tenth support member 479C extending between first lower frame member 471A and second lower frame member 471B. Each of eighth support member 479A, ninth support member 479B, and tenth support member 479C are positioned along a laterally extending vertical plane.

Frame assembly 470 also comprises a fifth support 481 positioned longitudinally forward of fourth support 479. Fifth support 481 comprises an eleventh support member 481A extending between first lower frame member 471A and upper frame member 472 and a twelfth support member 481B extending between second lower frame member 471B and upper frame member 472. Fifth support 481 also comprises a thirteenth support member 481C extending between first lower frame member 471A and second lower frame member 471B adjacent eleventh support member 481A, twelfth support member 481B. A sixth support 483 is positioned within the front portion 480. The sixth support comprises a fourteenth support member 483A extending generally upwardly from first lower frame member 471A and a fifteenth support member 483B extending generally upwardly from second lower frame member 471B. An upper frame front support 472A extends between fourteenth support member 483A, fifteenth support member 483B and eleventh support member 481A, twelfth support member 481B.

A third bracket 482 extends between first lower frame member 471A and second lower frame member 471B adjacent thirteenth support member 481C. A fourth bracket 484 extends between first lower frame member 471A and second lower frame member 471B adjacent fourteenth support member 483A, fifteenth support member 483B.

Frame assembly 470 also comprises a front suspension mount 485 positioned at a front extent of upper frame member 472 and a rear suspension mount 486 positioned at a rear extent of upper frame member 472. Illustratively, front suspension mount 485 is positioned vertically above third bracket 482 and rear suspension mount 486 is positioned vertically above second bracket 477. Referring to FIG. 44, a front suspension 490 is configured to couple to front portion 480 and a rear suspension 500 is configured to couple to rear portion 475.

Front suspension 490 generally comprises a first A-arm 491A and a second A-arm 491B. First A-arm 491A is coupled to the frame at each of fourth bracket 484 and third bracket 482 and extends outwardly in a first lateral direction from frame assembly 470. Second A-arm 491B is coupled to the frame at each of fourth bracket 484 and third bracket 482 and extends outwardly in a second lateral direction from frame assembly 470. A first hub 492A is coupled to first A-arm 491A, the first hub 492A configured to engage a first front ground engaging member 4. A second hub 492B is coupled to second A-arm 491B, the second hub 492B configured to engage a second front ground engaging member 4. A shock support member 493 is generally U-shaped and rotatably coupled to upper frame member 472 at front suspension mount 485. Shock support member 493 generally comprises a first arm 493A extending vertically above first A-arm 491A and a second arm 493B extending vertically above second A-arm 491B. A first shock absorber 495A extends between first arm 493A and first A-arm 491A and a second shock absorber 495B extends between second arm 493B and second A-arm 491B. In the present embodiment, a pair of steering rods 496A, 496B extend between front ground engaging members 4 and a steering assembly (not shown).

Rear suspension 500 is substantially similar to front suspension 490. That is, rear suspension 500 generally comprises a first A-arm 501A and a second A-arm 501B. First A-arm 501A is coupled to the frame at each of first bracket 474 and second bracket 477 and extends outwardly in the first lateral direction from frame assembly 470. Second A-arm 501B is coupled to the frame at each of first bracket 474 and second bracket 477 and extends outwardly in the second lateral direction from frame assembly 470. A first hub 504A is coupled to first A-arm 501A, the first hub 504A configure to engage a first rear ground engaging member 5. A second hub (not shown) is coupled to second A-arm 501B, the second hub configured to engage a second rear ground engaging member 5. A shock support member 502 is generally U-shaped and rotatably coupled to upper frame member 472 at rear suspension mount 486. Shock support member 502 generally comprises a first arm 502A extending vertically above first A-arm 501A and a second arm 502B extending vertically above second A-arm 501B. A first shock absorber 503A extends between first arm 502A and first A-arm 501A and a second shock absorber 503B extends between second arm 502B and second A-arm 501B.

Frame assembly 470 also comprises a first foot support 487A extending laterally outward from frame assembly 470 in the first direction and a second foot support 487B extending laterally outward from frame assembly 470 in the second direction. The first foot support 487A is positioned longitudinally intermediate front suspension 490 and rear suspension 500. In the present embodiment, frame assembly 470 is configured to support a battery 510 and a motor 511. In various embodiments, each of battery 510 and motor 511 are positioned longitudinally intermediate front suspension 490 and rear suspension 500.

Figure 43:
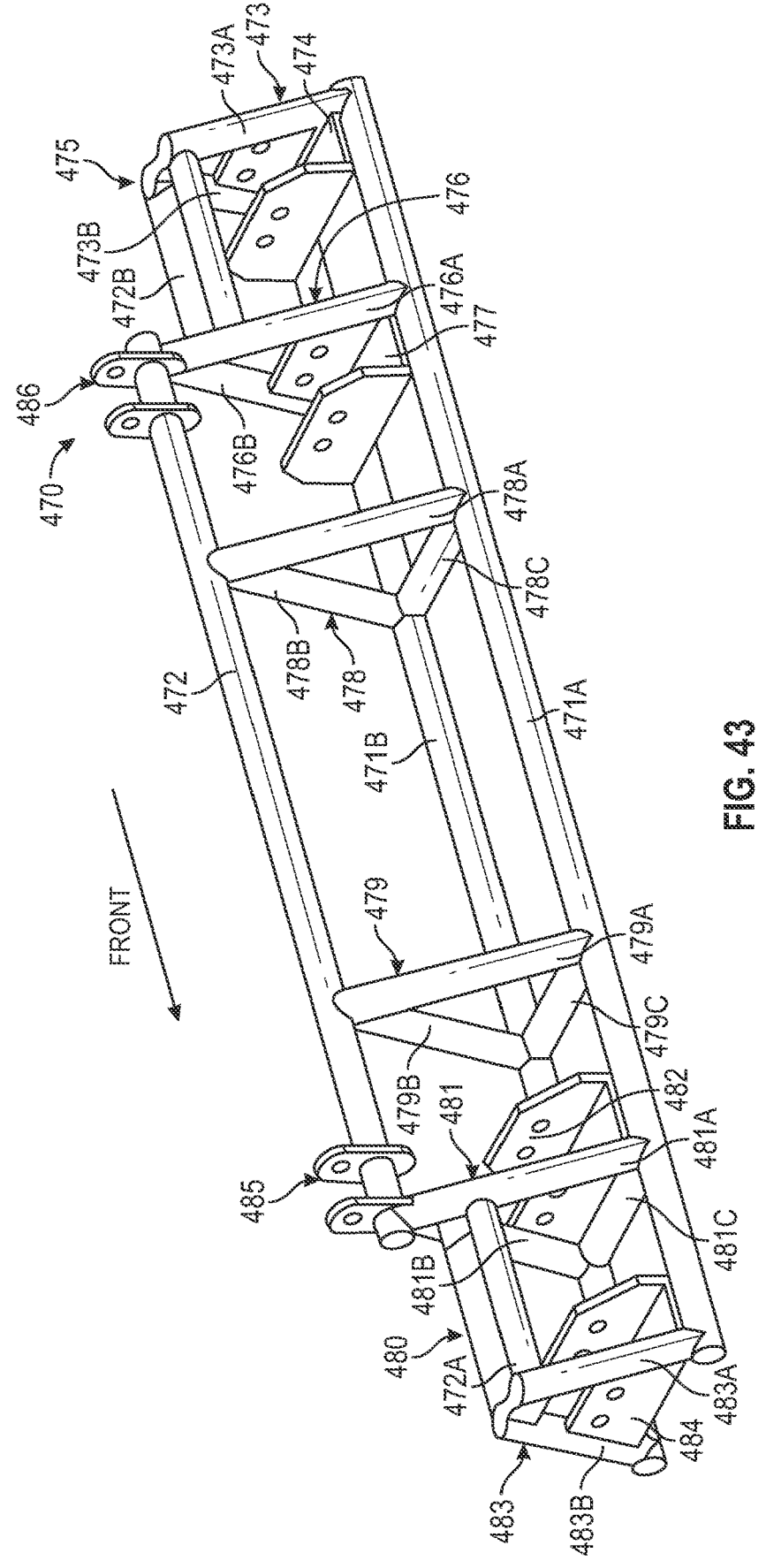
FIG. 43 is a perspective view of an alternate frame assembly of a vehicle of the present disclosure.
Figure 44:
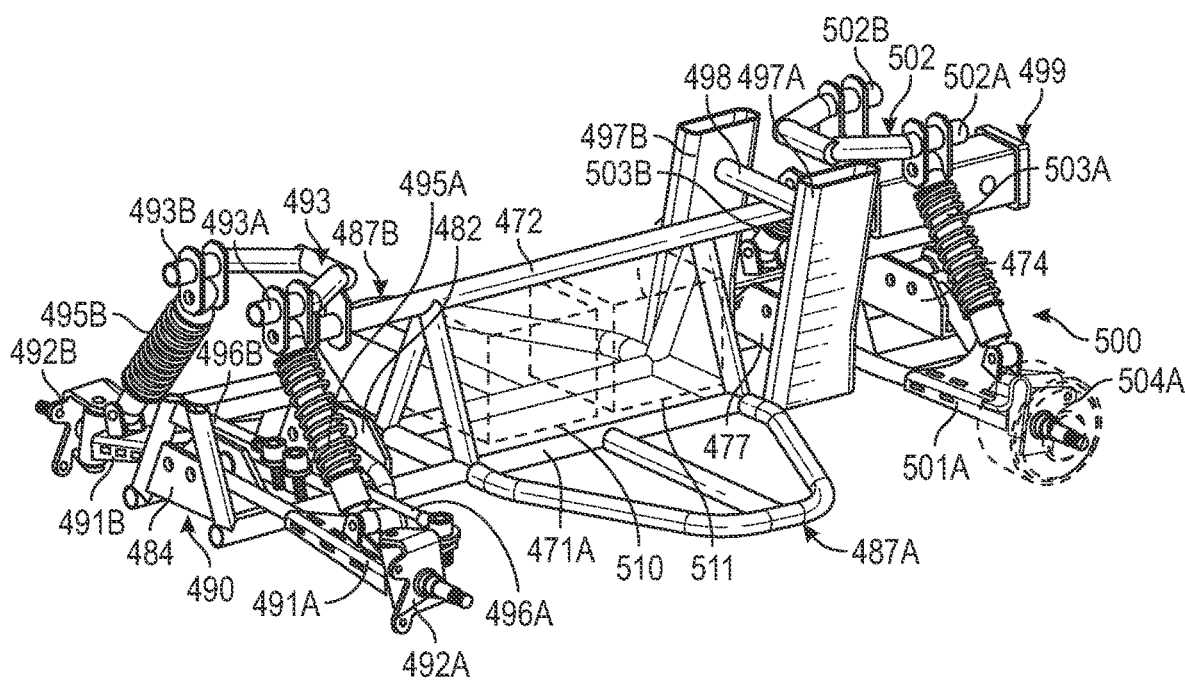
FIG. 44 is a perspective view of the alternate frame assembly of FIG. 43 with suspensions and a portion of a powertrain.

As best seen in FIGS. 43-44, frame assembly 470 is substantially symmetric about longitudinal centerline 25. The symmetrical nature of frame assembly 470 decreases manufacturing costs and reduces complexity.

Figure 45:
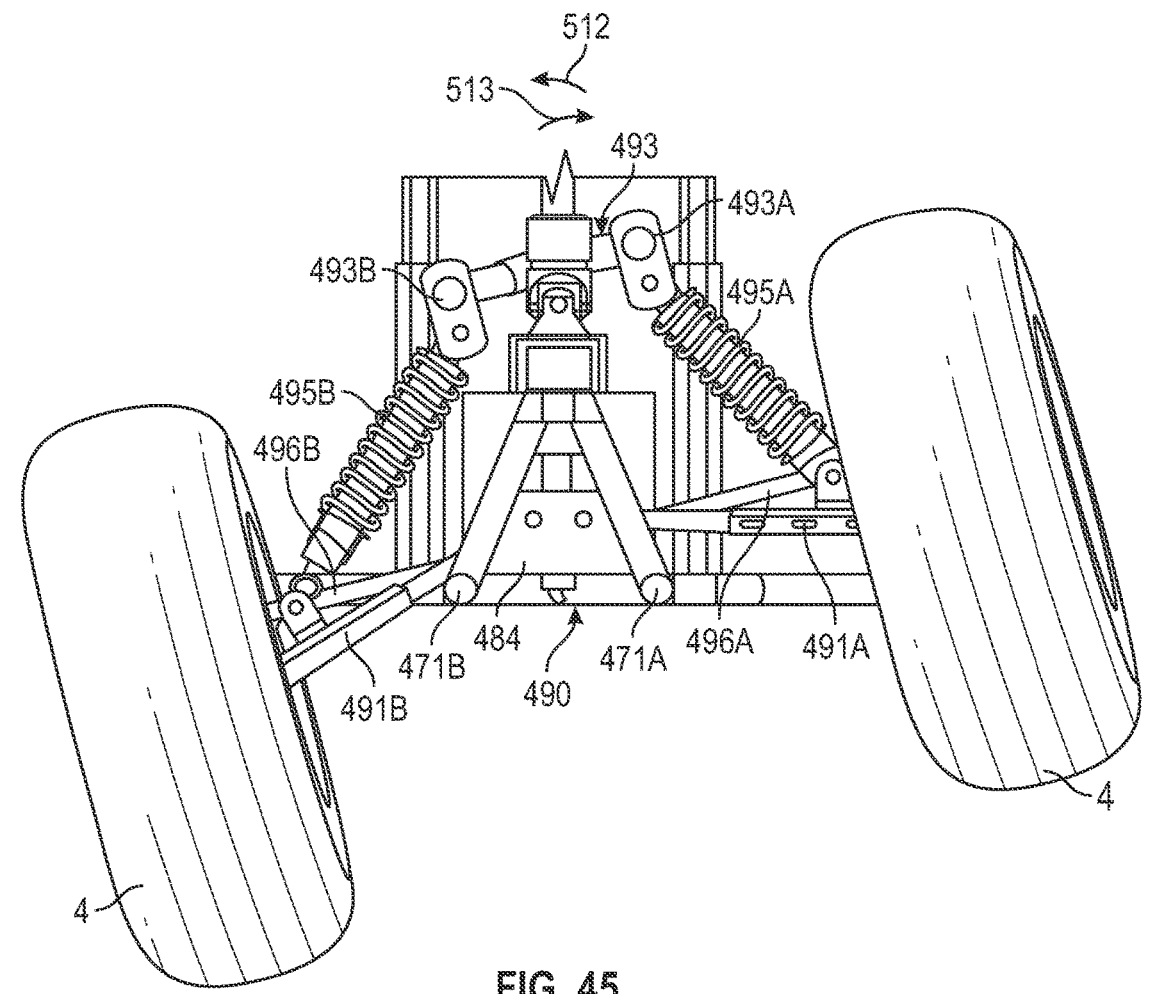
FIG. 45 is a front view of the alternate frame assembly with suspensions of FIG. 44 in a turning condition.

Now referring to FIG. 45, when any of vehicles 2, 2', 370 comprise frame assembly 470, front suspension 490 and rear suspension 500 are configured to articulate as the vehicle turns. As shown in FIG. 45, an operator is turning the vehicle to their right. First A-arm 491A articulates, rotates upwardly, and second A-arm 491B articulates, rotates downwardly. Further, as first A-arm 491A rotates upwardly, shock support member 493 is configured to rotate in a first rotational direction 512. Conversely, as first A-arm 491A rotates downwardly, shock support member 493 is configured to rotate in a second rotational direction 513. In this way, front suspension 490 is capable of rotating relative to frame assembly 470. In the present embodiment, rear suspension 500 operates substantially similar to front suspension 490.

Referring again to FIGS. 1 and 13, any of vehicles 2, 2', 370 may be configured for autonomous operation. A plurality of autonomous sensors 37 may be positioned around vehicle 2, 2', 370 to gather data about the vehicle surroundings. Illustratively, autonomous sensors 37 may be positioned on steering shaft 151, on a front left corner of tub 11, a front right corner of tub 11, a rear left corner of tub 11, a rear right corner of tub 11, and on seating assembly 20. In various embodiments, vehicle 2 may also include autonomous sensors 37 adjacent front suspension 100, rear suspension 200, on a left side face of tub 11, on a right side face of tub 11, or on another part of vehicle 2, 2', 370. In the present embodiment, autonomous sensors 37 may be audio sensors such as microphones, visual sensors such as cameras, LiDAR, radar, or another type of visual sensor. Autonomous sensors 37 are communicably coupled with controller 50. Controller 50 may be configured to provide instructions to any of front motor 280, rear motor 285 or first hub motor 290, second hub motor 292, third hub motor 294, and fourth hub motor 296 based upon autonomous sensor 37 providing a sensor value to controller 50. Further, controller 50 may be configured to provide instructions to brake controller 92, battery controller 72, or any of the adjustable shock absorbers 140, 141, 240, 241 based upon autonomous sensor 37 providing a sensor value to controller 50. Additional details regarding autonomous systems and methods of operation can be found in U.S. patent application Ser. No. 17/214,241, filed Mar. 26, 2021, titled "UTILITY VEHICLE"; U.S. patent application Ser. No. 15/613,483, filed Jun. 5, 2017, titled "HYBRID UTILITY VEHICLE"; U.S. patent application Ser. No. 16/414,217, filed May 16, 2019, titled "HYBRID UTILITY VEHICLE", the entire disclosures of which are expressly incorporated by reference herein.

Figure 46A:
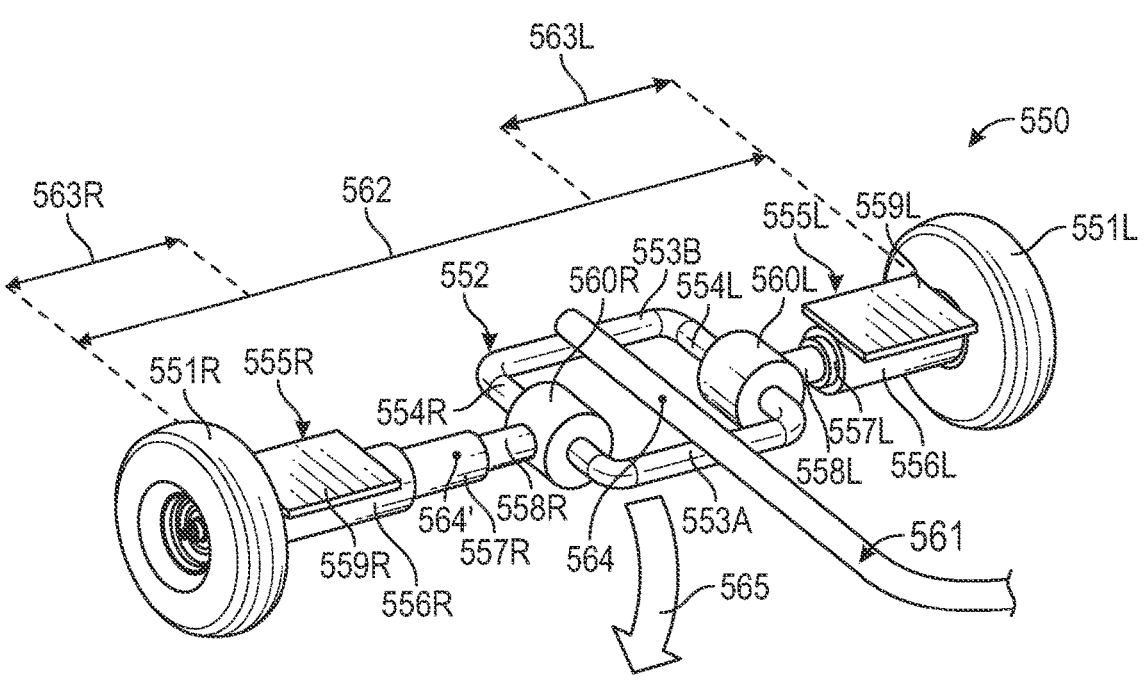
FIG. 46A is a perspective view of a telescoping rear driveline of a vehicle of the present disclosure.

Now referring to FIGS. 46A, a rear driveline 550 is provided that is configured to enhance vehicle stability. In the present embodiment, rear driveline 550 may be compatible with any of vehicles 2, 2', 370. Rear driveline 550 comprises a left wheel 551L and a right wheel 551R and an intermediate frame 552 positioned laterally intermediate left wheel 551L and right wheel 551R. Intermediate frame 552 is generally square shaped and comprises a front member 553A, a rear member 553B, a left member 554L, and a right member 554R, and each of members 553A, 553B, 554L, 554R are coupled together in a general square shape. A left axle assembly 555L is coupled between left member 554L and left wheel 551L and a right axle assembly 555R is coupled between right member 554R and right wheel 551R. Left axle assembly 555L is a telescoping axle with an outer member 556L, an intermediate member 557L, and an inner member 558L. Illustratively, inner member 558L fits within intermediate member 557L and intermediate member 557L fits within outer member 556L. In the present embodiment, each of members 556L, 557L, 558L are tubular and may slide laterally, relative to each other, thereby telescoping between a compressed position and an extended position. Right axle assembly 555R is a telescoping axle with an outer member 556R, an intermediate member 557R, and an inner member 558R. Illustratively, inner member 558R fits within intermediate member 557R and intermediate member 557R fits within outer member 556R. In the present embodiment, each of members 556R, 557R, 558R are tubular and may slide laterally, relative to each other, thereby telescoping between a compressed position and an extended position. In the present embodiment, a left sleeve 560L is coupled between inner member 558L and left member 554L such that left axle assembly 555L is able to rotate relative to left member 554L. Further, a right sleeve 560R is coupled between inner member 558R and right member 554R such that right axle assembly 555R is able to rotate relative right member 554R. In various embodiments, a motor (not shown) may be operably coupled to each of, or either of, left axle assembly 555L, right axle assembly 555R, left wheel 551L, or right wheel 551R configured to provide propulsion to rear driveline 550.

In the present embodiment, a left platform 559L is supported by left axle assembly 555L and a right platform 559R is supported by right axle assembly 555R. Left platform 559L is coupled to outer member 556L and right platform 559R is coupled to outer member 556R. Each of left platform 559L and right platform 559R are configured to support an operator of vehicle 2, 2', 370. Further, a frame assembly 561 is supported by intermediate frame 552. Frame assembly 561 may comprise a plurality of frame members (e.g., a center member 561) and/or a platform (not shown).

In the present embodiment, rear driveline 550 is configured to allow an operator of vehicle 2, 2', 370 to alter the Center of Gravity (CG) of the vehicle by altering a wheelbase distance 563 which is defined as the distance between left wheel 551L and right wheel 551R. Illustratively, in the present embodiment, a left axle wheelbase distance 563L can be altered separately from a right axle wheel base distance 563R. In one example, when left axle wheelbase distance 563L is equal to right axle wheelbase distance 563R, the CG is positioned approximately at a lateral center 564 of vehicle 2, 2', 370. In another example, when an operator of vehicle 2, 2', 370 turns the vehicle to the right, in direction 565, the centrifugal force will shift to the left, and right axle wheelbase distance 563R will be increased and right axle wheelbase distance 563R will be greater than left axle wheelbase distance 563L. When right axle wheelbase distance 563R is greater than left axle wheelbase distance 563L, CG will be shifted toward the right towards location 564'. By allowing an operator of vehicle 2, 2', 370 to shift the CG of vehicle 2, 2', 370, the stability will be increased during a turning event.

Figure 46B:
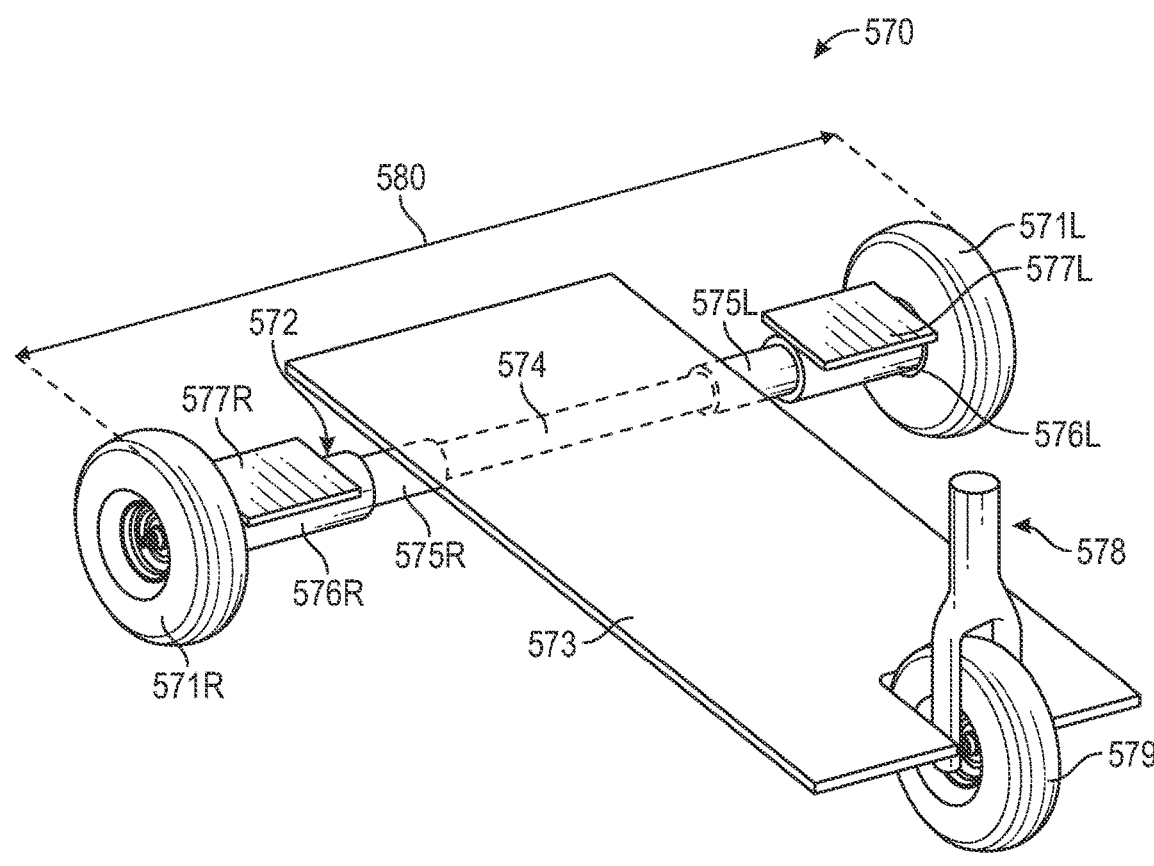
FIG. 46B is a perspective view of a telescoping rear driveline of a vehicle of the present disclosure.

Referring now to FIG. 46B, a rear driveline 570 is provided that may also enhance vehicle stability. In the present embodiment, rear driveline 570 may be compatible with any of vehicles 2, 2', 370. Rear driveline 570 comprises a left wheel 571L, a right wheel 571R and an axle assembly 572 extending between left wheel 571L and right wheel 571R. Axle assembly 572 comprises a left outer member 576L coupled to left wheel 571L and a right outer member 576R coupled to right wheel 571R. Axle assembly 572 also comprises a left intermediate member 575L configured to fit within left outer member 576L and a right intermediate member 575R configured to fit within right outer member 576R. A center axle member 574 is coupled between, and fits within, left intermediate member 575L and right intermediate member 575R. In one embodiment of the present disclosure, left outer member 576L is configured to slide laterally over and relative to left intermediate member 575L, and left intermediate member 575L is configured to slide laterally over and relative to center axle member 574. Further, right outer member 576R is configured to slide laterally over and relative to right intermediate member 575R, and right intermediate member 575R is configured to slide laterally over and relative to center axle member 574. That is, each of left wheel 571L and right wheel 571R may slide laterally relative to axle assembly 574. In various embodiments, a motor (not shown) may be operably coupled to each of, or either of, axle assembly 574, left wheel 571L, or right wheel 571R configured to provide propulsion to rear driveline 570.

A right platform 577R is supported by right outer member 576R and a left platform 577L is supported by left outer member 576L. Each of right platform 577R and left platform 577L is configured to support a foot of an operator. A platform 573 is configured to be supported by rear driveline 570. In various embodiments, a frame assembly (not shown) is configured to be supported by rear driveline 570. A front wheel 579 and a steering assembly 578 configured to steer front wheel 579 are configured to be coupled to platform 573.

In the present embodiment, rear driveline 570 is configured to increase the stability of vehicle 2, 2', 370. Illustratively, rear driveline 570 comprises a wheelbase distance 580 defined as the distance between left wheel 571L and right wheel 571R. Illustratively, as right outer member 576R and left outer member 576L move outward, the wheelbase distance 580 increases, and as right outer member 576R and left outer member 576L move inward, the wheelbase distance 580 decreases. In the present embodiment, right outer member 576R and left outer member 576L are configured to move synchronously, such that the left distance between left wheel 571L and a center of rear driveline 570 and the right distance between right wheel 571R and a center of rear driveline 570 remains equal throughout operation of vehicle 2, 2', 370. In various embodiments, the wheelbase distance 580 is altered by a linear actuator (not shown) positioned on axle assembly 572. In various embodiments, wheelbase distance 580 is altered by a motor (not shown). An operator may seek to increase the stability (i.e., increase the wheelbase distance) at higher speeds and increase maneuverability (i.e., decrease the wheelbase distance) at lower speeds. Vehicle 2, 2', 370 may comprise an input (not shown) configured to operate the motor or linear actuator to alter the wheelbase distance 580.

Figure 47A:
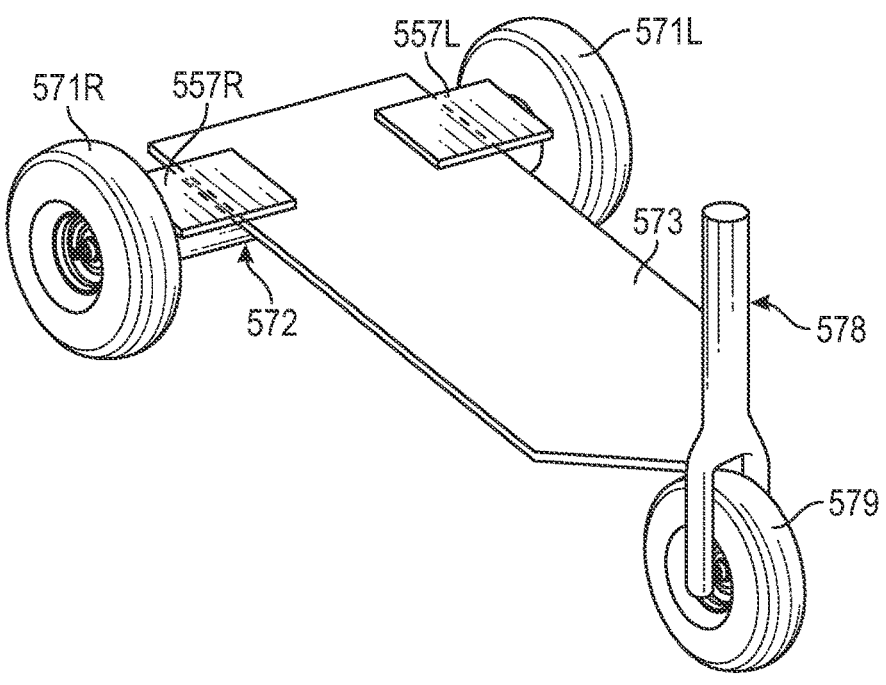
FIG. 47A is a perspective view of a platform in a neutral position of a vehicle of the present disclosure.
Figure 47B:
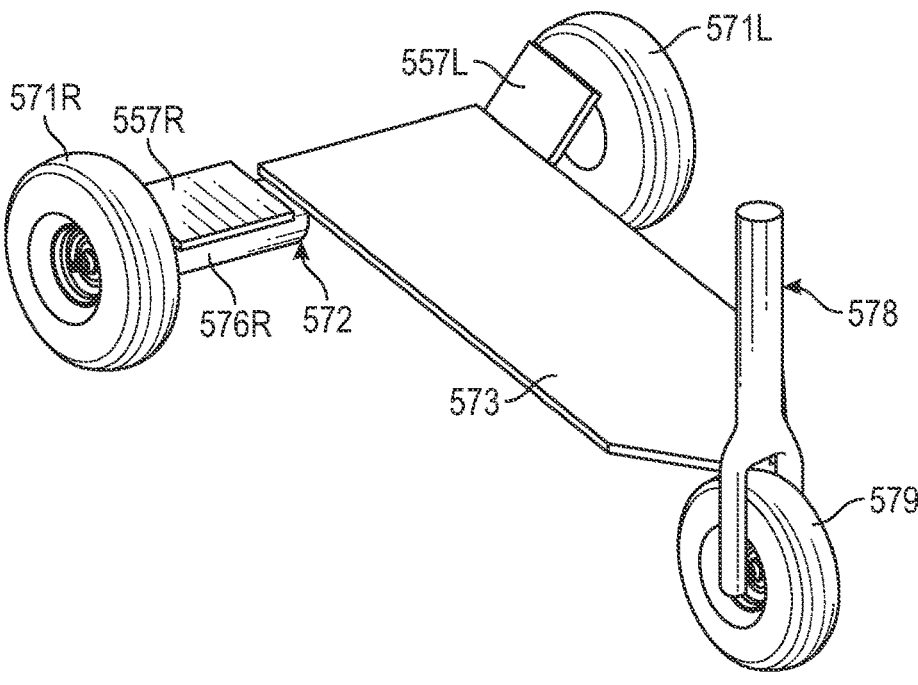
FIG. 47B is a perspective view of a platform in a tilted position of a vehicle of the present disclosure.

Now referring to FIGS. 47A-47B, footrests 557L, 557R may be configured to tilt to encourage/support a rider to lean/tilt during a turning event of vehicle 2, 2', 370. In the present embodiment, footrests 557L, 557R may tilt on either of drivelines 550, 570. Footrests 557L, 557R may be tilted using a mechanical linkage (not shown) or a motor (not shown). In one embodiment, in reference to driveline 550, as vehicle 2, 2', 370 experiences a turning event, and as the CG shifts either left or right, a mechanical linkage or motor is configured to tilt the footrests 557L, 557R in an appropriate manner. That is, in one embodiment, in a right turning event, as previously described, the CG shifts to the right, and a rider is encouraged to lean to the right to shift their weight over the new CG position. To encourage the rider to lean right, the left footrest 557L will be angled upward (FIG. 47B). To encourage the rider to lean left, during a left turning event, the right footrest 557R will be angled upward. In the present embodiment, the footrests 577R, 577L can be angled between 0-90 degrees. In the present embodiment, the footrests are angled based upon a vehicle sensor, such as a steering angle sensor, a vehicle speed sensor, a shock position sensor, or other vehicle sensors. In one embodiment, as steering angle increases, the angle of footrest 577R, 577L is increased. In another embodiment, as steering angle acceleration is increased, the angle of footrest 577R, 577L is increased. In another embodiment, as the vehicle speed increases, the rate at which the angle of footrest 577R, 577L is decreased.

Figure 48A:
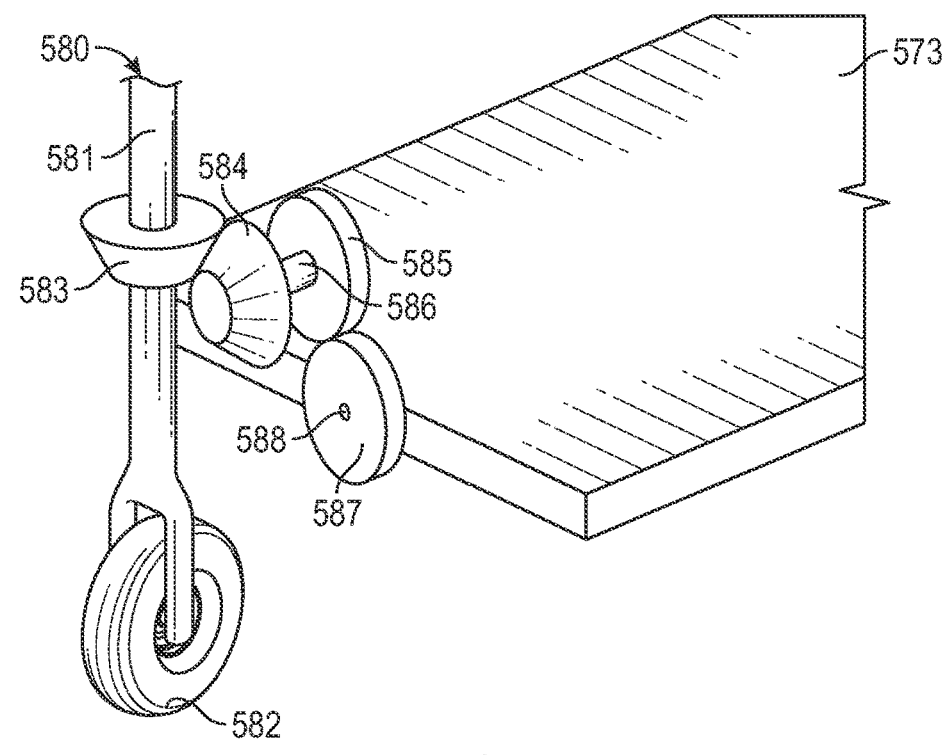
FIG. 48A is a perspective view of a platform coupled to a geartrain of a vehicle of the present disclosure.
Figure 48B:
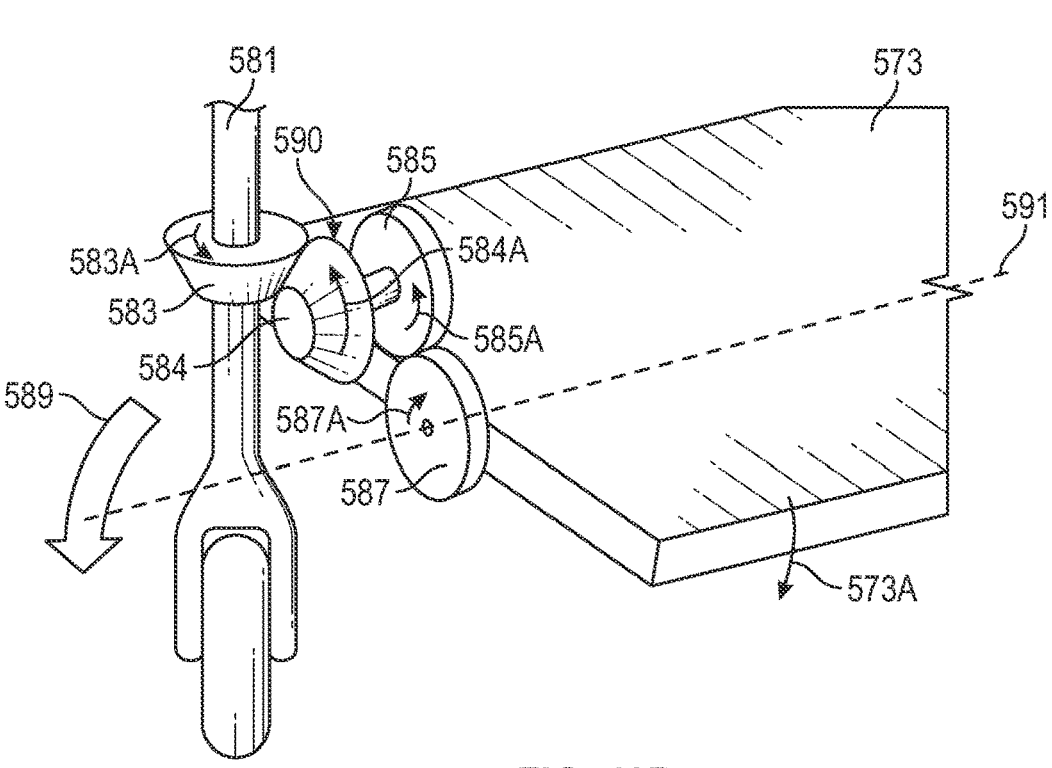
FIG. 48B is a perspective view of a rotated platform coupled to a geartrain of a vehicle of the present disclosure.

Now referring to FIGS. 48A-48B, a steering assembly 580 is provided. In the present embodiment, steering assembly 580 is compatible with any of vehicle 2, 2', 370. Steering assembly 580 comprises a steering shaft 581 extending generally upwardly and configured with a ground engaging member (e.g., a wheel, a track, a ski) coupled to a bottom extent thereof. Steering assembly 580 is coupled to platform 573 and configured to steer vehicle 2, 2', 370. In the present embodiment, a geartrain 590 is coupled between steering assembly 580 and platform 573. Geartrain 590 comprises a first gear 583 coupled to steering shaft 581. Further, geartrain 590 comprises a second gear 584 meshedly engaged to the first gear 583. In the present embodiment, each of the first gear 583 and the second gear 584 are beveled gears and configured to convert the rotational movement of the steering shaft to a rotational movement generally parallel to a ground surface (not shown) and/or the platform 573. A third gear 585 is fixedly coupled to second gear 584 by an intermediate shaft 586. That is, third gear 585 rotates at the same angular rate as second gear 584. Third gear 585 is meshedly coupled to a fourth gear 587, and fourth gear 587 is coupled to platform 573. In the present embodiment, third gear 585 and fourth gear 587 are helical gears. In various embodiments, third gear 585 and fourth gear 587 are spur gears. That is, third gear 585 and fourth gear 587 necessarily spin in opposite directions when meshedly engaged and turning.

In the present embodiment, fourth gear 587 is coupled to platform 573 such that a rotation of fourth gear 587 causes platform 573 to rotate along a longitudinal centerline 591 of vehicle 2, 2', 370. In various embodiments, fourth gear 587 is fixedly coupled to platform 573 such that an angular rotation of a first angle at fourth gear 587 causes platform 573 to rotate an amount equal to the first angle about longitudinal centerline 591. In various embodiments, fourth gear 587 is coupled to platform 573 through a gear reduction geartrain (not shown). The gear reduction geartrain multiplies the rotational output of the fourth gear 587 to alter the amount of rotation experienced by the platform 573. In various embodiments, the gear reduction geartrain multiplies the rotational output of the fourth gear 587 by a value less than 1, which means that the platform 573 rotates less than the rotational output of the fourth gear 587. In various embodiments, the gear reduction geartrain multiplies the rotational output of the fourth gear 587 by a value greater than 1, which means that the platform 573 rotates more than the rotational output of the fourth gear 587.

In the present embodiment, platform 573 is configured to rotate as steering shaft 581 is rotated. That is, in one example best seen in FIG. 48B, as steering shaft 581 rotates in a left direction 589, steering shaft 581 and first gear 583 rotate in a similar left rotational direction 583A. As first gear 583 rotates in rotational direction 583A, second gear 584 rotates in rotational direction 584A (i.e., counterclockwise when viewed from the front). Third gear 585 rotates in rotational direction 585A, which is the same as rotational direction 584A. As third gear 585 rotates in rotational direction 585A, fourth gear 587 is rotated in a rotational direction 587A (i.e., clockwise when viewed from the front) which is opposite of rotational direction 585A. Because fourth gear 587 is coupled to platform 573, platform 573 rotates in rotational direction 573A which is the same as rotational direction 587A. In the present embodiment, as steering assembly 580 turns to the left, platform 573 will also turn to the left, and as steering assembly 580 turns to the right, platform 573 will also turn to the right.

In the present embodiment, geartrain 590 allows platform 573 to rotate as a user of vehicle 2, 2', 370 is executing a turning event. Allowing platform 573 to rotate allows the user to lean into the turn, thereby increasing the stability of vehicle 2, 2', 370 during a turning event. This also allows a user of vehicle 2, 2', 370 to shift their bodyweight to be more centered with the Center of Gravity (CG) of vehicle 2, 2', 370 during a turning event.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A recreational vehicle, comprising:
 a plurality of ground engaging members comprising at least one front ground engaging member and at least one rear ground engaging member;
 a frame supported by the plurality of ground engaging members, the frame comprising a front portion, a middle portion, and a rear portion;
 a steering assembly supported by the front portion, the steering assembly configured to steer at least one of the plurality of ground engaging members;
 a first motor supported by the front portion, the first motor configured to provide power to the at least one front ground engaging member and a second motor supported by the rear portion, the second motor configured to provide power to the at least one rear ground engaging member;
 a battery assembly supported by the middle portion, the battery assembly comprising a first battery and a second battery; and
 the middle portion comprises a tub configured to support an operator of the recreational vehicle, the tub comprising a base and a cover, the base including a divider, the base defining a first recess configured to receive the first battery and a second recess configured to receive the second battery in a second recess, wherein the divider separates the first recess and the second recess, and wherein the tub is configured to support the operator in both a seated position and a standing position.

2. The recreational vehicle of claim 1, wherein the plurality of ground engaging members comprises a front right ground engaging member, a front left ground engaging member, a rear left ground engaging member, and a rear right ground engaging member, and the first motor is configured to provide power to each of the front right ground engaging member and the front left ground engaging member and the second motor is configured to provide power to each of the rear right ground engaging member and the rear left ground engaging member.

3. The recreational vehicle of claim 1, wherein the plurality of ground engaging members comprises a front right ground engaging member, a front left ground engaging member, a rear left ground engaging member, and a rear right ground engaging member, and the first motor is a hub motor operably coupled to the front right ground engaging member, a third motor is a hub motor operably coupled to the front left ground engaging member, the second motor is a hub motor operably coupled to the rear right ground engaging member, and a fourth motor is a hub motor operably coupled to the rear left ground engaging member.

4. The recreational vehicle of claim 1, wherein the cover is configured to conceal the first battery.

5. The recreational vehicle of claim 1, wherein the tub further comprises a support member extending upward from the base, the support member configured to support the cover.

6. The recreational vehicle of claim 1, wherein the cover is positioned on a top face of the tub.

7. The recreational vehicle of claim 1, further comprising a channel extending through the frame between the tub and the rear portion, and at least one electrical wire is configured to extend through the channel between the at least one battery and the second motor.

8. The recreational vehicle of claim 1, wherein the divider is configured to support the cover.

9. The recreational vehicle of claim 1, further comprising a clamp configured to fit over the divider.

10. The recreational vehicle of claim 9, wherein the divider includes a first aperture and the clamp includes a second aperture, wherein the first aperture and the second aperture are configured to receive a fastener so as to couple the clamp to the divider.

11. The recreational vehicle of claim 9, wherein the clamp includes a first wing configured to clamp the first battery within the first recess when the clamp is coupled to the divider and a second wing configured to clamp the second battery within the second recess when the clamp is coupled to the divider.

12. The recreational vehicle of claim 1, wherein the tub includes a floor and a plurality of supports extending upwardly from the floor, wherein the plurality of supports are configured to support one of the first battery or the second battery above the floor.

13. The recreational vehicle of claim 1, wherein the divider extends transverse to a longitudinal direction of the recreational vehicle.

14. The recreational vehicle of claim 1, wherein the divider extends along a centerline of the recreational vehicle.

15. The recreational vehicle of claim 1, wherein the tub further comprises a lock configured to lock the cover to the tub, wherein the lock is a cylinder lock with a key, a combination lock, or a biometric lock.

\* \* \* \* \*